(12) United States Patent
Prager et al.

(10) Patent No.: US 12,509,228 B2
(45) Date of Patent: *Dec. 30, 2025

(54) PAYLOAD COUPLING APPARATUS FOR UAV AND METHOD OF DELIVERING A PAYLOAD

(71) Applicant: Wing Aviation LLC, Mountain View, CA (US)

(72) Inventors: Andre Prager, Sunnyvale, CA (US); Trevor Shannon, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,501

(22) Filed: Apr. 17, 2023

(65) Prior Publication Data

US 2023/0322385 A1    Oct. 12, 2023

Related U.S. Application Data

(63) Continuation of application No. 17/061,586, filed on Oct. 2, 2020, now Pat. No. 11,667,384, which is a
(Continued)

(51) Int. Cl.
*B64D 1/22* (2006.01)
*B64D 1/12* (2006.01)
(Continued)

(52) U.S. Cl.
CPC ............... *B64D 1/22* (2013.01); *B64D 1/12* (2013.01); *G06Q 10/083* (2013.01); *B64U 50/38* (2023.01);
(Continued)

(58) Field of Classification Search
CPC .......... B64D 1/22; B64D 1/12; B64D 17/383; B64C 39/024; B64C 39/02; G06Q 10/083;
(Continued)

(56) References Cited

U.S. PATENT DOCUMENTS 2,872,717 A  *  2/1959  Kelley .................. F16B 45/037
                                                      294/82.19
3,036,797 A     5/1962  Augusta
(Continued)

FOREIGN PATENT DOCUMENTS

GB             158304         2/1921
JP          10-114489         5/1998
(Continued)

OTHER PUBLICATIONS

Shannon et al., U.S. Appl. No. 15/389,338, filed Dec. 22, 2016, 175 pages.
(Continued)

*Primary Examiner* — Assres H Woldemaryam
(74) *Attorney, Agent, or Firm* — McDonnell Boehnen Hulbert & Berghoff LLP

(57) ABSTRACT

A payload coupling apparatus is provided including a housing, wherein the housing is adapted for attachment to a first end of a tether, a slot extending downwardly from an outer surface of the housing towards a center of the housing thereby forming a lower lip on the housing beneath the slot, and wherein the slot is adapted to receive a handle of a payload. A method of delivering a payload using the payload coupling apparatus is also provided.

15 Claims, 55 Drawing Sheets

Related U.S. Application Data continuation of application No. 15/389,074, filed on Dec. 22, 2016, now Pat. No. 10,793,274.

(60) Provisional application No. 62/385,844, filed on Sep. 9, 2016, provisional application No. 62/385,854, filed on Sep. 9, 2016.

(51) Int. Cl.
  *G06Q 10/083* (2023.01)
  *B64U 50/38* (2023.01)
  *B64U 101/30* (2023.01)
  *B64U 101/67* (2023.01)

(52) U.S. Cl.
  CPC ...... *B64U 2101/30* (2023.01); *B64U 2101/67* (2023.01); *B64U 2201/10* (2023.01); *B64U 2201/20* (2023.01)

(58) Field of Classification Search
  CPC B64U 2101/60; B64U 50/38; B64U 2101/67; B64U 70/30
  See application file for complete search history.

(56) References Cited

U.S. PATENT DOCUMENTS

| | | | |
|---|---|---|---|
| 3,194,598 A * | 7/1965 | Goldfuss | F16B 45/037 294/82.19 |
| 3,795,951 A * | 3/1974 | Ratcliff | B66C 1/34 59/93 |
| 3,904,156 A | 9/1975 | Smith | |
| 4,767,144 A * | 8/1988 | Hornberg | B66C 1/38 24/599.7 |
| 5,271,128 A | 12/1993 | Storm | |
| 5,292,165 A * | 3/1994 | Wiklund | B66C 1/36 294/82.2 |
| 5,593,113 A * | 1/1997 | Cox | B64D 1/22 294/82.26 |
| 5,634,246 A | 6/1997 | Jermyn, Jr. | |
| 5,788,186 A | 8/1998 | White | |
| 5,851,040 A * | 12/1998 | Fredriksson | F16G 17/00 294/82.11 |
| 5,884,950 A * | 3/1999 | Fredriksson | F16G 17/00 294/82.11 |
| 5,940,943 A * | 8/1999 | Kloster | F16B 45/02 24/DIG. 37 |
| 6,334,537 B1 | 1/2002 | Tepper | |
| 6,336,260 B1 * | 1/2002 | Mauthner | F16B 45/02 24/599.6 |
| 6,913,301 B2 * | 7/2005 | Gotz | B66C 1/14 294/82.11 |
| 7,762,194 B2 | 7/2010 | Gaigler | |
| 8,162,263 B2 | 4/2012 | Wong et al. | |
| 8,523,253 B1 | 9/2013 | Yustus | |
| 9,085,362 B1 | 7/2015 | Kilian et al. | |
| 9,174,733 B1 * | 11/2015 | Burgess | B64D 1/12 |
| 9,205,922 B1 | 12/2015 | Bouwer | |
| 9,302,770 B2 * | 4/2016 | Burgess | B64D 9/00 |
| 9,308,994 B2 | 4/2016 | Uskert et al. | |
| 9,346,547 B2 | 5/2016 | Patrick et al. | |
| 9,384,668 B2 | 7/2016 | Raptopoulos et al. | |
| 9,422,139 B1 * | 8/2016 | Bialkowski | B66C 13/06 |
| 9,573,684 B2 | 2/2017 | Kimchi et al. | |
| 9,580,173 B1 * | 2/2017 | Burgess | G05D 1/102 |
| 9,776,835 B2 | 10/2017 | Choudhari et al. | |
| 9,783,295 B2 | 10/2017 | Takayama et al. | |
| 9,849,981 B1 | 12/2017 | Burgess et al. | |
| 10,315,764 B2 | 6/2019 | Shannon et al. | |
| 11,111,110 B2 * | 9/2021 | Oswald | B66C 1/14 |
| 2002/0175246 A1 * | 11/2002 | Kurtgis | B64D 1/12 244/137.4 |
| 2004/0231112 A1 | 11/2004 | Marcaccio et al. | |
| 2009/0009596 A1 | 1/2009 | Kerr et al. | |
| 2011/0192932 A1 | 8/2011 | Brenner et al. | |
| 2012/0290226 A1 | 11/2012 | Williams et al. | |
| 2013/0054054 A1 | 2/2013 | Tollenaere et al. | |
| 2013/0193256 A1 | 8/2013 | Hawkes et al. | |
| 2013/0193269 A1 | 8/2013 | Zwaan et al. | |
| 2013/0233964 A1 | 9/2013 | Woodworth et al. | |
| 2013/0238135 A1 | 9/2013 | Fisher | |
| 2014/0180914 A1 | 6/2014 | Abhyanker | |
| 2014/0263852 A1 | 9/2014 | Walker et al. | |
| 2015/0076287 A1 | 3/2015 | Dula | |
| 2015/0158587 A1 * | 6/2015 | Patrick | B64C 39/024 701/3 |
| 2015/0239559 A1 | 8/2015 | Uskert et al. | |
| 2016/0009393 A1 * | 1/2016 | Repp | B64D 45/00 254/323 |
| 2016/0023761 A1 | 1/2016 | McNally | |
| 2016/0048131 A1 | 2/2016 | Lesperance et al. | |
| 2016/0059963 A1 | 3/2016 | Burgess et al. | |
| 2016/0236778 A1 | 8/2016 | Takayama et al. | |
| 2016/0340006 A1 | 11/2016 | Tang | |
| 2016/0340038 A1 | 11/2016 | Chavez et al. | |
| 2017/0073071 A1 | 3/2017 | Salzmann et al. | |
| 2017/0121023 A1 | 5/2017 | High et al. | |
| 2017/0355460 A1 * | 12/2017 | Shannon | B64D 17/383 |

FOREIGN PATENT DOCUMENTS

| | | |
|---|---|---|
| JP | H10114489 | 5/1998 |
| JP | 3383283 | 3/2003 |
| KR | 10-2014-0113896 | 9/2014 |
| WO | 87/04142 | 7/1987 |

OTHER PUBLICATIONS

Shannon et al., U.S. Appl. No. 15/389,138, filed Dec. 22, 2016, 170 pages.

Prager et al., U.S. Appl. No. 15/389,290, filed Dec. 22, 2016, 182 pages.

Prager et al., U.S. Appl. No. 15/389,304, filed Dec. 22, 2016, 172 pages.

Shannon et al., U.S. Appl. No. 15/389,326, filed Dec. 22, 2016, 172 pages.

Sopper et al., U.S. Appl. No. 15/295,494, filed Oct. 17, 2016, 82 pages.

Shannon et al., U.S. Appl. No. 15/179,585, filed Jun. 10, 2016, 67 pages.

France-Presse, Agence, "Switzerland begins postal delivery by drone," The Guardian, https://www.theguardian.com/technology/2015/jul/08/swiss-post-begins-testing-postal-delivery-by-unmanned-drone, Jul. 7, 2015, 3 pages.

Hern, Alex, "DHL launches first commercial drone 'parcelcopter' delivery service," The Guardian, https://www.theguardian.com/technology/2014/sep/25/german-dhl-launches-first-commerical-drone-delivery-service, Sep. 25, 2014, 3 pages.

Roberts et al., "Amazon dismayed by proposed FAA rules on commercial use of drones," The Guardian, https://www.theguardian.com/world/2015/feb/15/amazon-faa-rules-commercial-use-drones, Feb. 15, 2015, 3 pages.

Thielman, Sam, "Congress warned that drones present 'a nightmare scenario for civil liberties'," The Guardian, https://www.theguardian.com/technology/2015/jun/17/congress-drones-nightmare-scenario-for-civil-liberties, Jun. 17, 2015, 4 pages.

Various Prior Art references pre-dating Provisional Filing on Sep. 9, 2016, www.gigasense.se/product/safety-hook-is/, 1 page.

Gigasense Automatic Hook, Gigasense, 2016, 2 pages.

Written Opinion of the International Searching Authority for PCT/US2017/040026 dated Sep. 14, 2017, pp. 1-10.

International Search Report (ISR) for PCT/US2017/040026 dated Sep. 14, 2017, pp. 1-3.

Written Opinion of the International Searching Authority for PCT/US2017/040035 dated Sep. 19, 2017, pp. 1-12.

International Search Report (ISR) for PCT/US2017/040035 dated Sep. 19, 2017, pp. 1-3.

(56) References Cited

OTHER PUBLICATIONS

International Preliminary Report on Patentability dated Mar. 12, 2019 for International Application No. PCT/US2017/040026, 11 pages.
PCT International Search Report and Written Opinion, PCT International Application No. PCT/US2017/050025, dated Dec. 20, 2017, 33 pages.
PCT International Search Report and Written Opinion, PCT International Application No. PCT/US2017/048908, dated Nov. 9, 2017, 19 pages.
PCT International Search Report and Written Opinion, PCT International Application No. PCT/US2017/049199, dated Nov. 17, 2017, 20 pages.
Australian Examination Report No. 1 dated Nov. 27, 2019 for Australian Patent Application No. 2017324059, 4 pages.
European extended search report dated Feb. 24, 2020 for European Application No. 17849240.1, 13 pages.
International Searching Authority, International Search Report and Written Opinion mailed on Aug. 23, 2018, issued in connection with International Application No. PCT/US2017/050008, filed on Sep. 5, 2017, 9 pages.

\* cited by examiner

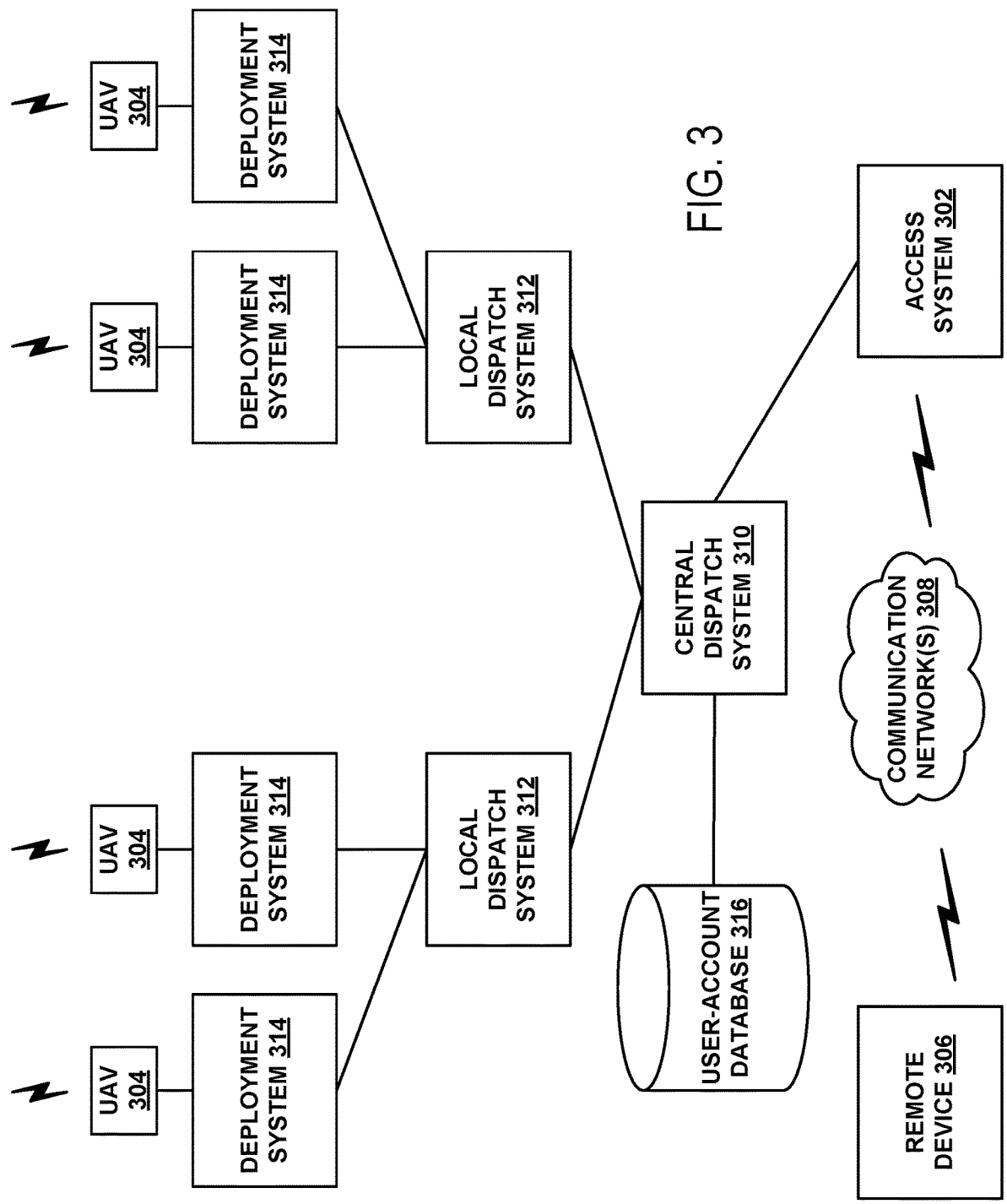

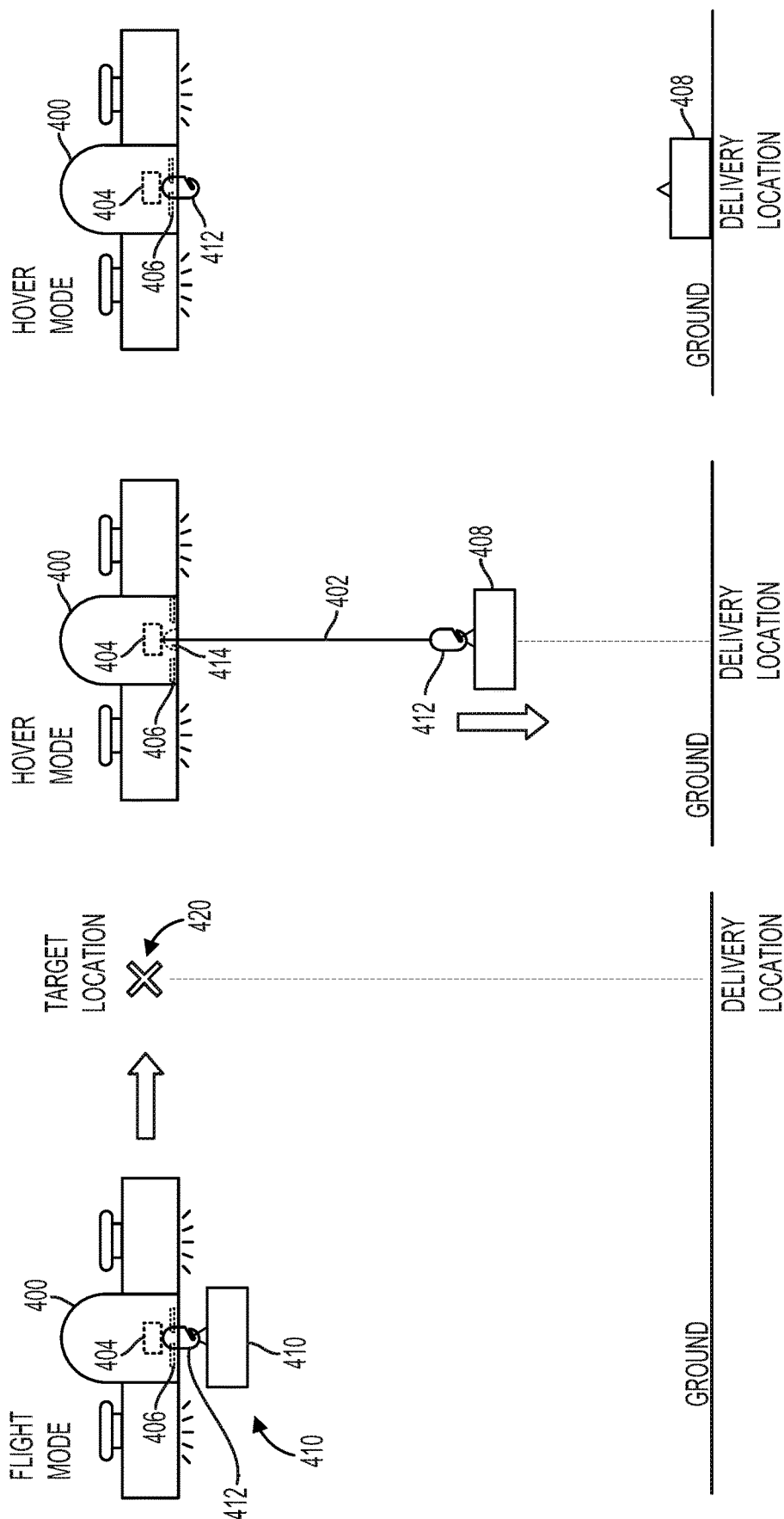

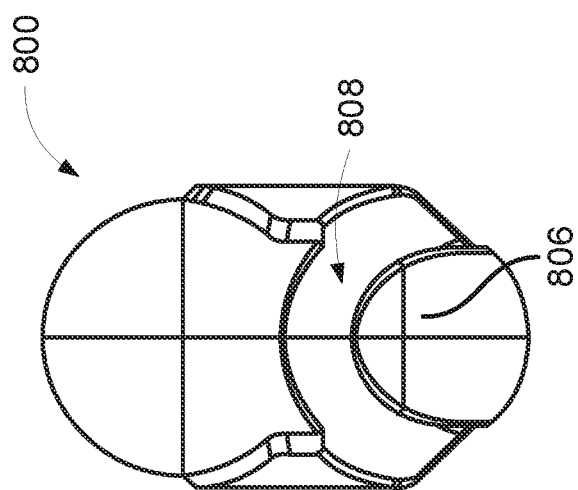
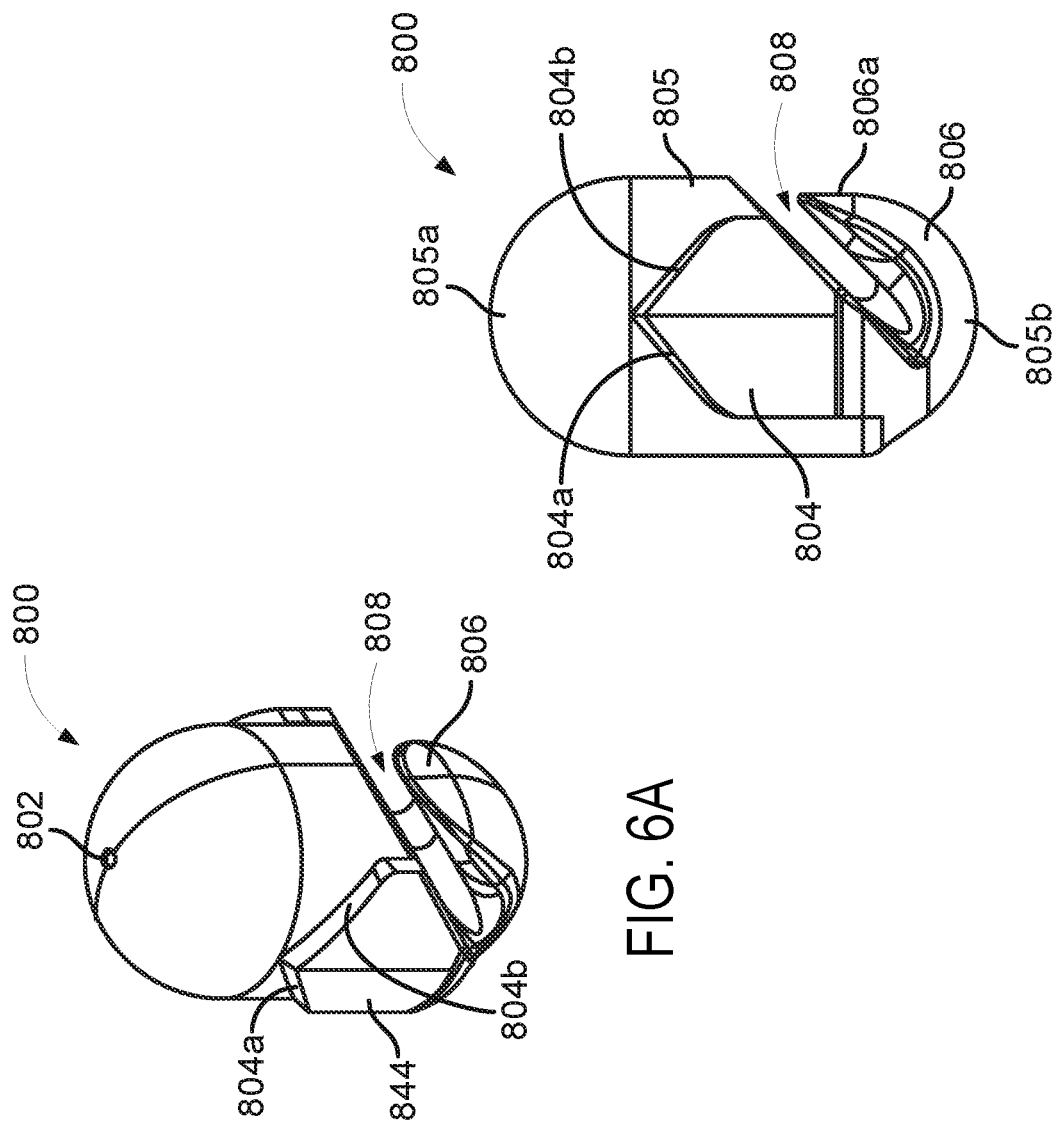
FIG. 6C
FIG. 6B
FIG. 6A

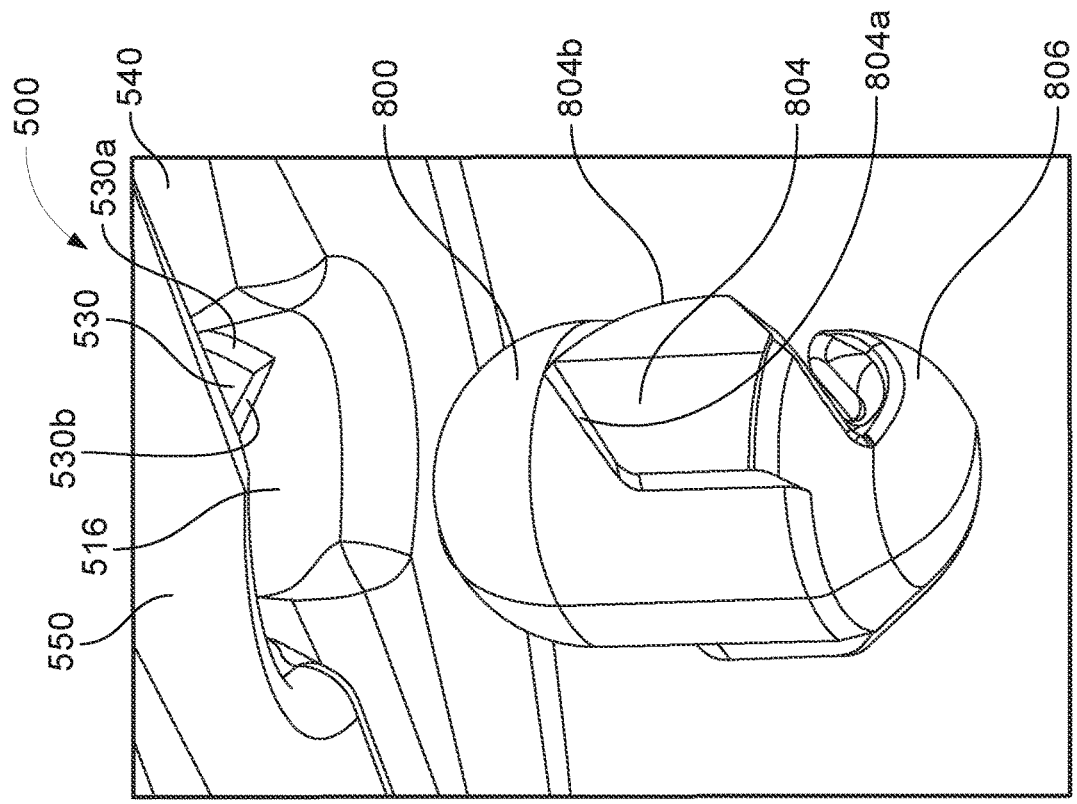
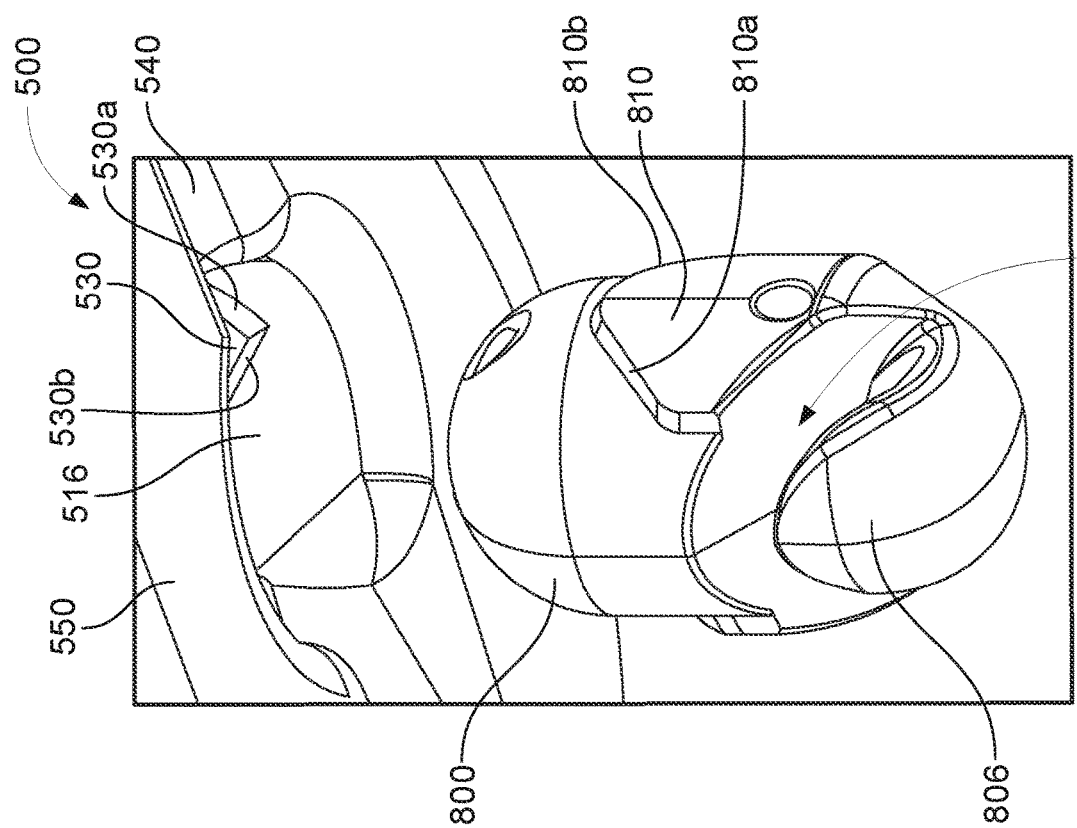
FIG. 8
FIG. 7

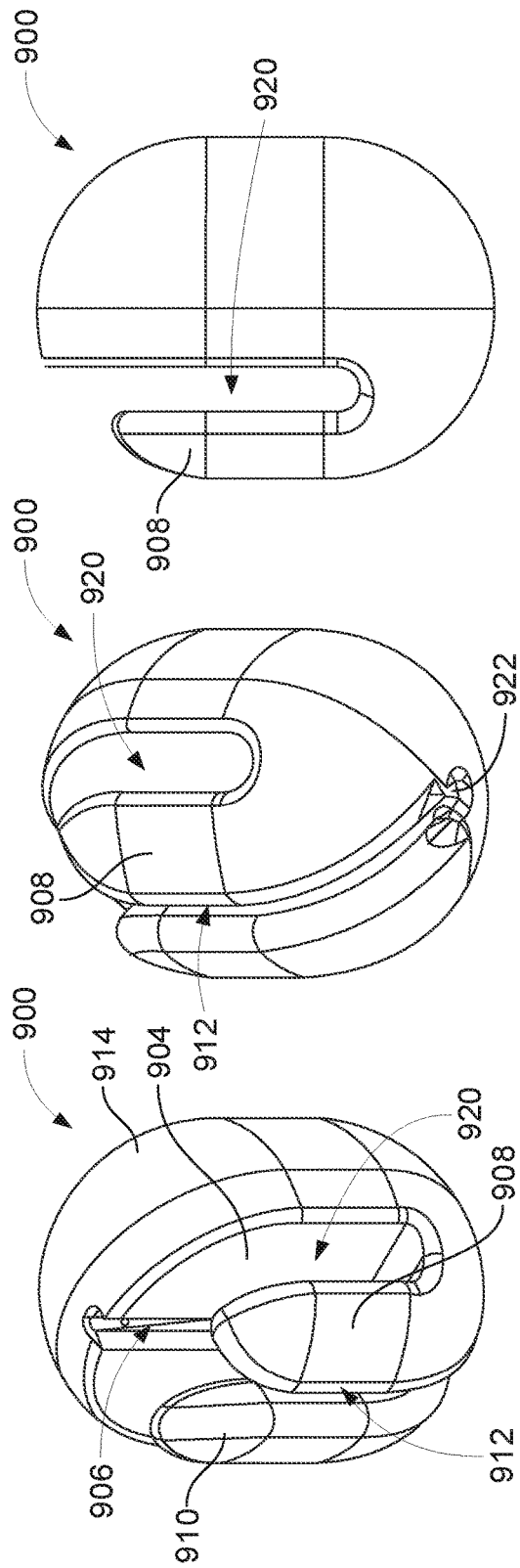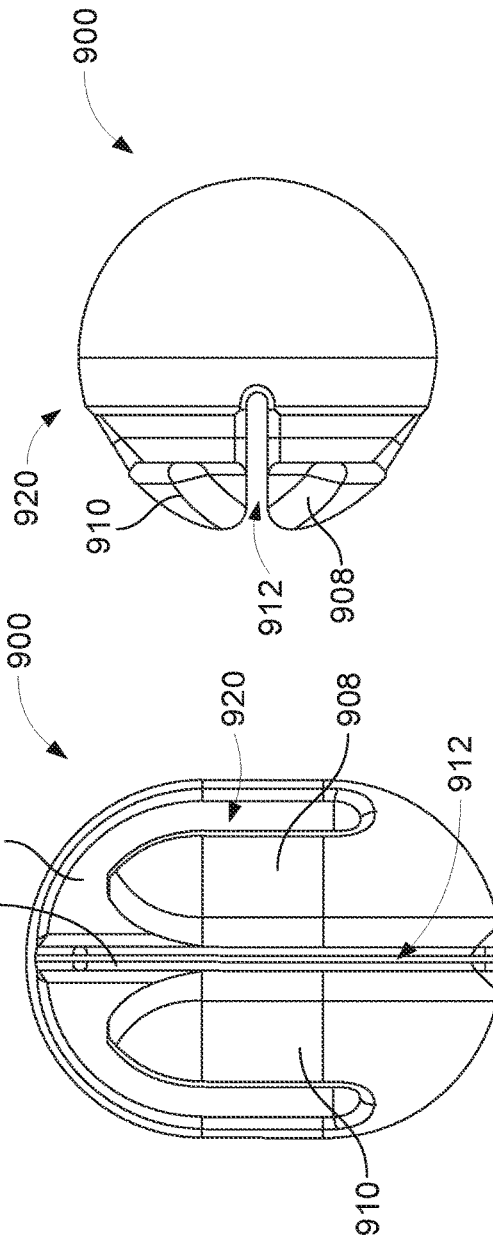

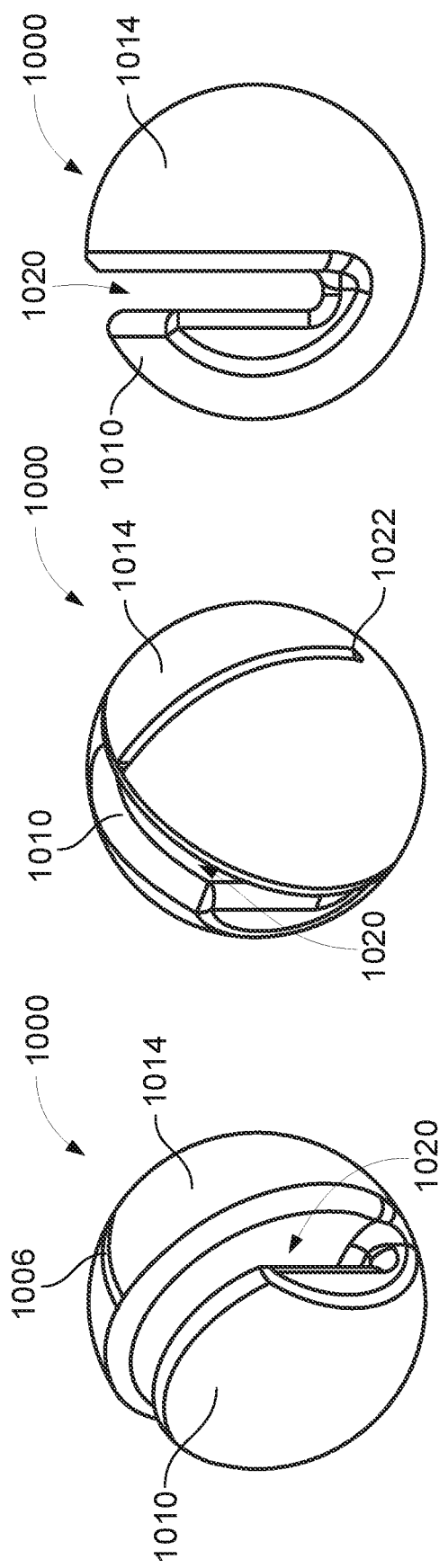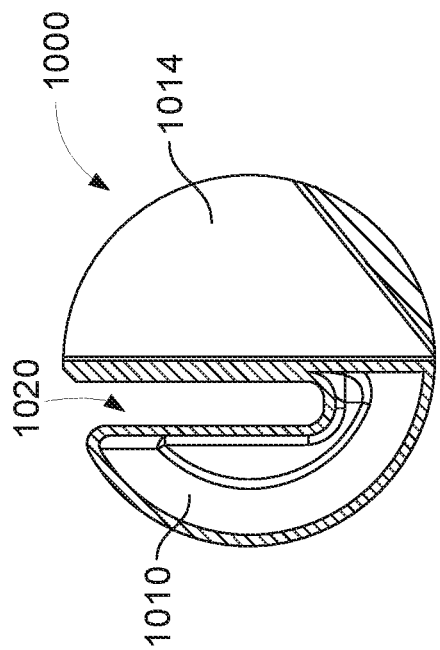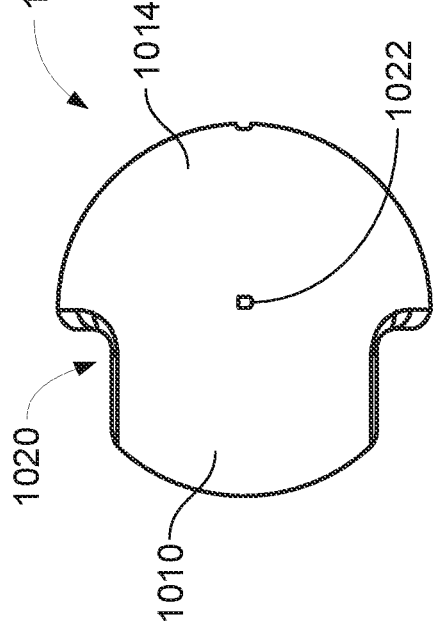

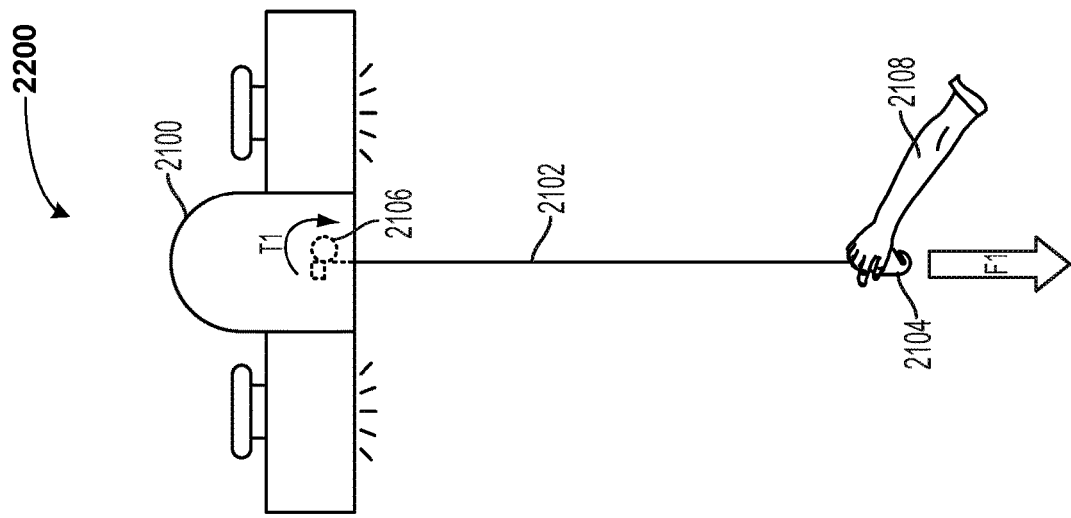
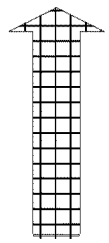
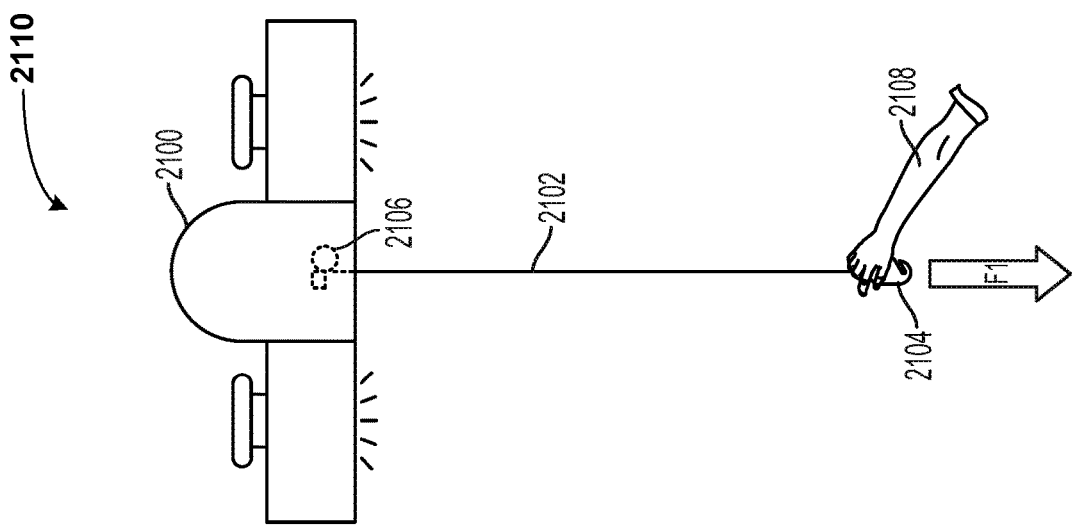
FIG. 22

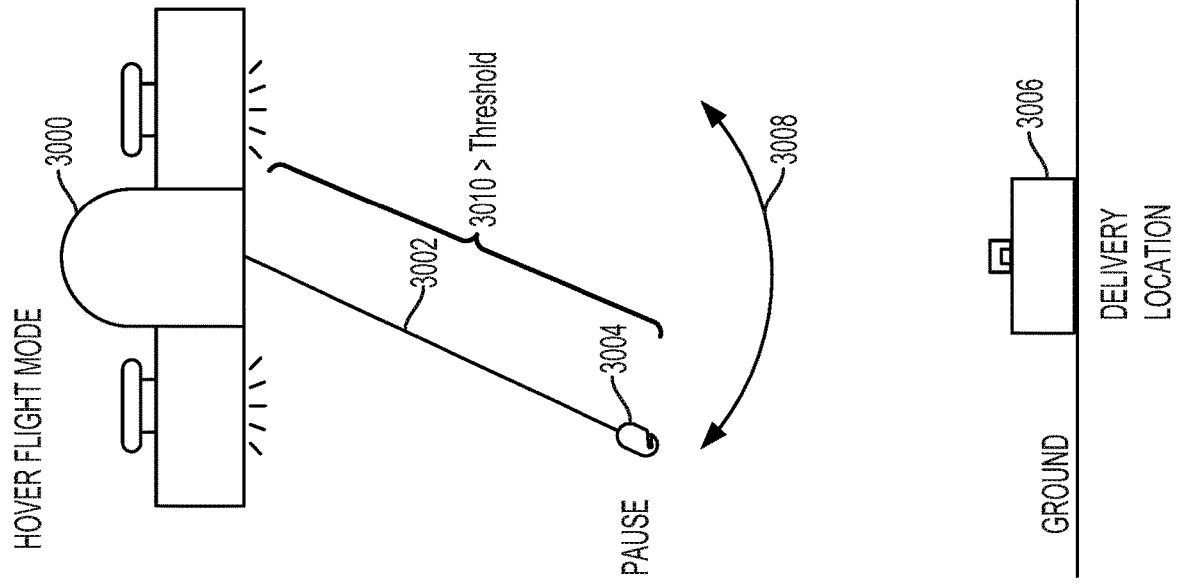

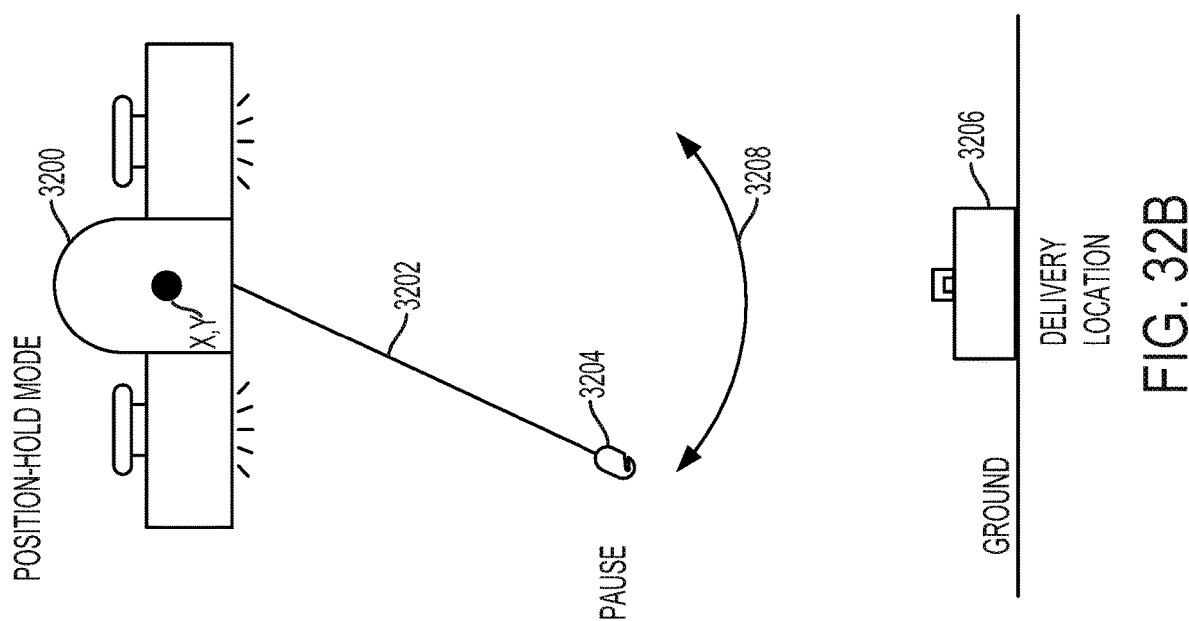

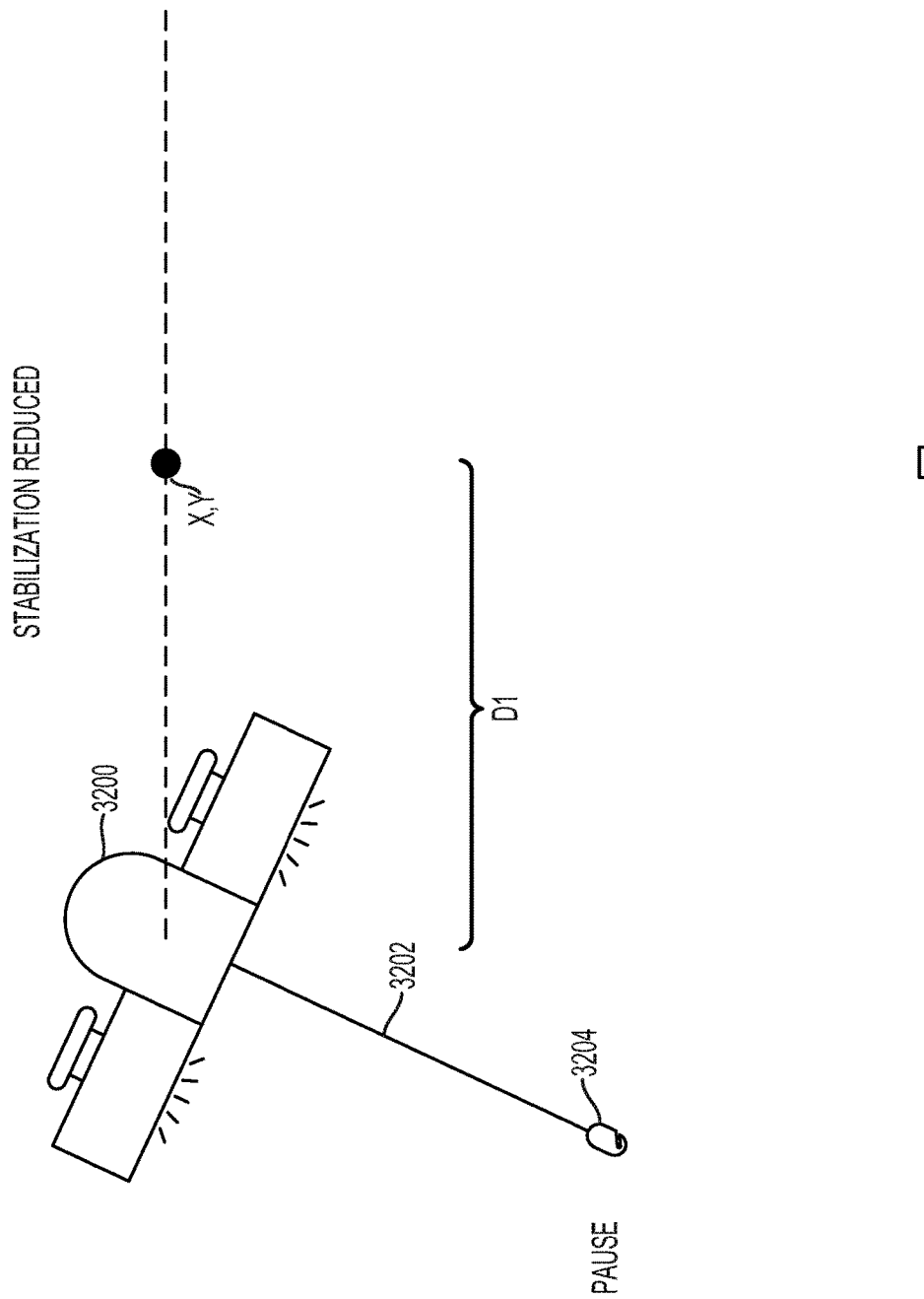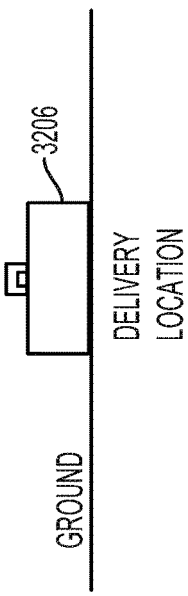
FIG. 32C

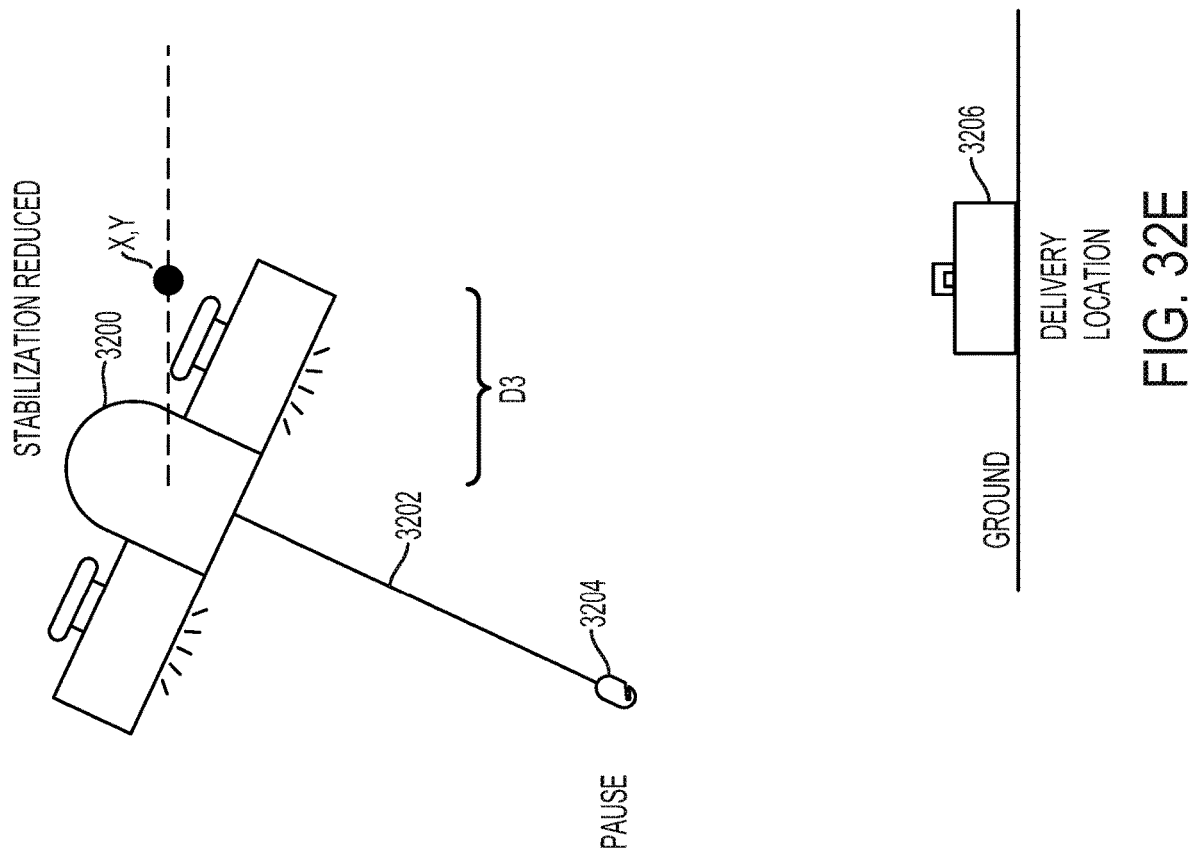

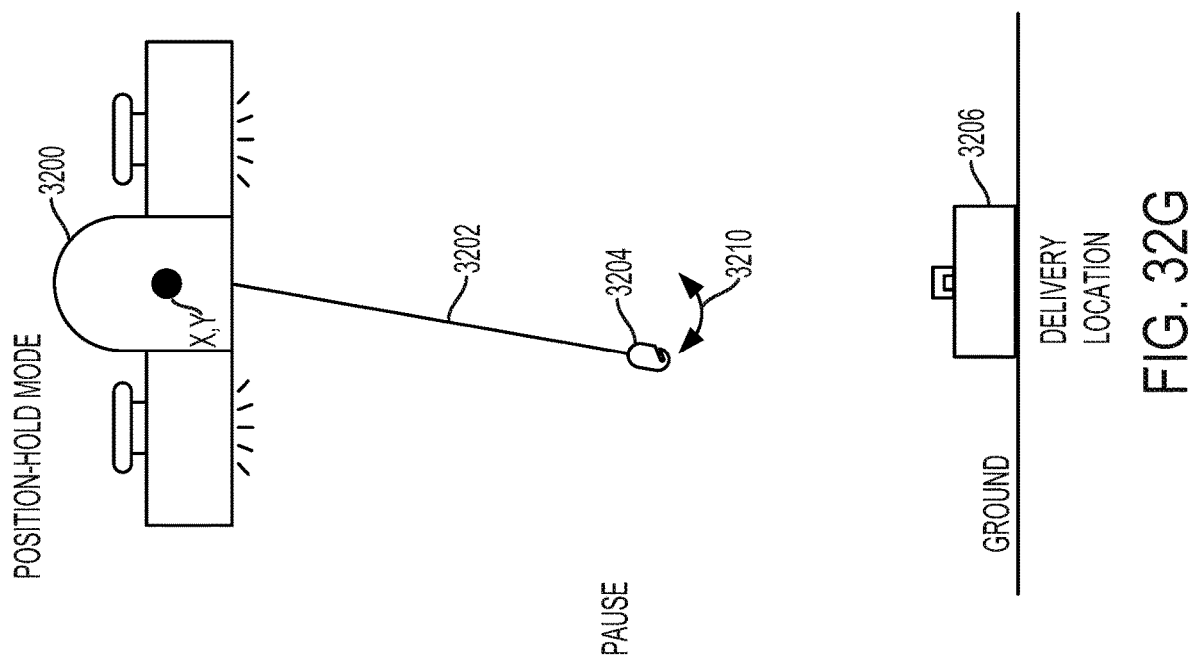

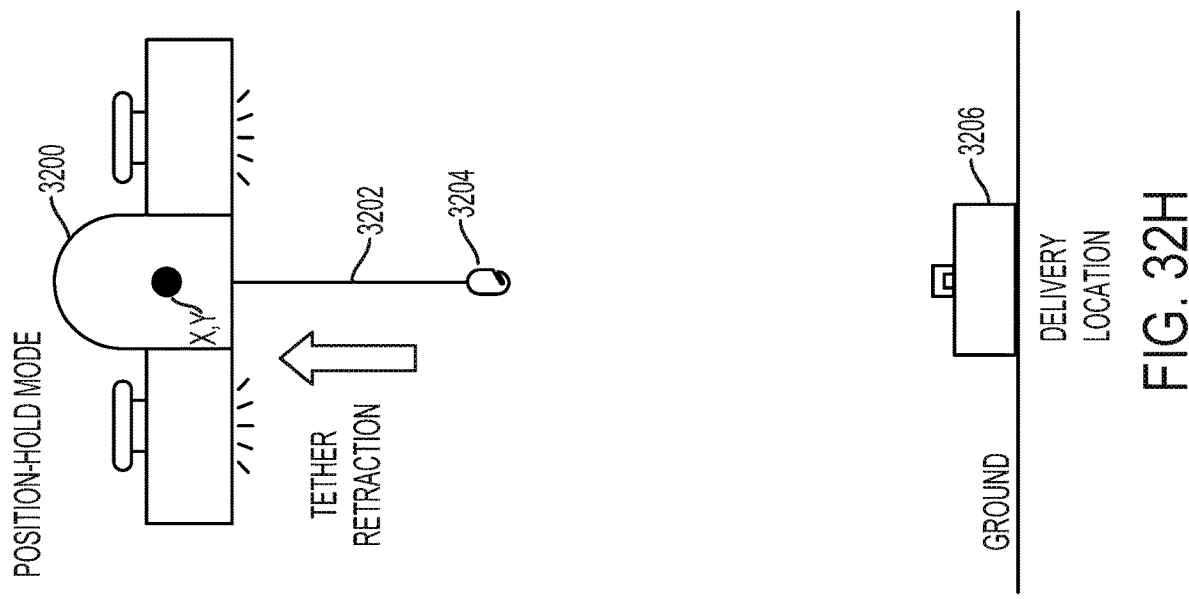

PAYLOAD COUPLING APPARATUS FOR UAV AND METHOD OF DELIVERING A PAYLOAD

CROSS REFERENCE TO RELATED APPLICATION

The present application claims priority to U.S. patent application Ser. No. 17/061,586 filed Oct. 2, 2020 and entitled "Payload Coupling Apparatus for UAV and Method of Delivering a Payload", which is a Continuation Application of U.S. patent application Ser. No. 15/389,074 filed on Dec. 12, 2016 and entitled "Payload Coupling Apparatus for UAV and Method of Delivering a Payload", which claims priority to U.S. Provisional Patent Application Ser. No. 62/385,844 filed on Sep. 9, 2016 and entitled "Payload Coupling Apparatus for UAV and Method of Delivering a Payload," and U.S. Provisional Patent Application Ser. No. 62/385,854 filed on Sep. 9, 2016 and entitled "Methods and Systems for Raising and Lowering a Payload," the entire contents of each which are herein incorporated by reference in their entirety.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

The present embodiments advantageously include a unique payload coupling apparatus. In one embodiment, the payload coupling apparatus includes a slot downwardly extending from an outer surface of the payload coupling apparatus towards a center of the payload coupling apparatus. The slot is adapted to receive a handle of a payload, and supports the payload during delivery or retrieval of the payload. Once the payload reaches the ground, the payload coupling apparatus continues to move downwardly until the handle of the payload is automatically decoupled from the slot of the payload coupling apparatus. An outer surface of a lower lip beneath the slot is undercut such that it extends less than the outer surface of the upper end of the payload coupling device above the slot to prevent the payload coupling device from reengaging with the handle of the payload during retrieval of the payload coupling device to the UAV, or with catching on power lines or tree branches. The payload coupling apparatus is advantageously a solid state design with no moving parts, providing for a less complex and more reliable way to deliver a payload to the ground.

In one aspect, a payload coupling apparatus is provided including a housing, wherein the housing is adapted for attachment to a first end of a tether, a slot extending downwardly from an outer surface of the housing towards a center of the housing thereby forming a lower lip on the housing beneath the slot, and wherein the slot is adapted to receive a handle of a payload.

In another aspect, a payload coupling apparatus is provided including a housing, a tether attachment point on the bottom of the housing, a slot vertically extending between a first inner surface of the housing and a pair of vertical, upwardly extending fingers on the housing, wherein the slot is adapted to receive a handle of a payload, an opening formed between the pair of vertical fingers, and a tether slot positioned on the first inner surface of the housing.

In yet another aspect, a method of delivering a payload from an unmanned aerial vehicle (UAV) is provided, including the steps of (i) providing a tether having a first end secured to a winch system positioned in the UAV and a second end secured to a payload coupling apparatus; (ii) positioning a handle of a payload within a slot in the payload coupling apparatus; (iii) operating the winch system to lower the payload coupling apparatus and payload until the payload engages a ground surface; and (iv) further operating the winch system to lower the payload coupling apparatus until the handle of the payload is decoupled from the slot of the payload coupling apparatus.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 is a simplified block diagram illustrating a UAV system, according to an example embodiment.

FIGS. 4A, 4B, and 4C show a payload delivery apparatus, according to example embodiments.

FIG. 6A is a perspective view of payload coupling apparatus 800, according to an example embodiment.

FIG. 6B is a side view of payload coupling apparatus 800 shown in FIG. 6A.

FIG. 6C is a front view of payload coupling apparatus 800 shown in FIGS. 6A and 6B.

FIG. 7 is a perspective view of payload coupling apparatus 800 shown in FIGS. 6A-6C, prior to insertion into a payload coupling apparatus receptacle positioned in the fuselage of a UAV.

FIG. 8 is another perspective view of payload coupling apparatus 800 shown in FIGS. 6A-6C, prior to insertion into a payload coupling apparatus receptacle positioned in the fuselage of a UAV.

FIG. 14A is a front perspective view of payload coupling apparatus 900 shown in FIGS. 13A and 13B, according to an example embodiment.

FIG. 14B is a rear perspective view of payload coupling apparatus 900 shown in FIG. 14A.

FIG. 14C is a side view of payload coupling apparatus 900 shown in FIGS. 14A and 14B.

FIG. 14D is a front view of payload coupling apparatus 900 shown in FIGS. 14A-14C.

FIG. 14E is a top view of payload coupling apparatus 900 shown in FIGS. 14A-D.

FIG. 15A is a perspective view of payload coupling apparatus 1000, according to an example embodiment.

FIG. 15B is another perspective view of payload coupling apparatus 1000 shown in FIG. 15A.

FIG. 15C is a side view of payload coupling apparatus 1000 shown in FIGS. 15A and 15B.

FIG. 15D is a top view of payload coupling apparatus 1000 shown in FIGS. 15A-C.

FIG. 15E is a cross-sectional side view of payload coupling apparatus 1000 shown in FIGS. 15A-D.

FIG. 22 illustrates a motor response based on the particular user-interaction, according to an example embodiment.

FIGS. 30A to 30D collectively illustrate use of forward flight to dampen oscillations of a payload, according to an example embodiment.

FIGS. 32A to 32H collectively illustrate use of reduction in the extent of flight stabilization to dampen oscillations of a payload, according to an example embodiment.

DETAILED DESCRIPTION

Figure 1A:
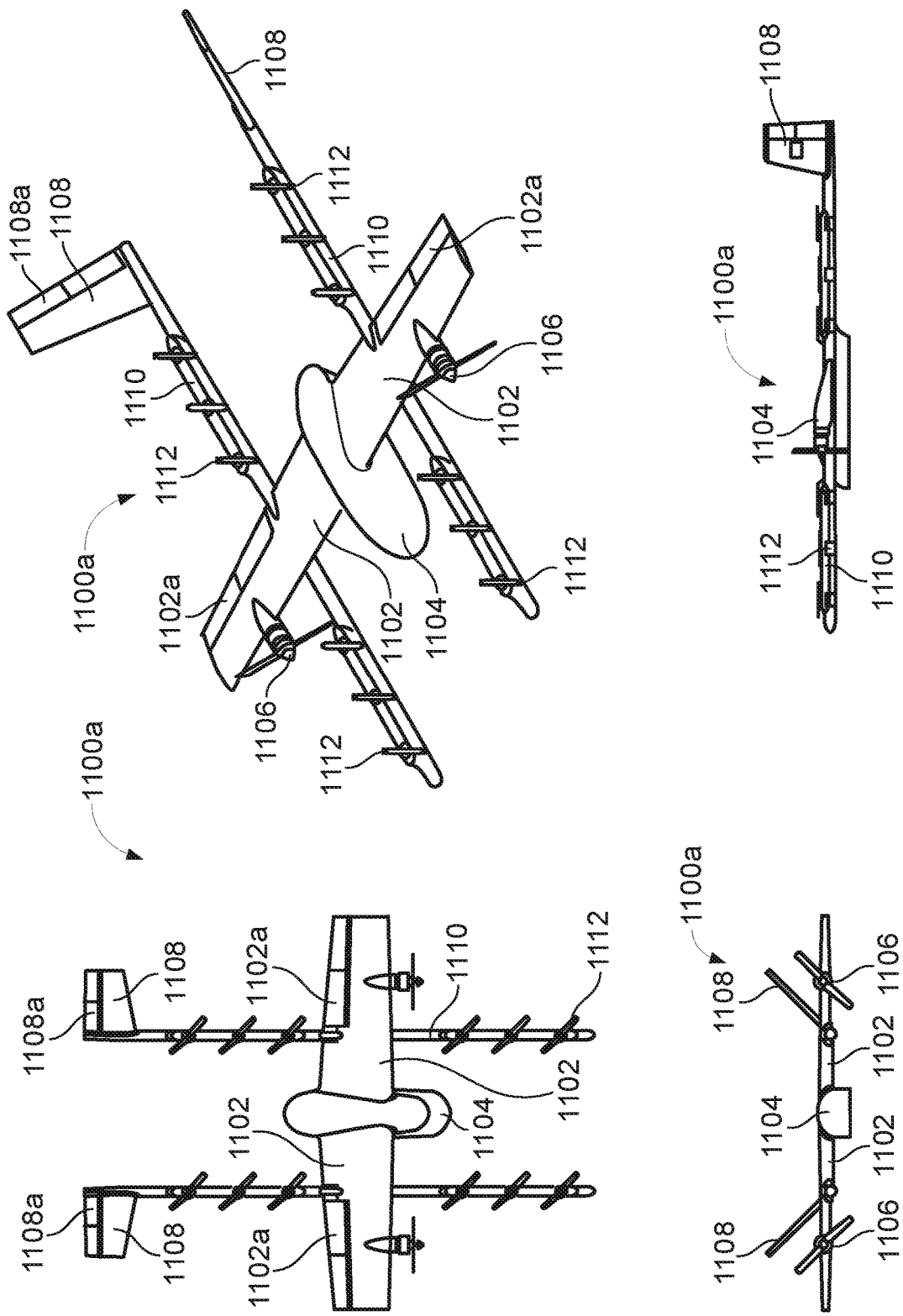
FIG. 1A is a simplified illustration of an unmanned aerial vehicle, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

The present embodiments are related to the use of unmanned aerial vehicles (UAVs) or unmanned aerial systems (UASs) (referred to collectively herein as UAVs) that are used to carry a payload to be delivered or retrieved. As examples, UAVs may be used to deliver or retrieve a payload to or from an individual or business. In operation the payload to be delivered is secured to the UAV and the UAV is then flown to the desired delivery site. Once the UAV arrives at the delivery site, the UAV may land to deliver the payload, or operate in a hover mode and lower the payload from the UAV towards the delivery site using a tether and a winch mechanism positioned with the UAV. Upon touchdown of the payload, a payload coupling apparatus, sometimes referred to as a capsule, is automatically decoupled from the payload. In addition, the payload may be retrieved while the UAV is operating in a hover mode by positioning a handle of the payload into a slot in the payload coupling apparatus.

In order to deliver the payload, the UAV may include various mechanisms to secure the payload during transport and release the payload upon delivery. Example embodiments may take the form of or otherwise relate to an apparatus for passively coupling a payload to a UAV for transport and releasing the payload upon delivery.

Such a payload coupling apparatus may include a housing coupled to the UAV by a tether that may be wound and unwound to raise and lower the housing with respect to the UAV. The housing may include one or more swing arms adapted to extend from the housing at an acute angle, forming a hook on which the payload may be attached. When the housing and attached payload are lowered from the UAV (e.g., by unwinding the tether) to a transport location below the UAV (e.g., the ground), the payload may detach from the hook.

For instance, once the payload reaches the ground, the UAV may over-run the tether by continuing to unwind the tether. As the payload remains stationary on the ground, the payload coupling apparatus may continue to lower, and a gravitational and/or an inertial force on the housing may cause the swing arm hook to detach from the payload. Upon detaching from the payload, the swing arm may be adapted to retract into the housing, and the payload coupling apparatus may ascend (e.g., by retracting the tether) toward the UAV, leaving the payload on the ground. As the payload coupling apparatus approaches the UAV, a device adapted to receive the housing may engage a cam of the swing arm causing the swing arm to extend from the housing at an acute angle, thereby forming a hook for securing another payload for delivery by the UAV.

More specifically, the present embodiments advantageously include a unique payload coupling apparatus. In one embodiment, the payload coupling apparatus includes a slot downwardly extending from an outer surface of the payload coupling apparatus towards a center of the payload coupling apparatus. The slot is adapted to receive a handle of a payload, and supports the payload during delivery or retrieval of the payload. Once the payload reaches the ground, the payload coupling apparatus continues to move downwardly until the handle of the payload is decoupled from the slot of the payload coupling apparatus. An outer surface of a lower lip beneath the slot is undercut such that it extends less than the outer surface of the upper end of the payload coupling device above the slot to prevent the payload coupling device from reengaging with the handle of the payload during retrieval of the payload coupling device to the UAV, or with catching on power lines or tree branches.

The payload coupling apparatus may include cams positioned on opposite sides of an outer surface thereof. As the payload coupling apparatus is winched back to the UAV, the cams of the payload coupling apparatus are adapted to engage with corresponding cams within the fuselage of the UAV such that when the cams engage, the payload coupling apparatus is able to rotate to orient the payload coupling apparatus in a desired position within the fuselage of the UAV.

In this regard, the payload may have a longitudinally extending top such that when the cams on the outer surface of the payload coupling apparatus engage the mating cams within the fuselage of the UAV, the longitudinally extending top is rotated into a desired position within a corresponding longitudinally extending recessed restraint slot in the bottom of the fuselage of the UAV. In other embodiments, the payload may be simply drawn into a tight positioning against the bottom of the fuselage of the UAV. In such cases, the top of the payload is not required to have a longitudinally extending top that becomes positioned within a cavity in the fuselage when the cams of the payload coupling apparatus are in engagement with mating cams within the fuselage. However, where cams are used, the cams of the payload coupling apparatus and the mating cams within a payload coupling receptacle in the fuselage may properly rotate the payload coupling apparatus to orient the payload in a desired position with respect to the fuselage.

A significant advantage of the payload coupling apparatus is that the payload coupling apparatus includes no moving parts, thereby reducing its complexity and reducing the possibility of part failure which exists when moving parts are involved in a payload coupling apparatus.

The payload may advantageously include a handle that is well-suited for positioning within the slot of the payload coupling apparatus. The handle may be constructed of a thin, flexible plastic material having a high degree of flexibility allowing for easy insertion into the slot of the payload coupling mechanism, and also for easy decoupling from the slot of the payload coupling mechanism upon landing of the payload. Handle flexibility is desirable to allow the payload and payload coupling apparatus to hang vertically straight as the handle bends to match the angle of the slot in the payload coupling apparatus. A more rigid handle makes it easier for the payload coupling apparatus to decouple from the handle upon package landing, although it the handle is too flexible the payload coupling apparatus could flip over and not release. Furthermore, it is desirable that upon decoupling, the handle should spring back to a vertical orientation which further reduces the re-hooking of the handle with the slot of the payload coupling apparatus, and to pull the package tight into the restraint when engaging within the fuselage of the UAV. It should also be noted that the handle could also be out of paper or other natural fiber, with or without plastic lamination or plastic/glass/natural fibers for extra strength. As an example, fiber reinforced paper may be used as well.

The handle may also advantageously include a pair of holes that are adapted to receive locking pins positioned within the UAV. The locking pins may have a conical shape to facilitate insertion into the holes in the handle and to pull the package into tight engagement within the recessed restraint slot in the fuselage of the UAV. Once the cams of the payload coupling apparatus are engaged with the mating cams within the fuselage, the handle is positioned in the desired orientation. A servo motor or other mechanism such as a regular electric motor with a leadscrew, or rack and pinion with limit switches to control travel (or other mechanism such as a linear actuator) may be used to move the conical locking pins through the holes in the handle to hold the handle and payload beneath tightly in position, allowing for high speed flight of the UAV when the payload is secured beneath the UAV. Alternatively, the locking pins or pin could be moved into position within a recess or opening in the payload coupling apparatus itself, rather than into holes in the handle of the of the package to secure the payload coupling apparatus and package to the UAV.

The payload may take the form of an aerodynamic tote, although the payload may have any number of different configurations and geometries. However, where a linear recessed restraint slot is positioned with the fuselage, it is desirable that the top of the payload has a generally linear shape to fit within the linear recessed restraint slot within the fuselage.

The payload coupling mechanism may have different configurations as well. For example, a tether may be attached to a bottom of the payload coupling apparatus, and is positioned within a vertically extending tether slot in the payload coupling apparatus. The vertical tether slot extends through the payload coupling apparatus that is adapted to receive a handle of a payload. In this position, the handle of the payload is positioned within the slot during delivery and retrieval. The payload coupling apparatus also includes a pair of upwardly extending fingers positioned about the slot with an opening between the pair of fingers.

When the payload touches the ground, the payload coupling apparatus continues to move downwardly and automatically is decoupled from the handle of the payload. The payload coupling apparatus may include a top half that is weighted, such that upon decoupling from the handle of the payload, the payload coupling apparatus tips over and rotates 180 degrees such that the pair of upwardly extending fingers are rotated 180 and extend downwardly. During this rotation, the tether becomes disengaged from the vertical tether slot and moves through the opening between the pair of fingers. As a result, the payload coupling is prevented from reengaging with the handle of the payload because the slots extends downwardly. In addition, the downwardly extending slot after release of the handle also helps to prevent the payload coupling apparatus from engaging with power lines or tree branches as it is winched back to the UAV, because the opening in the slot extends downwardly. Alternately, the payload coupling apparatus may be bottom weighted.

This embodiment of the payload coupling apparatus may also include cams on an outer surface thereof adapted to engage mating cams within a payload coupling apparatus receptacle within the fuselage to orient the payload coupling apparatus in a desired position within the fuselage of the UAV.

In another embodiment, a vertical slot may be positioned within the payload coupling apparatus adapted to receive a handle of a payload and to support the handle and payload during delivery and retrieval. In this embodiment, a tether slot is positioned on an exterior of the payload coupling apparatus, and the top of the payload coupling apparatus is weighted such that when the payload reaches the ground, the payload coupling apparatus continues to move downwardly until the handle is decoupled from the slot of the payload coupling apparatus. Once decoupled, the weighted payload coupling mechanism rotates 90 degrees such that the slot cannot reengage with the handle of the payload during retrieval or catch on power lines or tree branches. This embodiment of the payload coupling mechanism may include cams on an outer surface thereof adapted to engage mating cams within the fuselage of the UAV to orient the payload coupling mechanism, and the handle and payload, in a desired position.

In addition, the payload delivery system automatically aligns the package during winch up, orienting it for minimum drag along the aircraft's longitudinal axis. This alignment enables high speed forward flight after pick up. The alignment is accomplished through the shape of the payload hook and receptacle. The hook (also called capsule due to its shape) has cam features around its perimeter which always orient it in a defined direction when it engages into the cam features inside the receptacle of the fuselage of the UAV. The tips of the cam shapes on both sides of the capsule are asymmetric to prevent jamming in the 90 degree orientation. In this regard, helical cam surfaces may meet at an apex on one side of the payload coupling mechanism, and helical cam surfaces may meet at a rounded apex on the other side of the payload coupling mechanism. The hook is specifically designed so that the package hangs in the centerline of the hook, enabling alignment in both directions from 90 degrees.

Besides the alignment functionality, the payload hook also releases the package passively and automatically when the package touches the ground upon delivery. This is accomplished through the shape and angle of the hook slot and the corresponding handle on the package. The hook slides off the handle easily when the payload touches down due to the mass of the capsule and also the inertia wanting to continue moving the capsule downward past the package. The end of the hook is designed to be recessed slightly from the body of the capsule, which prevents the hook from accidentally re-attaching to the handle. After successful release, the hook gets winched back up into the aircraft. All this functionality (package alignment during pickup and passive release during delivery) may advantageously be achieved without any moving parts in this hook embodiment (referred to as a solid state design). This greatly increases reliability and reduces cost. The simple design also makes user interaction very clear and self-explanatory. In addition, the payload coupling apparatus may be bottom weighted so that it remains in a desired vertical orientation and does not tilt.

The package used for the winch up/pick up operation may be an aerodynamically shaped tote with a reinforced snap-in handle (e.g. made out of plastic or other materials such as fiber), although other shaped payloads may also be used. The handle of the payload attaches the payload to the hook of a payload coupling apparatus and its slot or opening is shaped to allow for a reliable passive release. The handle also may include two smaller openings for locking pins. The reinforcement of the handle is beneficial to transmit the torque from the capsule into the package during the alignment rotation. The package itself may be made out of cardstock and have an internal tear strip. The thin fiber tape tear strip may run along the perimeter of one package side and enables the customer to open the package easily after delivery.

When the payload is winched up and alignment is completed, the payload is pulled into a recessed restraint slot in the fuselage of the UAV, using the additional vertical travel of the capsule in its receptacle. The recessed restraint slot matches the shape of the upper portion of the payload and stabilizes it during cruise flight, preventing any excess side to side or back and forth sway motion. The recessed restraint slot is also completely recessed into the fuselage and has no protruding parts, allowing for good aerodynamics on the return flight (after the package has been delivered).

The present embodiments provide a highly integrated winch-based pickup and delivery system for UAVs. A number of significant advantages may be provided. For example, the ability to pick up and deliver packages without the need for landing is provided. The system is able to winch up a package with the aircraft hovering. There also may be no need for infrastructure at the merchant or customer in certain applications. The advantages include high mission flexibility and the potential for limited or no infrastructure installation costs, as well as increased flexibility in payload geometry.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is a simplified illustration providing various views of a UAV, according to an example embodiment. In particular, FIG. 1A shows an example of a fixed-wing UAV 1100a, which may also be referred to as an airplane, an aeroplane, a biplane, a glider, or a plane, among other possibilities. The fixed-wing UAV 1100a, as the name implies, has stationary wings 1102 that generate lift based on the wing shape and the vehicle's forward airspeed. For instance, the two wings 1102 may have an airfoil-shaped cross section to produce an aerodynamic force on the UAV 1100a.

As depicted, the fixed-wing UAV 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAV 1100a may also include landing gear (not shown) to assist with controlled take-offs and landings. In other embodiments, other types of UAVs without landing gear are also possible.

The UAV 1100a further includes propulsion units 1106 positioned on the wings 1106 (or fuselage), which can each include a motor, shaft, and propeller, for propelling the UAV 1100a. Stabilizers 1108 (or fins) may also be attached to the UAV 1110a to stabilize the UAV's yaw (turn left or right) during flight. In some embodiments, the UAV 1100a may be also be configured to function as a glider. To do so, UAV 1100a may power off its motor, propulsion units, etc., and glide for a period of time. In the UAV 1100a, a pair of rotor supports 1110 extend beneath the wings 1106, and a plurality of rotors 1112 are attached rotor supports 1110. Rotors 1110 may be used during a hover mode wherein the UAV 1110a is descending to a delivery location, or ascending following a delivery. In the example UAV 1100a, stabilizers 1108 are shown attached to the rotor supports 1110.

During flight, the UAV 1100a may control the direction and/or speed of its movement by controlling its pitch, roll, yaw, and/or altitude. For example, the stabilizers 1108 may include one or more rudders 1108a for controlling the UAV's yaw, and the wings 1102 may include one or more elevators for controlling the UAV's pitch and/or one or more ailerons 1102a for controlling the UAV's roll. As another example, increasing or decreasing the speed of all the propellers simultaneously can result in the UAV 1100a increasing or decreasing its altitude, respectively.

Figure 1B:
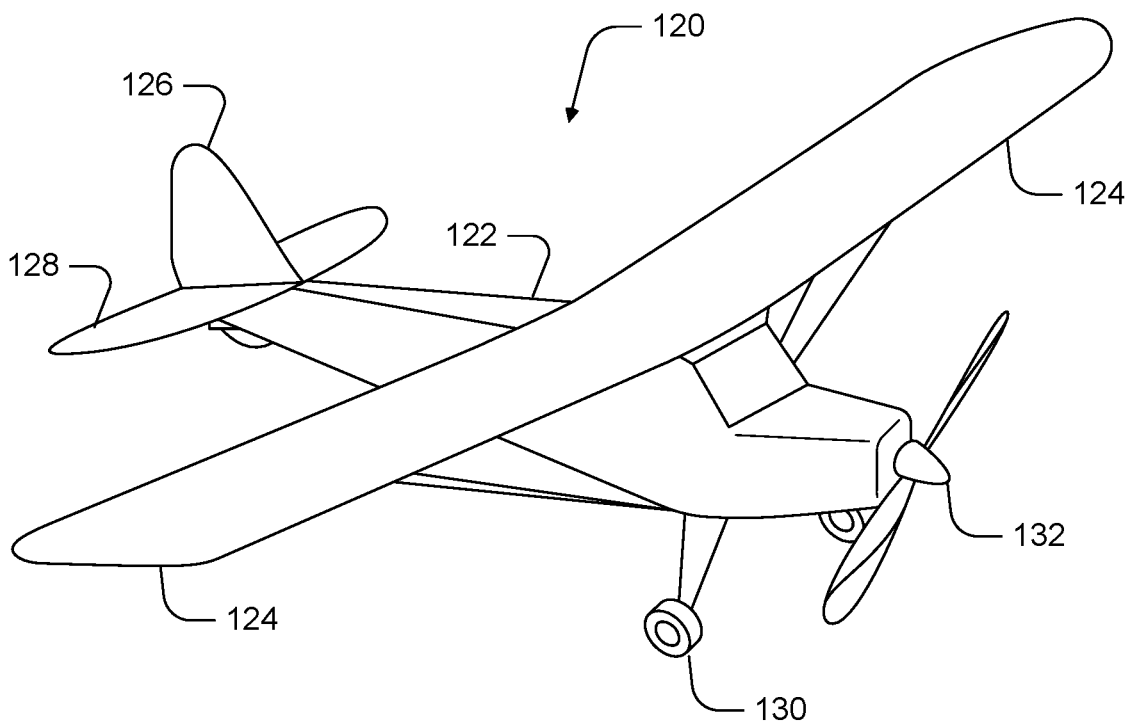
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
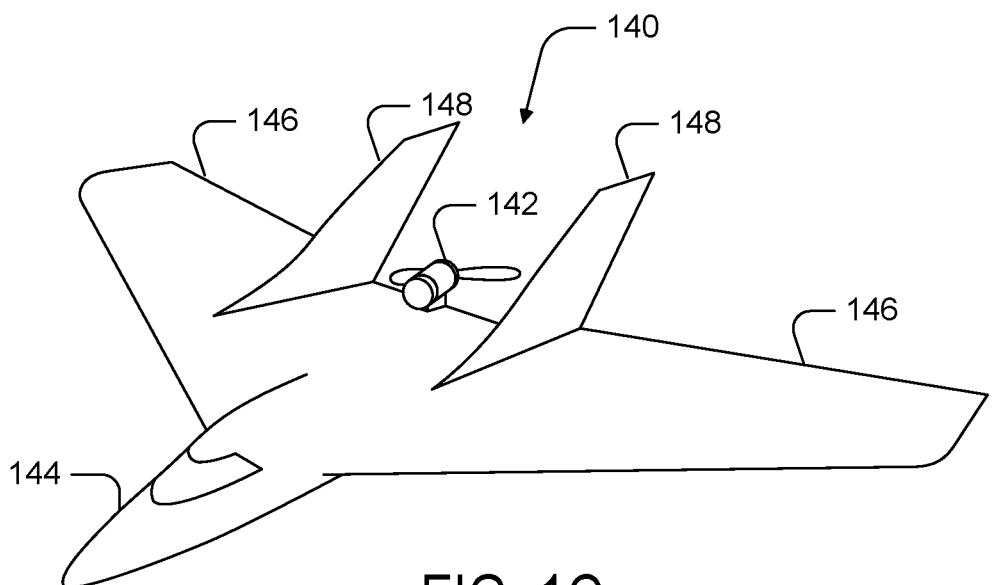
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
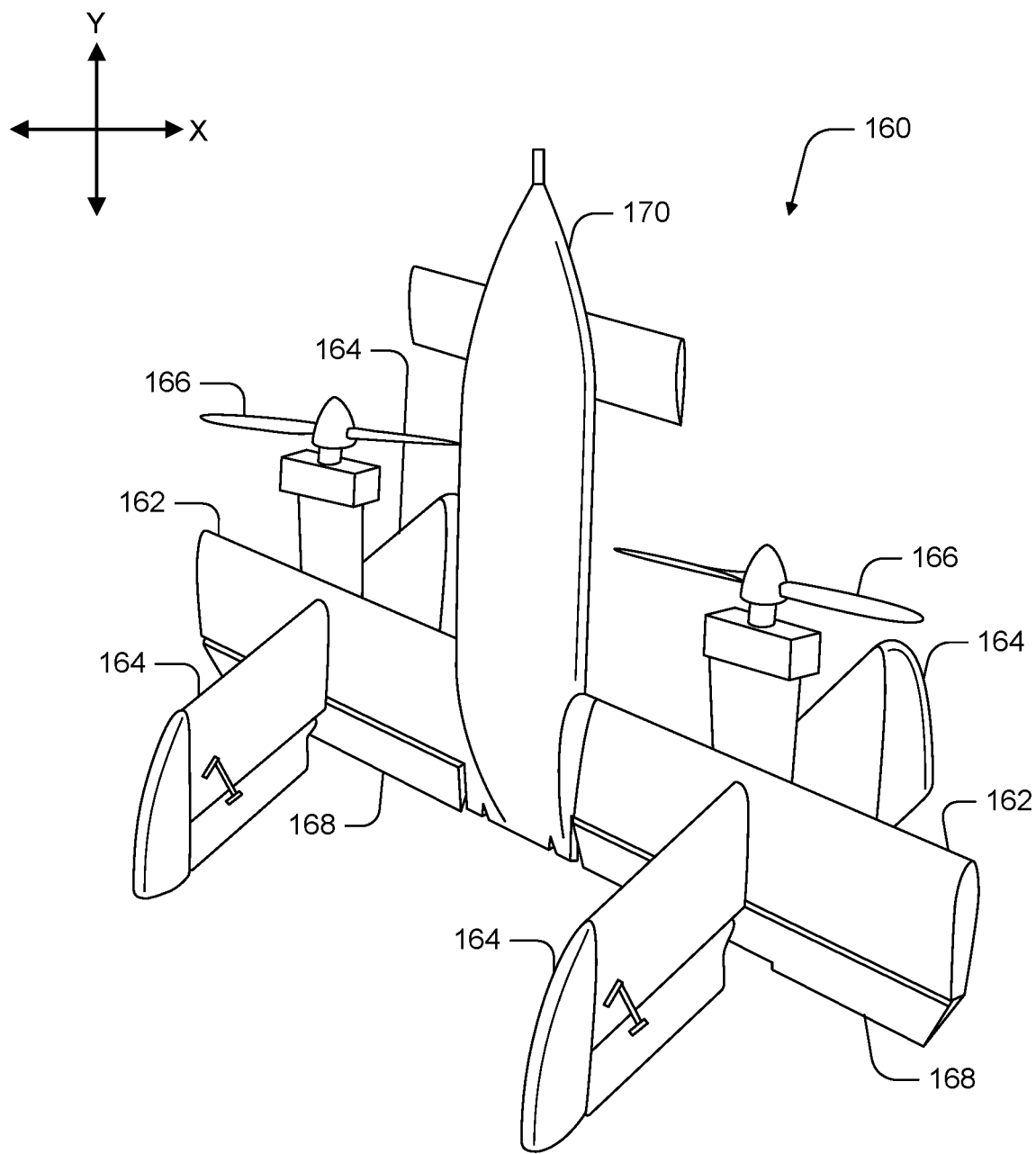
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
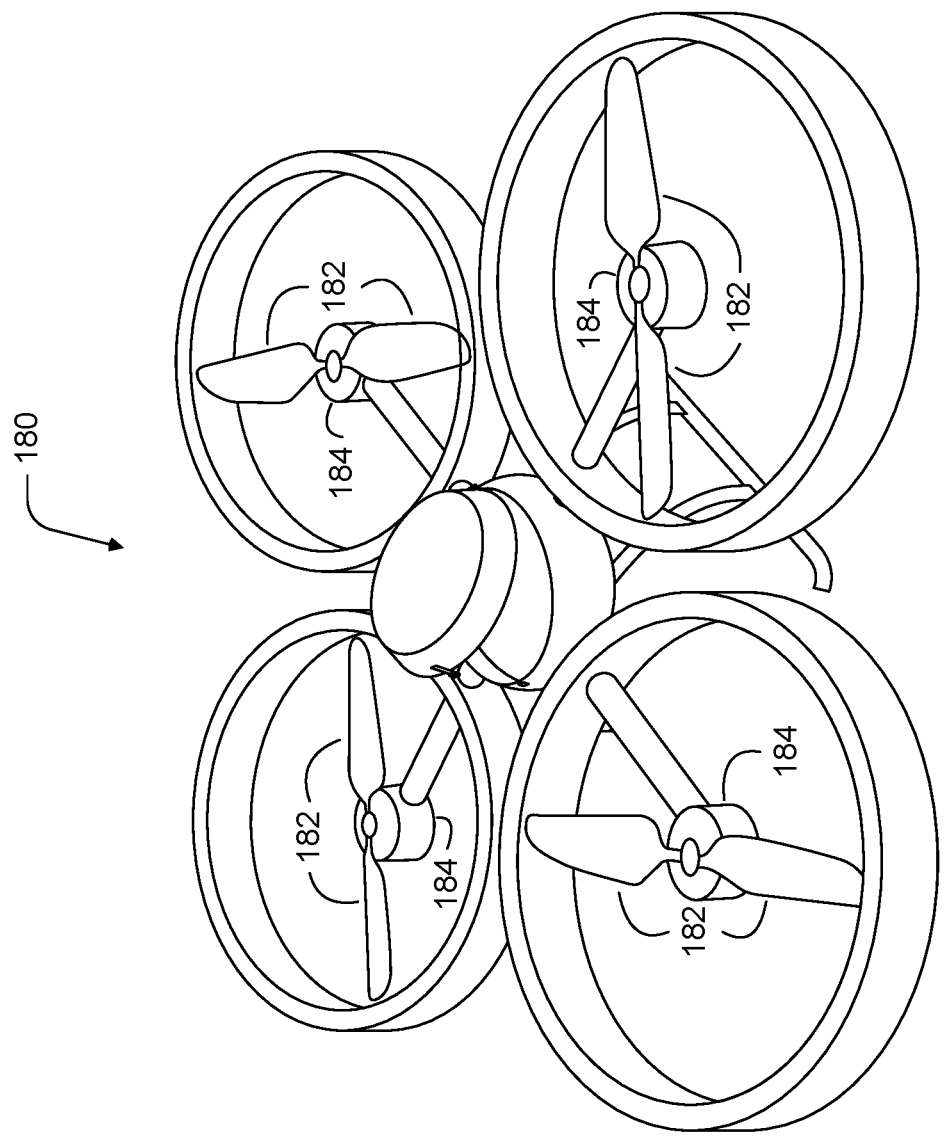
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
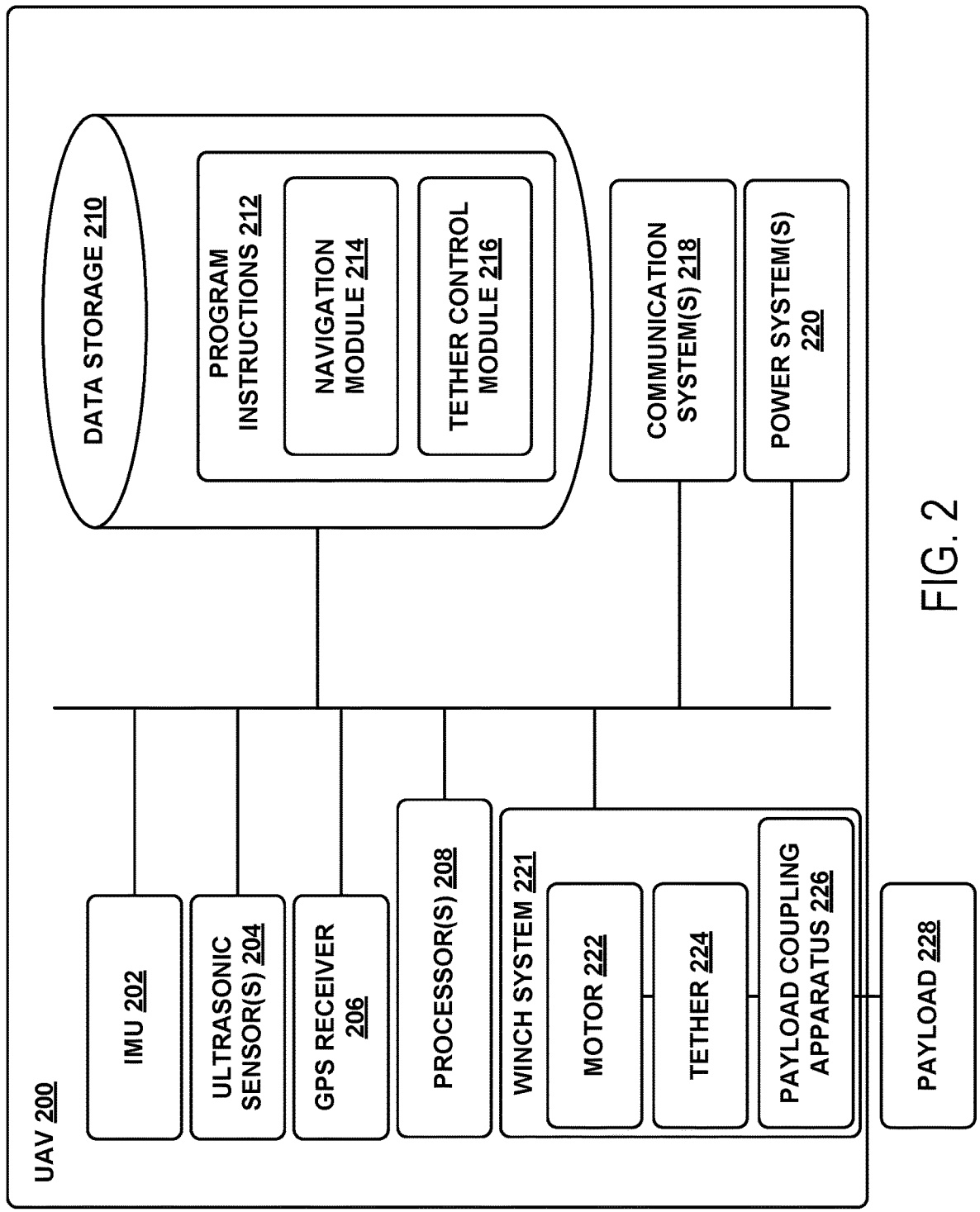
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system (s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. EXAMPLE SYSTEM AND APPARATUS FOR PAYLOAD DELIVERY

FIGS. 4A, 4B, and 4C show a UAV 400 that includes a payload delivery system 410 (could also be referred to as a payload delivery apparatus), according to an example embodiment. As shown, payload delivery system 410 for UAV 400 includes a tether 402 coupled to a spool 404, a payload latch 406, and a payload 408 coupled to the tether 402 via a payload coupling apparatus 412. The payload latch 406 can function to alternately secure payload 408 and release the payload 408 upon delivery. For instance, as shown, the payload latch 406 may take the form of one or more pins that can engage the payload coupling apparatus 412 (e.g., by sliding into one or more receiving slots in the payload coupling apparatus 412). Inserting the pins of the payload latch 406 into the payload coupling apparatus 412 may secure the payload coupling apparatus 412 within a receptacle 414 on the underside of the UAV 400, thereby preventing the payload 408 from being lowered from the UAV 400. In some embodiments, the payload latch 406 may be arranged to engage the spool 404 or the payload 408 rather than the payload coupling apparatus 412 in order to prevent the payload 408 from lowering. In other embodiments, the UAV 400 may not include the payload latch 406, and the payload delivery apparatus may be coupled directly to the UAV 400.

In some embodiments, the spool 404 can function to unwind the tether 402 such that the payload 408 can be lowered to the ground with the tether 402 and the payload coupling apparatus 412 from UAV 400. The payload 408 may itself be an item for delivery, and may be housed within (or otherwise incorporate) a parcel, container, or other structure that is configured to interface with the payload latch 406. In practice, the payload delivery system 410 of UAV 400 may function to autonomously lower payload 408 to the ground in a controlled manner to facilitate delivery of the payload 408 on the ground while the UAV 400 hovers above.

As shown in FIG. 4A, the payload latch 406 may be in a closed position (e.g., pins engaging the payload coupling apparatus 412) to hold the payload 408 against or close to the bottom of the UAV 400, or even partially or completely inside the UAV 400, during flight from a launch site to a target location 420. The target location 420 may be a point in space directly above a desired delivery location. Then, when the UAV 400 reaches the target location 420, the UAV's control system (e.g., the tether control module 216 of FIG. 2) may toggle the payload latch 406 to an open position (e.g., disengaging the pins from the payload coupling apparatus 412), thereby allowing the payload 408 to be lowered from the UAV 400. The control system may further operate the spool 404 (e.g., by controlling the motor 222 of FIG. 2) such that the payload 408, secured to the tether 402 by a payload coupling apparatus 412, is lowered to the ground, as shown in FIG. 4B.

Once the payload 408 reaches the ground, the control system may continue operating the spool 404 to lower the tether 402, causing over-run of the tether 402. During over-run of the tether 402, the payload coupling apparatus 412 may continue to lower as the payload 408 remains stationary on the ground. The downward momentum and/or gravitational forces on the payload coupling apparatus 412 may cause the payload 408 to detach from the payload coupling apparatus 412 (e.g., by sliding off a hook of the payload coupling apparatus 412). After releasing payload 408, the control system may operate the spool 404 to retract the tether 402 and the payload coupling apparatus 412 toward the UAV 400. Once the payload coupling apparatus reaches or nears the UAV 400, the control system may operate the spool 404 to pull the payload coupling apparatus 412 into the receptacle 414, and the control system may toggle the payload latch 406 to the closed position, as shown in FIG. 4C.

In some embodiments, when lowering the payload 408 from the UAV 400, the control system may detect when the payload 408 and/or the payload coupling apparatus 412 has been lowered to be at or near the ground based on an unwound length of the tether 402 from the spool 404. Similar techniques may be used to determine when the payload coupling apparatus 412 is at or near the UAV 400 when retracting the tether 402. As noted above, the UAV 400 may include an encoder for providing data indicative of the rotation of the spool 404. Based on data from the encoder, the control system may determine how many rotations the spool 404 has undergone and, based on the number of rotations, determine a length of the tether 402 that is unwound from the spool 404. For instance, the control system may determine an unwound length of the tether 402 by multiplying the number of rotations of the spool 404 by the circumference of the tether 402 wrapped around the spool 404. In some embodiments, such as when the spool 404 is narrow or when the tether 402 has a large diameter, the circumference of the tether 402 on the spool 404 may vary as the tether 402 winds or unwinds from the tether, and so the control system may be configured to account for these variations when determining the unwound tether length.

In other embodiments, the control system may use various types of data, and various techniques, to determine when the payload 408 and/or payload coupling apparatus 412 have lowered to be at or near the ground. Further, the data that is used to determine when the payload 408 is at or near the ground may be provided by sensors on UAV 400, sensors on the payload coupling apparatus 412, and/or other data sources that provide data to the control system.

In some embodiments, the control system itself may be situated on the payload coupling apparatus 412 and/or on the UAV 400. For example, the payload coupling apparatus 412 may include logic module(s) implemented via hardware, software, and/or firmware that cause the UAV 400 to function as described herein, and the UAV 400 may include logic module(s) that communicate with the payload coupling apparatus 412 to cause the UAV 400 to perform functions described herein.

Figure 5A:
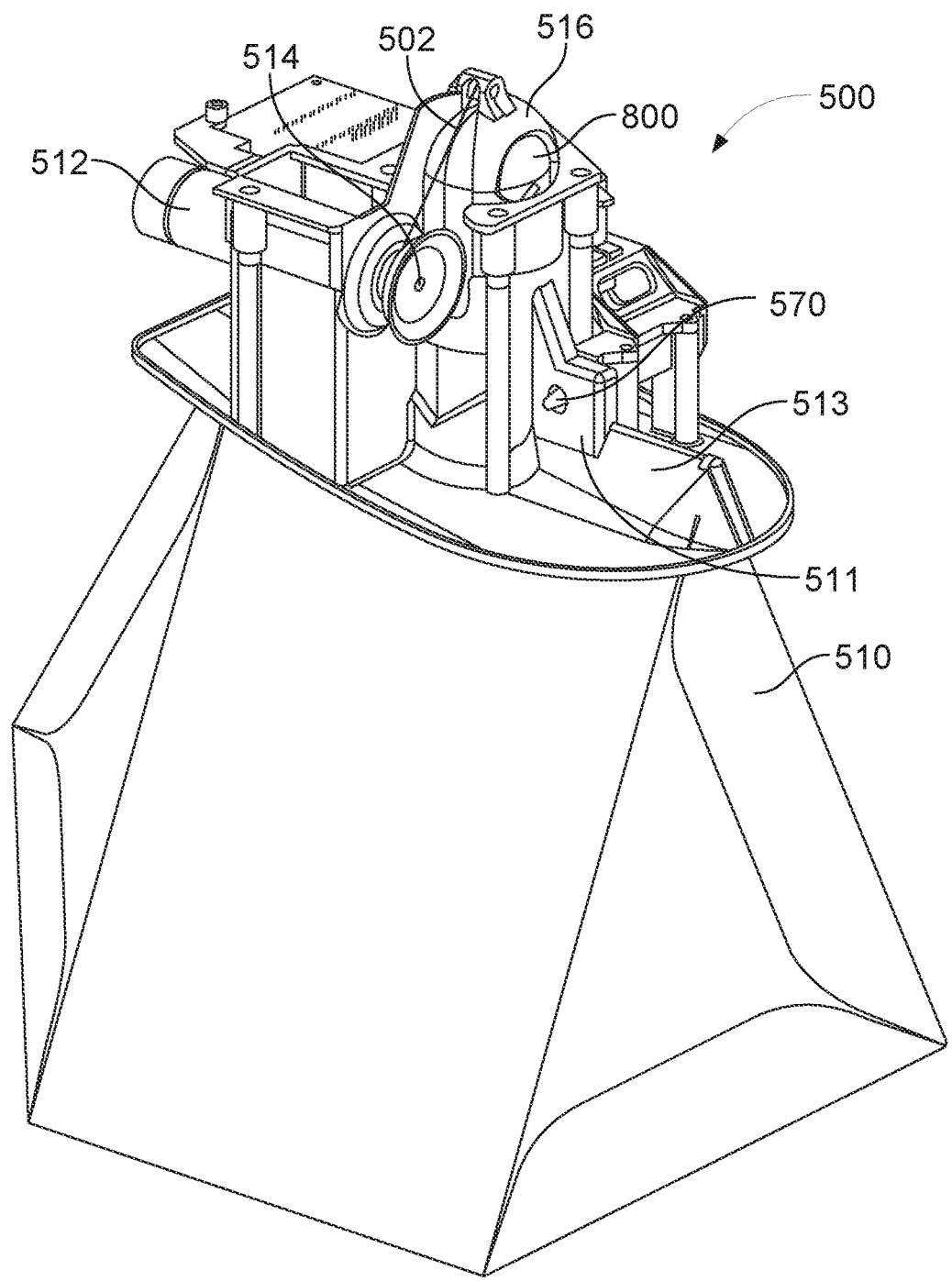
FIG. 5A shows a perspective view of a payload delivery apparatus 500 including payload 510, according to an example embodiment.

FIG. 5A shows a perspective view of a payload delivery apparatus 500 including payload 510, according to an example embodiment. The payload delivery apparatus 500 is positioned within a fuselage of a UAV (not shown) and includes a winch 514 powered by motor 512, and a tether 502 spooled onto winch 514. The tether 502 is attached to a payload coupling apparatus 800 positioned within a payload coupling apparatus receptacle 516 positioned within the fuselage of the UAV (not shown). A payload 510 is secured to the payload coupling apparatus 800. In this embodiment a top portion 513 of payload 510 is secured within the fuselage of the UAV. A locking pin 570 is shown extending through handle 511 attached to payload 510 to positively secure the payload beneath the UAV during high speed flight.

Figure 5B:
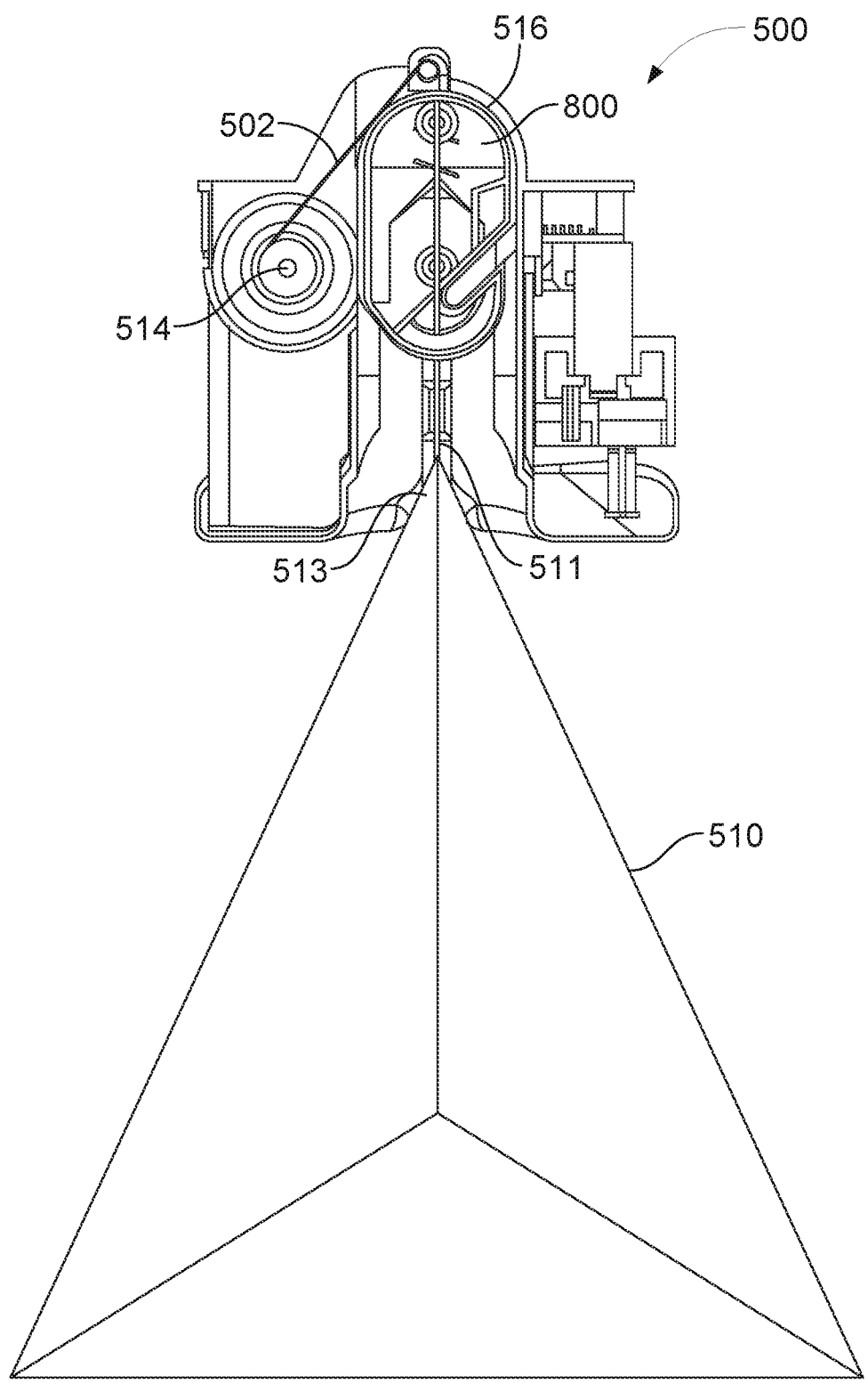
FIG. 5B is a cross-sectional side view of payload delivery apparatus 500 and payload 510 shown in FIG. 5A.

FIG. 5B is a cross-sectional side view of payload delivery apparatus 500 and payload 510 shown in FIG. 5A. In this view, the payload coupling apparatus is shown tightly positioned with the payload coupling apparatus receptacle 516. Tether 502 extends from winch 514 and is attached to the top of payload coupling apparatus 800. Top portion 513 of payload 510 is shown positioned within the fuselage of the UAV (not shown) along with handle 511.

Figure 5C:
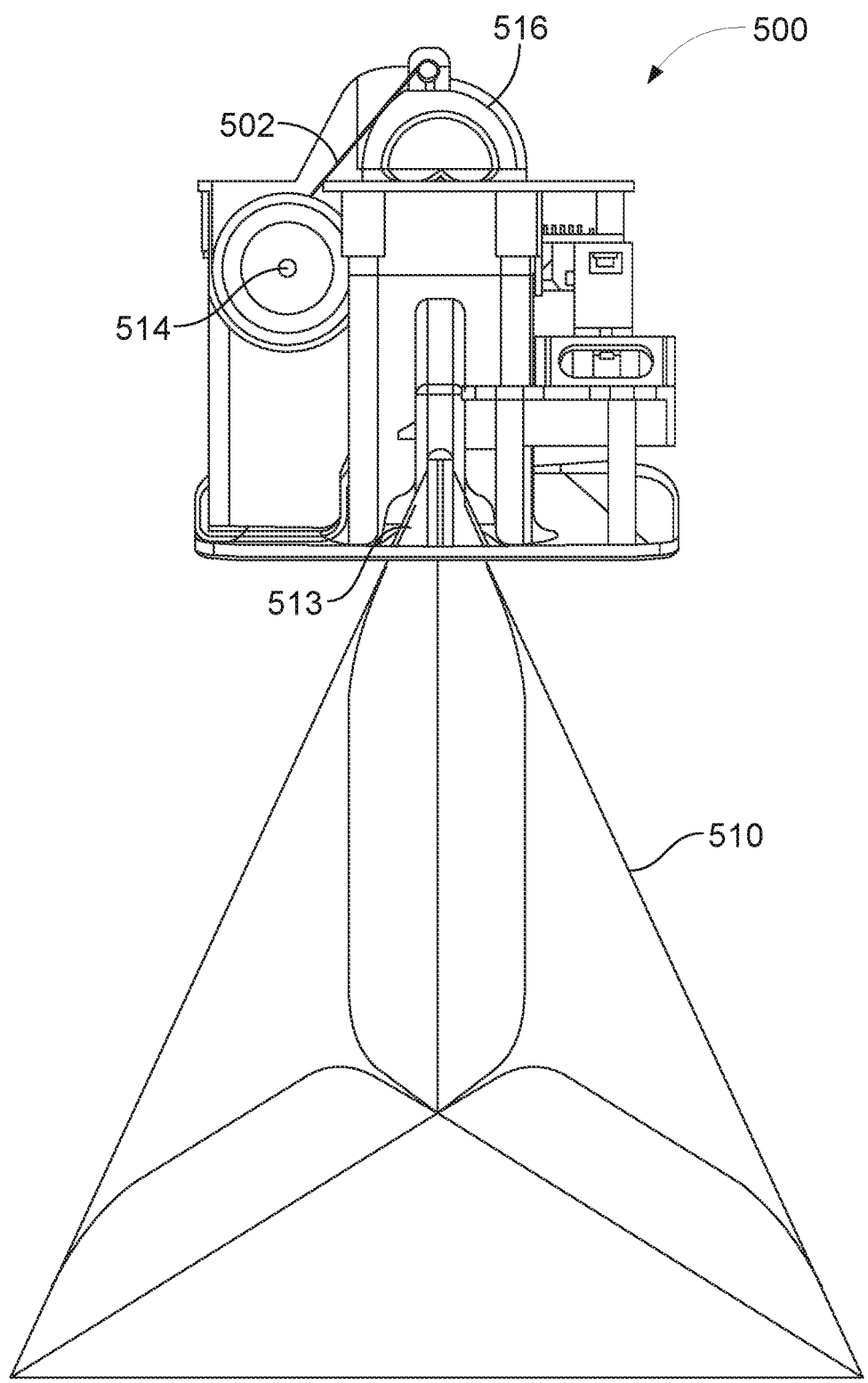
FIG. 5C is a side view of payload delivery apparatus 500 and payload 510 shown in FIGS. 5A and 5B.

FIG. 5C is a side view of payload delivery apparatus 500 and payload 510 shown in FIGS. 5A and 5B. The top portion 513 of payload 510 is shown positioned within the fuselage of the UAV. Winch 514 has been used to wind in tether 502 to position the payload coupling apparatus within payload coupling apparatus receptacle 516. FIGS. 5A-C disclose payload 510 taking the shape of an aerodynamic hexagonally-shaped tote, where the base and side walls are six-sided hexagons and the tote includes generally pointed front and rear surfaces formed at the intersections of the side walls and base of the tote providing an aerodynamic shape. VI. Example Capsules, Receptacle, and Package/Tote FIG. 6A is a perspective view of payload coupling apparatus 800, according to an example embodiment. Payload coupling apparatus 800 includes tether mounting point 802, and a slot 808 to position a handle of a payload handle in. Lower lip, or hook, 806 is positioned beneath slot 808. Also included is an outer protrusion 804 having helical cam surfaces 804a and 804b that are adapted to mate with corresponding cam mating surfaces within a payload coupling apparatus receptacle positioned with a fuselage of a UAV.

FIG. 6B is a side view of payload coupling apparatus 800 shown in FIG. 6A. Slot 808 is shown positioned above lower lip, or hook, 806. As shown lower lip or hook 806 has an outer surface 806a that is undercut such that it does not extend as far outwardly as an outer surface above slot 805 so that the lower lip or hook 806 will not reengage with the handle of the payload after it has been decoupled, or will not get engaged with power lines or tree branches during retrieval to the UAV.

FIG. 6C is a front view of payload coupling apparatus 800 shown in FIGS. 6A and 6B. Lower lip or hook 806 is shown positioned beneath slot 808 that is adapted for securing a handle of a payload.

FIG. 7 is a perspective view of payload coupling apparatus 800 shown in FIGS. 6A-6C, prior to insertion into a payload coupling apparatus receptacle 516 positioned in the fuselage 550 of a UAV. As noted previously payload coupling apparatus 800 includes a slot 808 positioned above lower lip or hook 806, adapted to receive a handle of a payload. The fuselage 550 of the payload delivery system 500 includes a payload coupling apparatus receptacle 516 positioned within the fuselage 550 of the UAV. The payload coupling apparatus 800 includes an outer protrusion 810 have helical cammed surfaces 810a and 810b that meet in a rounded apex. The helical cammed surfaces 810a and 810b are adapted to mate with surfaces 530a and 530b of an inward protrusion 530 positioned within the payload coupling apparatus receptacle 516 positioned within fuselage 550 of the UAV. Also included is a longitudinal recessed restraint slot 540 positioned within the fuselage 550 of the UAV that is adapted to receive and restrain a top portion of a payload (not shown). As the payload coupling apparatus 800 is pulled into to the payload coupling apparatus receptacle 516, the cammed surfaces 810a and 810b of outer protrusion 810 engage with the cammed surfaces 530a and 530b within the payload coupling apparatus receptacle 516 and the payload coupling apparatus 800 is rotated into a desired alignment within the fuselage 550 of the UAV.

FIG. 8 is another perspective view of an opposite side of payload coupling apparatus 800 shown in FIGS. 6A-6C, prior to insertion into a payload coupling apparatus receptacle 516 positioned in the fuselage 550 of a UAV. As shown, payload coupling apparatus 800 include a lower lip or hook 806. An outer protrusion 804 is shown extending outwardly from the payload coupling apparatus having helical cammed surfaces 804a and 804b adapted to engage and mate with cammed surfaces 530a and 530b of inner protrusion 530 positioned within payload coupling apparatus receptacle 516 positioned within fuselage 550 of payload delivery system 500. It should be noted that the cammed surfaces 804a and 804b meet at a sharp apex, which is asymmetrical with the rounded or blunt apex of cammed surfaces 810a and 810b shown in FIG. 7. In this manner, the rounded or blunt apex of cammed surfaces 810a and 810b prevent possible jamming of the payload coupling apparatus 800 as the cammed surfaces engage the cammed surfaces 530a and 530b positioned within the payload coupling apparatus receptacle 516 positioned within fuselage 550 of the UAV. In particular, cammed surfaces 804a and 804b are positioned slightly higher than the rounded or blunt apex of cammed surfaces 810a and 810b. As a result, the sharper tip of cammed surfaces 804a and 804b engages the cammed surfaces 530a and 530b within the payload coupling apparatus receptacle 516 positioned within the fuselage 550 of payload delivery system 500, thereby initiating rotation of the payload coupling apparatus 800 slightly before the rounded or blunt apex of cammed surfaces 810a and 810b engage the corresponding cammed surfaces within the payload coupling apparatus receptacle 516. In this manner, the case where both apexes (or tips) of the cammed surfaces on the payload coupling apparatus end up on the same side of the receiving cams within the payload coupling apparatus receptacle is prevented. This scenario results in a prevention of the jamming of the payload coupling apparatus within the receptacle.

Figure 9:
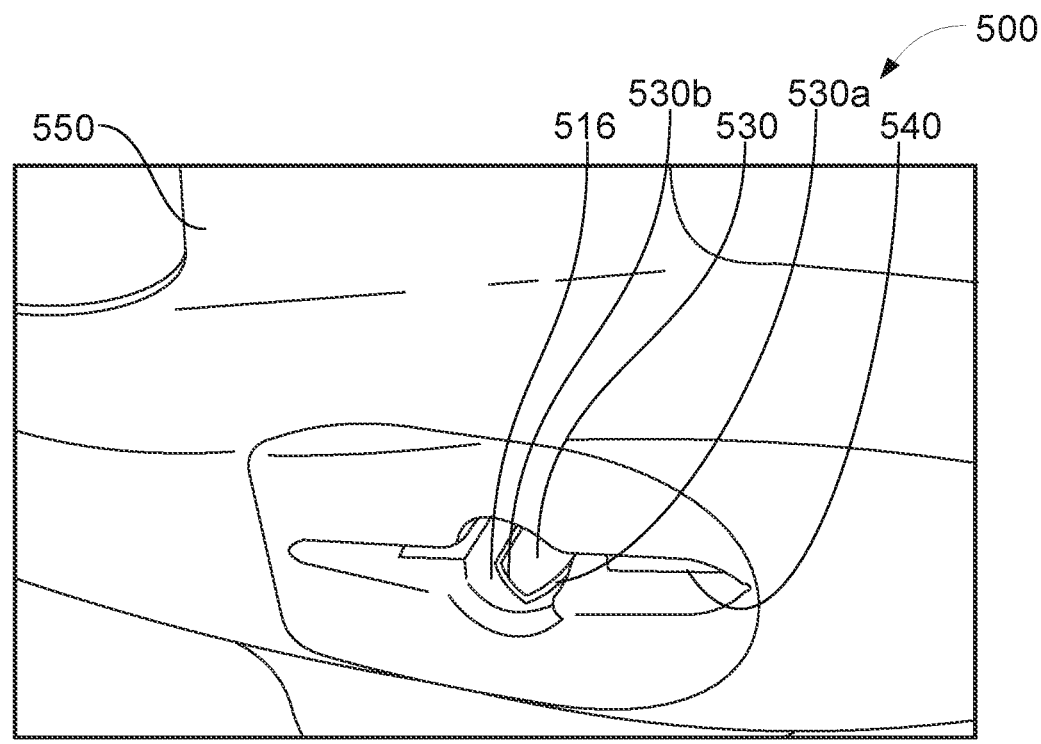
FIG. 9 shows a perspective view of a recessed restraint slot and payload coupling apparatus receptacle positioned in a fuselage of a UAV.

FIG. 9 shows a perspective view of a recessed restraint slot and payload coupling apparatus receptacle positioned in a fuselage of a UAV. In particular, payload delivery system 500 includes a fuselage 550 having a payload coupling apparatus receptacle 516 therein that includes inward protrusion 530 having cammed surfaces 530a and 530b that are adapted to mate with corresponding cammed surfaces on a payload coupling apparatus (not shown). Also included is a longitudinally extending recessed restrained slot 540 into which a top portion of a payload is adapted to be positioned and secured within the fuselage 550.

Figure 10A:
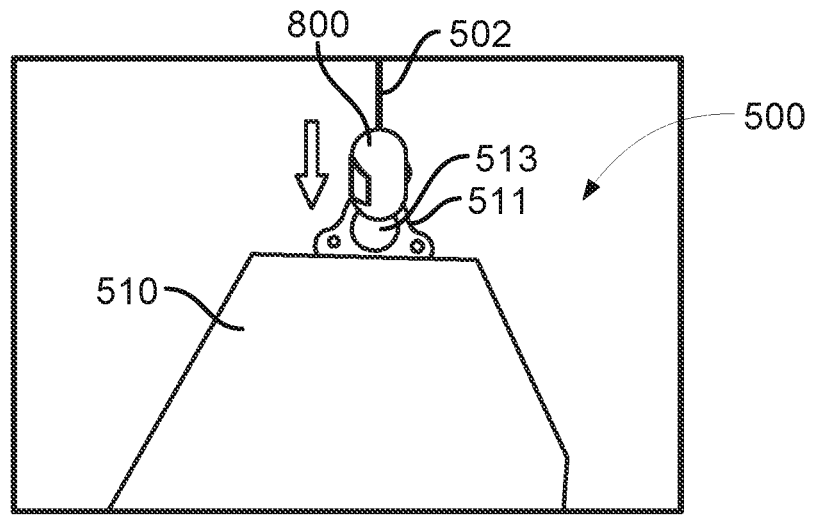
FIG. 10A shows a side view of a payload delivery apparatus 500 with a handle 511 of payload 510 secured within a payload coupling apparatus 800 as the payload 510 moves downwardly prior to touching down for delivery.

FIG. 10A shows a side view of a payload delivery apparatus 500 with a handle 511 of payload 510 secured within a payload coupling apparatus 800 as the payload 510 moves downwardly prior to touching down for delivery. Prior to payload touchdown, the handle 511 of payload 510 includes a hole 513 through which a lower lip or hook of payload coupling apparatus 800 extends. The handle sits within a slot of the payload coupling apparatus 800 that is suspended from tether 502 of payload delivery system 500 during descent of the payload 510 to a landing site.

Figure 10B:
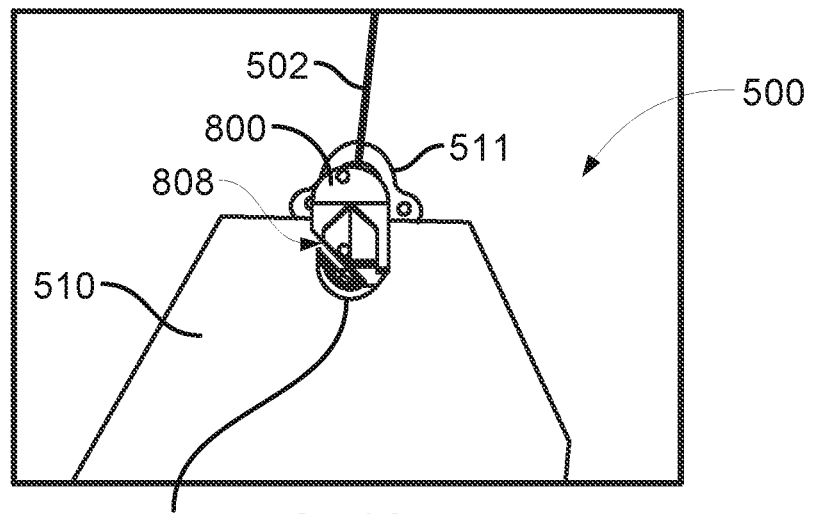
FIG. 10B shows a side view of payload delivery apparatus 500 after payload 510 has landed on the ground showing payload coupling apparatus 800 decoupled from handle 511 of payload 510.

FIG. 10B shows a side view of payload delivery apparatus 500 after payload 510 has landed on the ground showing payload coupling apparatus 800 decoupled from handle 511 of payload 510. Once the payload 510 touches the ground, the payload coupling apparatus 800 continues to move downwardly (as the winch further unwinds) through inertia or gravity and decouples the lower lip or hook 808 of the payload coupling apparatus 800 from handle 511 of payload 510. The payload coupling apparatus 800 remains suspended from tether 502, and can be winched back up to the payload coupling receptacle of the UAV.

Figure 10C:
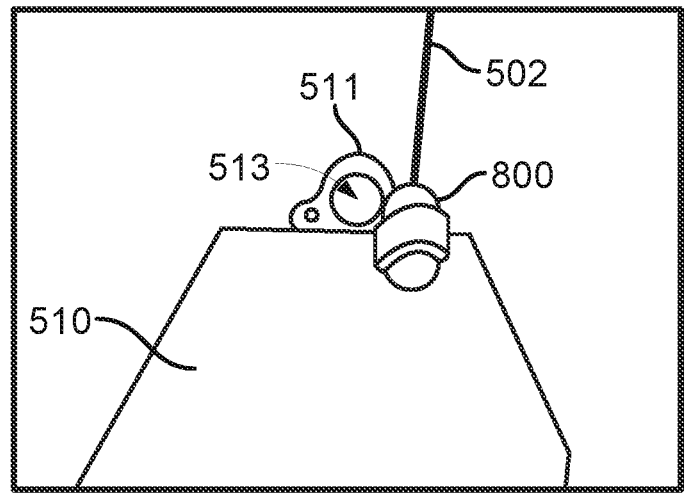
FIG. 10C shows a side view of payload delivery apparatus 500 with payload coupling apparatus 800 moving away from handle 511 of payload 510.

FIG. 10C shows a side view of payload delivery apparatus 500 with payload coupling apparatus 800 moving away from handle 511 of payload 510. Here the payload coupling apparatus 800 is completely separated from the hole 513 of handle 511 of payload 510. Tether 502 may be used to winch the payload coupling apparatus back to the payload coupling apparatus receptacle positioned in the fuselage of the UAV.

Figure 11:
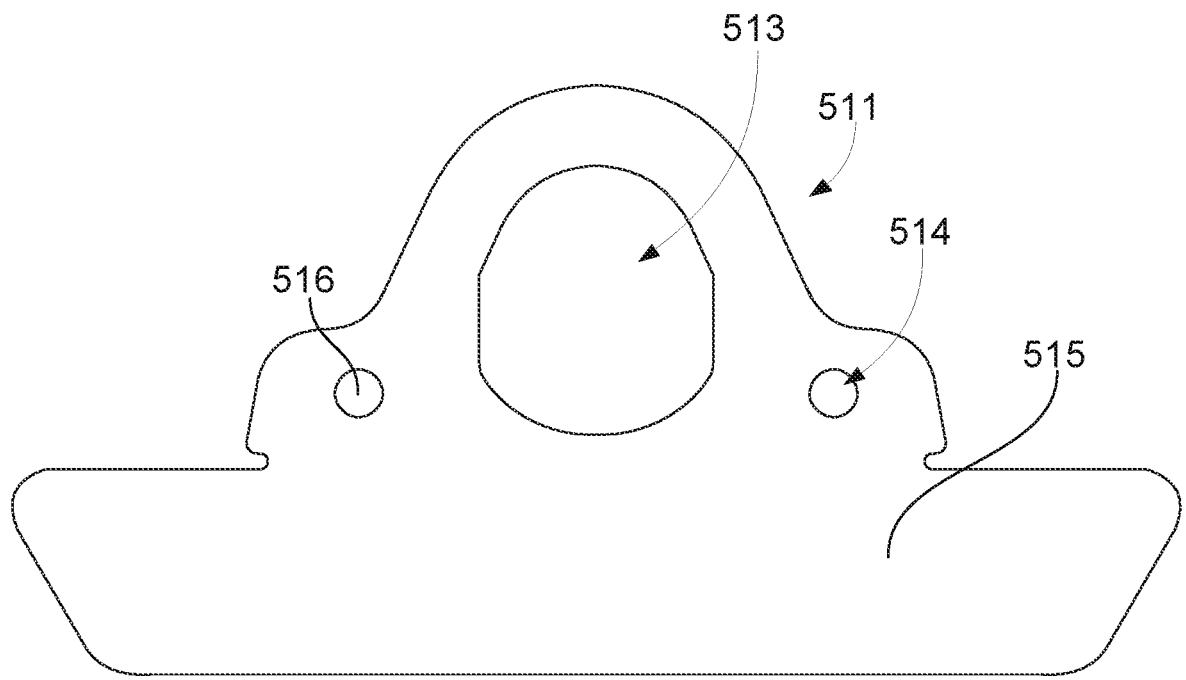
FIG. 11 is a side view of handle 511 of payload 510.

FIG. 11 is a side view of handle 511 of payload 510. The handle 511 includes a hole 513 through which the lower lip or hook of a payload coupling apparatus extends through to suspend the payload during delivery. The handle 511 includes a lower portion 515 that is secured to the top portion of a payload. Also included are holes 514 and 516 through which locking pins positioned within the fuselage of a UAV may extend to secure the handle and payload in a secure position during high speed forward flight to a delivery location. The handle may be comprised of a thin, flexible plastic material that is flexible and provides sufficient strength to suspend the payload beneath a UAV during forward flight to a delivery site, and during delivery and/or retrieval of a payload. In practice, the handle may be bent to position the handle within a slot of a payload coupling apparatus. The handle 511 also has sufficient strength to withstand the torque during rotation of the payload coupling apparatus into the desired orientation within the payload coupling apparatus receptacle, and rotation of the top portion of the payload into position with the recessed restraint slot.

Figure 12:
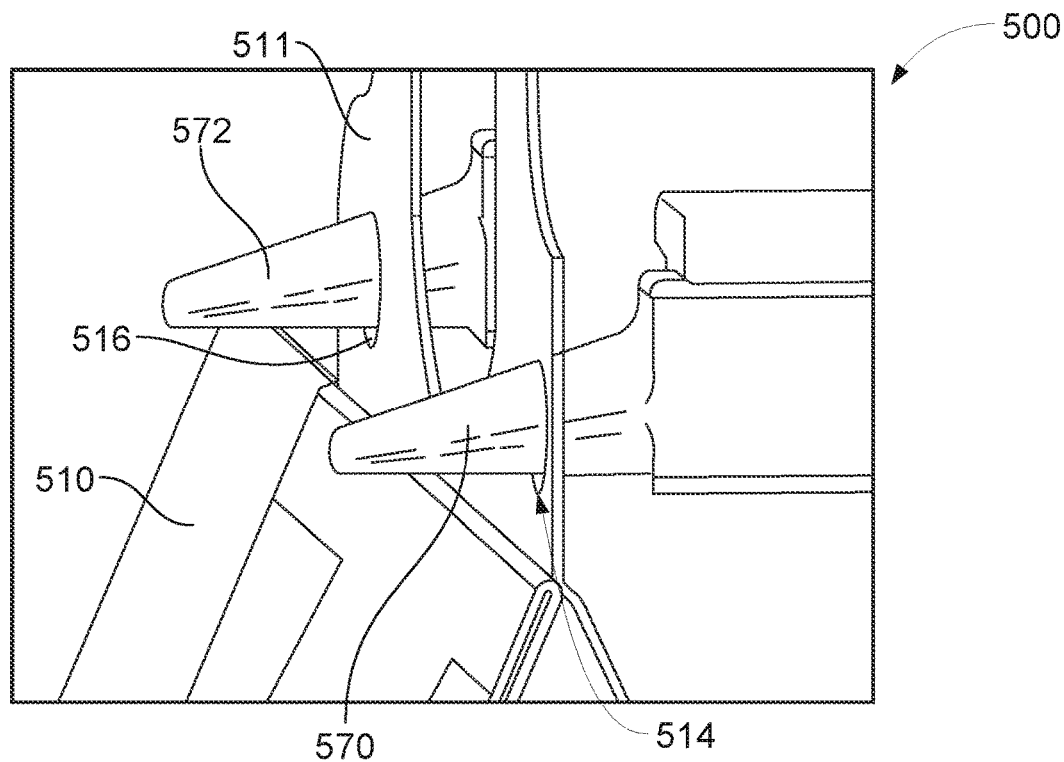
FIG. 12 shows a pair of locking pins 570, 572 extending through holes 514 and 516 in handle 511 of payload 510 to secure the handle 511 and top of payload 510 within the fuselage of a UAV.

FIG. 12 shows a pair of locking pins 570, 572 extending through holes 514 and 516 in handle 511 of payload 510 to secure the handle 511 and top portion of payload 510 within the fuselage of a UAV. In this manner, the handle 511 and payload 510 may be secured within the fuselage of a UAV. In this embodiment, the locking pins 570 and 572 have a conical shape so that they pull the package up slightly or at least remove any downward slack present. In some embodiments the locking pins 570 and 572 may completely plug the holes 514 and 516 of the handle 511 of payload 510, to provide a very secure attachment of the handle and top portion of the payload within the fuselage of the UAV. Although preferably the locking pins are conical, in other applications they may have other geometries, such as a cylindrical geometry.

Figures 13A, 13B:
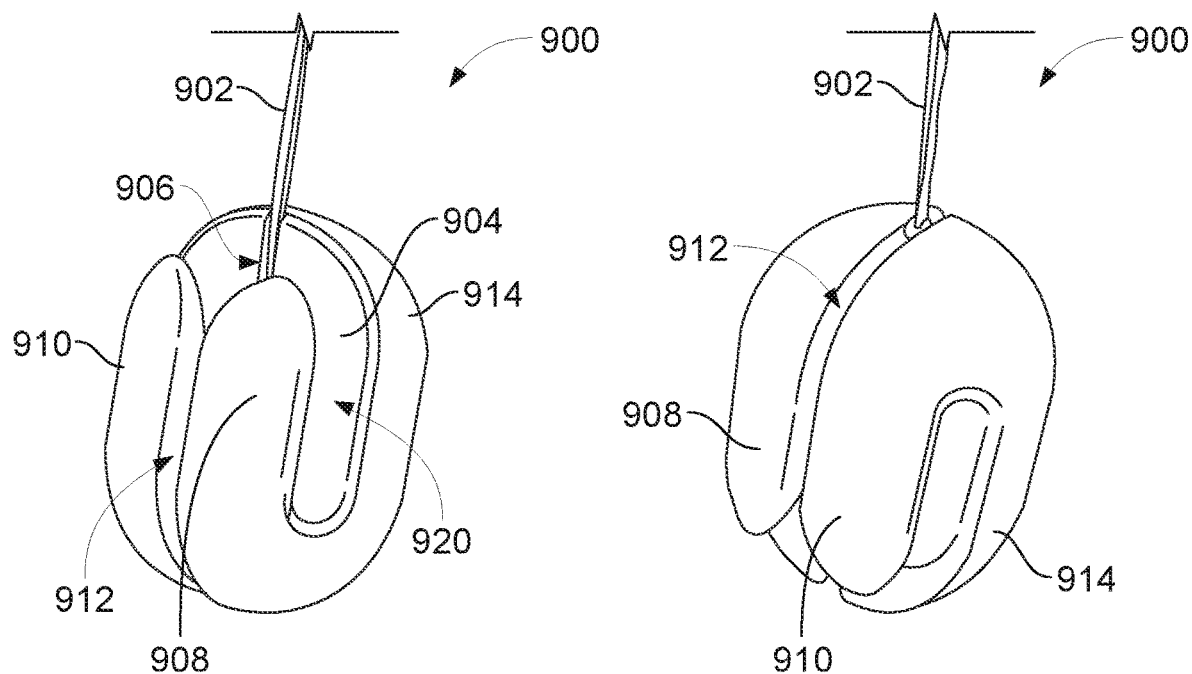
FIG. 13A is a perspective view of payload coupling apparatus 900 prior to having a handle of a payload positioned within slot 920 of payload coupling apparatus 900.
FIG. 13B is a perspective view of payload coupling apparatus 900 after delivering a payload and decoupling from a handle of a payload.

FIG. 13A is a perspective view of payload coupling apparatus 900 prior to having a handle of a payload positioned within slot 920 of payload coupling apparatus 900. Payload coupling apparatus 900 has a tether slot 906 on inner surface 904 of portion 914 into which a tether 902 is inserted. Also included is a pair of upwardly extending fingers 908 and 910 having a slot 912 positioned therebetween. A handle of a payload may be inserted into the slot 920 of payload coupling apparatus 900 positioned between upwardly extending fingers 908 and 910 and inner surface 904.

FIG. 13B is a perspective view of payload coupling apparatus 900 after delivering a payload and decoupling the payload coupling apparatus 900 from a handle of a payload. In this embodiment, the upper portion of portion 914 is weighted such that when the payload coupling apparatus 900 is decoupled from the handle of the payload, the payload coupling apparatus 900 rotates 180 degrees such that the fingers 908 and 910 are downwardly extending, thereby preventing the slot 920 from reengaging with the handle of the payload, or engaging with tree branches or wires during retrieval to the fuselage of the UAV. During rotation following decoupling, the tether 902 is pulled from the tether slot 906 (shown in FIG. 13A) and passes through slot 912 between fingers 908 and 910 such that the payload coupling apparatus 900 is suspended from tether 902.

FIGS. 14A-E provide various views of payload coupling apparatus 900 shown in FIGS. 13A and 13B. As shown in FIGS. 14A-E, the payload coupling apparatus 900 includes a slot 920 positioned between upwardly extending fingers 908 and 910 and inner surface 904. A tether slot 906 is positioned in inner surface 904. A slot 912 also extends between upwardly extending fingers 908 and 910. A tether attachment point 922 is positioned on a bottom of the payload coupling apparatus 900. The tether slot 906 extends from tether attachment point 922 to the top of inner surface 904. Upper portion 914 of payload coupling apparatus 914 is weighted such that upon payload landing, the payload coupling apparatus is automatically decoupled from the handle of the payload, and the weighted upper portion 914 causes the payload coupling apparatus 900 to rotate downwardly 180 degrees. During this period of rotation, a tether is pulled free from tether slot 906 and the payload coupling apparatus is suspended from the UAV via the tether attached to tether attachment point 922 with fingers 908 and 910 pointing downwardly. As a result, the fingers 908 and 910 are prevented from reengaging the handle of the payload when retrieved to the UAV, and also prevented from engaging tree branches or power lines during retrieval to the UAV. Although not shown in FIGS. 14A-E, the payload coupling apparatus 900 could also include cammed surfaces as shown in payload coupling apparatus 800 that engage with mating cams positioned within a payload coupling apparatus receptacle in the fuselage of a UAV to orient the payload coupling apparatus in a desired orientation within the payload coupling apparatus receptacle.

Payload coupling apparatus 900 also advantageously is a solid state design that includes no moving parts, thereby reducing the complexity and cost of the payload coupling apparatus and eliminating moving parts that can possibly fail. A more reliable payload coupling apparatus is thereby provided.

FIGS. 15A-E provide various views of payload coupling apparatus 1000. In this embodiment, payload coupling apparatus 1000 has a generally spherical shape. A slot 1020 is positioned between outer lip or hook 1010 and rounded portion 1014. The slot 1020 is adapted to receive a handle of a payload. A tether attachment point 1022 is positioned on rounded portion 1014. A tether slot 1006 extends from tether attachment point 1022 to slot 1020 and is adapted to receive and hold a tether. Rounded portion 1014 or portion 1010 may be weighted such that when a payload touches the ground, the handle of the payload is decoupled from the slot of payload coupling apparatus 1000. During decoupling from the handle of the payload, the weighted, rounded portion 1010 tips forward and rotates 90 degrees such that the payload coupling apparatus 1000 is suspended from the end of a tether attached to tether attachment point 1022. In this manner, the slot 1020 no longer faces upwardly and prevents the payload coupling apparatus 1000 from reengaging with the handle of the payload during retrieval to a UAV, and also prevents the payload coupling apparatus from engaging tree branches or power lines.

As with payload coupling apparatuses 800 and 900 described above, payload coupling apparatus 1000 also advantageously is a solid state design that includes no moving parts, thereby reducing the complexity and cost of the payload coupling apparatus and eliminating moving parts that can possibly fail. A more reliable payload coupling apparatus is thereby provided.

FIGS. 16A-D shows various views of payload coupling apparatus 800' which is a variation of payload coupling apparatus 800 described above. Payload coupling apparatus 800' includes the same exterior features as payload coupling apparatus 800. However, in payload coupling apparatus 800', a lower lip or hook 806' includes an upwardly extending shank 806a' that extends within shank cavity 817 in housing 812 of the payload coupling apparatus 800'. An end of a tether extends through housing 812 and is attached to the end of shank 806a'. The housing 812 may be moved upwardly into a position shown in FIGS. 16A and 16C thereby opening slot 808 between lower lip or hook 806' and housing 812 and allowing for placement of a handle of a payload within slot 808.

Figure 16A:
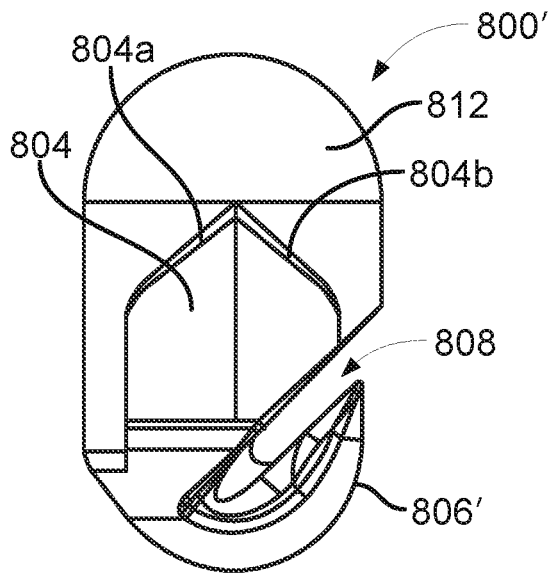
FIG. 16A is a side view of payload coupling apparatus 800' with a slot 808 positioned above lip 806', according to an example embodiment.
Figure 16B:
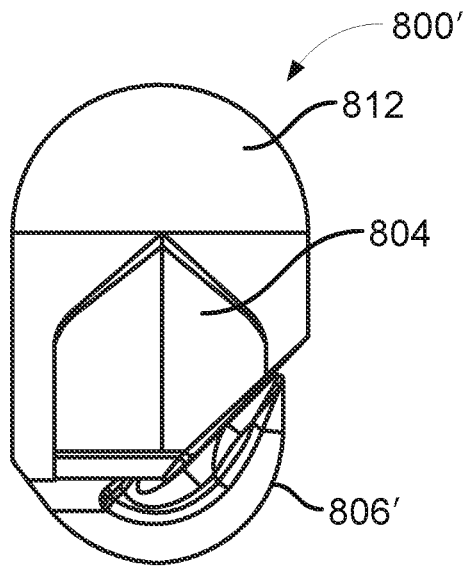
FIG. 16B is a side view of payload coupling apparatus 800' after slot 808 has been closed following decoupling of payload coupling apparatus 800' from a handle of a payload.
Figure 16C:
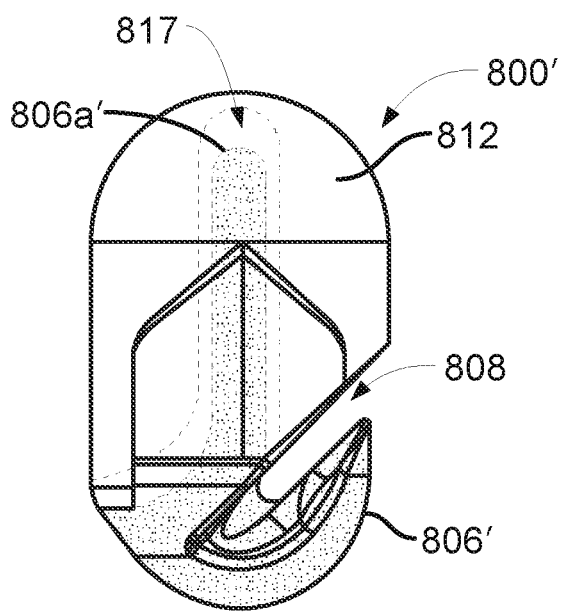
FIG. 16C is a cross-sectional side view of payload coupling apparatus 800' shown in FIG. 16A.
Figure 16D:
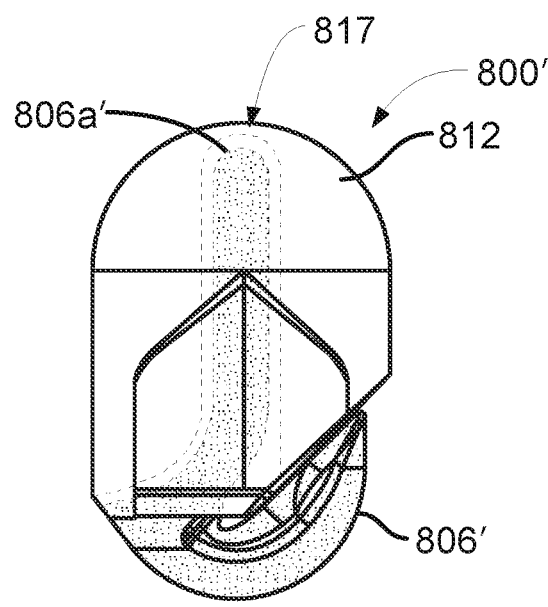
FIG. 16D is a cross-sectional side view of payload coupling apparatus 800' shown in FIG. 16B.

Once the handle of the payload is positioned within slot 808, the housing 812 moves downwardly via gravity to close the slot 808 and secure the handle of the payload between lower lip or hook 806' and housing 812, as shown in FIGS. 16B and 16D. Once the payload touches down, the payload coupling apparatus 800' moves downwardly such that the handle of the payload is removed from the slot 808 and decoupled from payload coupling apparatus 800'.

In addition, once the handle of the payload is decoupled from the payload coupling apparatus 800', gravity forces the housing 817 into engagement with lower lip or hook 806a' such that the slot 808 is in its normally closed position. In this manner, the reengagement with the handle of the payload during retrieval is prevented, and because the slot 808 is in its normally closed position, engagement with tree branches or power lines is also prevented.

In each of the payload coupling apparatuses 800, 800', 900, and 1000, the upper and lower ends are rounded, or hemispherically shaped, to prevent the payload coupling apparatus from snagging during descent from, or retrieval to, the fuselage of a UAV.

The present embodiments provide a highly integrated winch-based pickup and delivery system for UAVs. A number of significant advantages are provided. For example, the ability to pick up and deliver packages without the need for landing is provided, as the system is able to winch up a package with the aircraft hovering. Although in some locations, infrastructure such as a platform or perch for landing or loading the UAV may be provided, in other location there may be no need for infrastructure at the merchant or customer location. The advantages include high mission flexibility and potentially little or no infrastructure installation costs, as well as increased flexibility in payload geometry.

In addition, the payload delivery system may automatically align the top portion of the payload during winch up, orienting it for minimum drag along the aircraft's longitudinal axis. This alignment enables high speed forward flight after pick up. The alignment is accomplished through the shape of the payload hook and receptacle. In the payload coupling apparatus 800, the lower lip or hook 806 has cam features around its perimeter which always orient it in a defined direction when it engages into the cam features inside the receptacle of the fuselage of the UAV. The tips of the cam shapes on both sides of the capsule are asymmetric to prevent jamming in the 90 degree orientation. In this regard, helical cam surfaces may meet at an apex on one side of the payload coupling mechanism, and helical cam surfaces may meet at a rounded apex on the other side of the payload coupling mechanism. The hook is specifically designed so that the package hangs in the centerline of the hook, enabling alignment in both directions from 90 degrees.

Payload coupling apparatuses 800, 800', 900, and 1000 include a hook formed about a slot such that hook also releases the payload passively and automatically when the payload touches the ground upon delivery. This is accomplished through the shape and angle of the hook slot and the corresponding handle on the payload. The hook slides off the handle easily when the payload touches down due to the mass of the capsule and also the inertia wanting to continue moving the capsule downward past the payload. The end of the hook is designed to be recessed slightly from the body of the capsule, which prevents the hook from accidentally re-attaching to the handle. After successful release, the hook gets winched back up into the aircraft. All this functionality (package alignment during pickup and passive release during delivery) is achieved without any moving parts in this payload coupling apparatuses 800, 900, and 1000 (referred to as a solid state design). This greatly increases reliability and reduces cost. The simple design also makes user interaction very clear and self-explanatory.

VII. TETHER CONTROL DURING PAYLOAD PICKUP

A UAV may be able to pick up and deliver a payload without landing. In some examples, the UAV may be able to raise and lower a payload coupled to a tether by winding and unwinding the tether while hovering. As such, the UAV may pick up and deliver the payload without requiring infrastructure to be set up by a merchant or customer, thereby increasing a flexibility of delivery location and/or payload geometry and decreasing or eliminating costs associated with the manufacture or installation of infrastructure. In other examples, the UAV may be configured to land on various elevated structures, such as a perch or shelf, and, from its elevated landing position, pick up or deliver the payload by winding or unwinding the tether.

Figure 17:
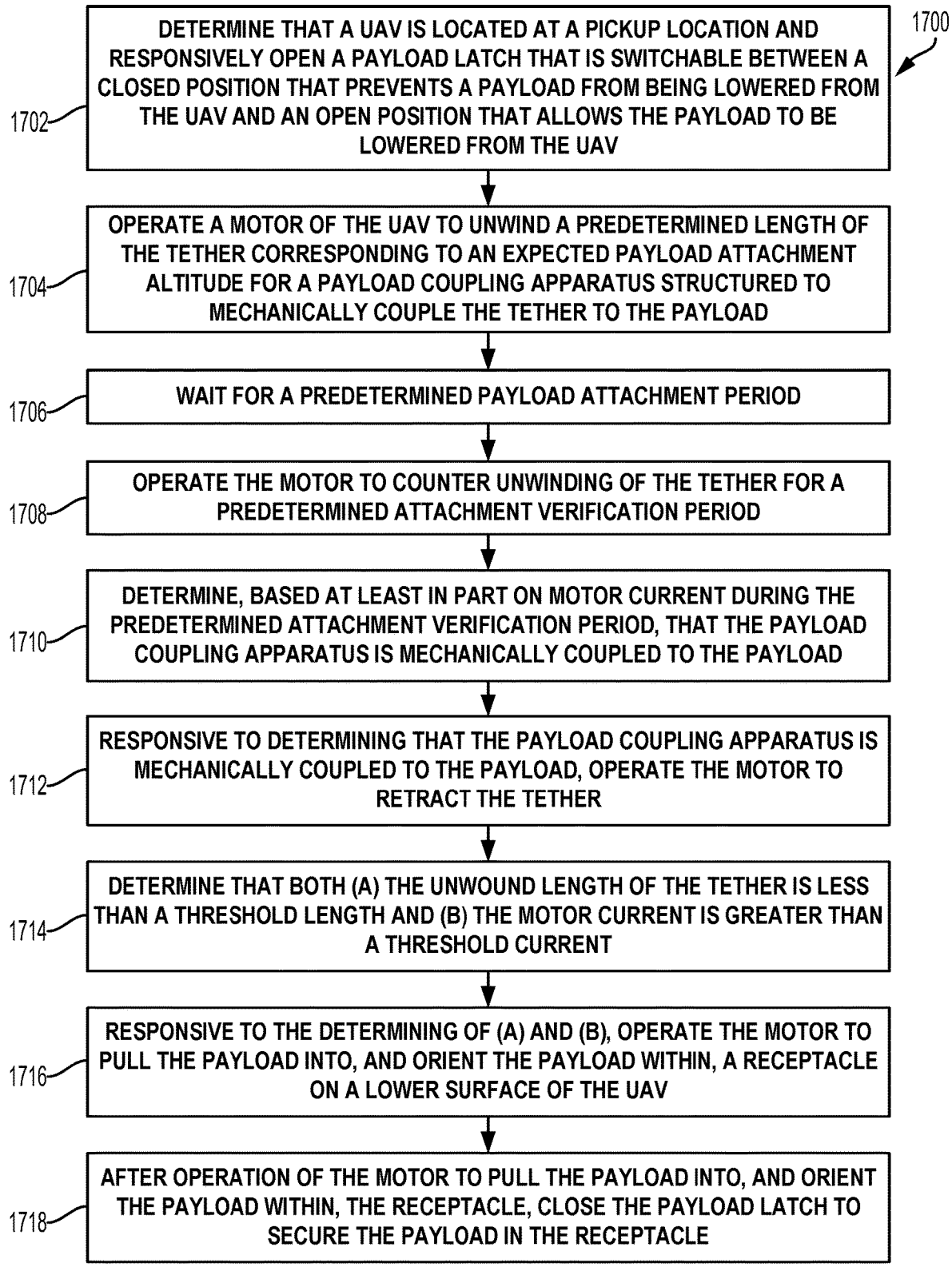
FIG. 17 is a flow chart of a method for carrying out tethered pickup of a payload for subsequent delivery to a target location, according to an example embodiment.

FIG. 17 shows a method 1700 for tethered pickup of a payload (e.g., a package) for subsequent delivery to a target location. Method 1700 may be carried out by a UAV such as those described elsewhere herein. For example, method 1700 may be carried out by a control system of a UAV with a winch system. Further, the winch system may include a tether disposed on a spool, a motor operable in a first mode and a second mode that respectively counter and assist unwinding of the tether due to gravity (e.g., by driving the spool forward or in reverse), a payload coupling apparatus that mechanically couples the tether to a payload, and a payload latch switchable between a closed position that prevents the payload from being lowered from the UAV and an open position that allows the payload to be lowered from the UAV.

As shown by block 1702 of method 1700, when the UAV arrives at a pickup location (also referred to as a source location), the UAV's control system may open the payload latch, such that the tether and the payload coupling apparatus can be lowered toward the ground at the pickup location.

At block 1704, the control system operates the motor to unwind a predetermined length of the tether. This unwound length may correspond to an expected payload attachment altitude for the payload coupling apparatus, which is attached to the lower end of the tether. The payload attachment altitude may be an altitude at which a human, or perhaps a robotic device, may grab the payload coupling apparatus for attaching the coupling apparatus to a payload.

For instance, the payload attachment altitude may be an altitude less than two meters above ground level. Other examples are possible as well.

After unwinding the predetermined length of the tether, the control system may wait for a predetermined payload attachment period, as shown by block 1706. This attachment period allows time for a human, or perhaps a robotic device, to attach a payload (e.g., a package for delivery) to the payload coupling apparatus. The predetermined payload attachment period may be a fixed value or may vary based on an operational state of the UAV.

When the payload attachment period ends, the control system may operate the winch motor in the second mode for a predetermined attachment verification period, as shown by block 1708. In particular, the motor may operate so as to pull upwards on the tether during the attachment verification period in order to hold the tether in place or retract the tether at a certain rate. The motor current required to hold the tether in place or retract the tether at a certain rate will be greater when the payload is attached, due to the added weight of the payload. As such, the control system may determine, based at least in part on motor current during the predetermined attachment verification period, whether or not the payload coupling apparatus is mechanically coupled to the payload, as shown by block 1710.

In practice, for instance, if the motor current is less than an attachment threshold current, the control system may determine that the payload has not been attached to the payload coupling apparatus, and may repeat the process of lowering the payload (this time by some predetermined additional length), waiting for a predetermined payload attachment period, and then pulling upwards on the tether to test for payload attachment, shown in blocks 1704 to 1710. On the other hand, if the motor current is greater than or equal to the attachment threshold current, and block 1710 results in a determination that the payload coupling apparatus is mechanically coupled to the payload, the control system may operate the winch motor to retract the tether and lift the attached payload towards the UAV, as shown by block 1712.

The control system may continue retracting the tether until it senses that the payload coupling apparatus is at or near the UAV, at which point it initiates actions to secure the payload for flight to the target location. For instance, method 1700 includes functions that may be used to secure a package and a coupling apparatus in a receptacle of a UAV, such as in the configurations shown in FIGS. 5A-5C.

More specifically, at block 1714, the control system may determine that both: (a) the unwound length of tether is less than a threshold length and (b) the motor current is greater than a threshold current. When both these conditions hold true, this may serve as an indication that the payload coupling apparatus and/or the payload have reached the UAV receptacle. In particular, when the calculated unwound length of tether is at or near zero, this may indicate that the payload coupling apparatus and/or the payload have been lifted all the way to the UAV. Further, when the payload coupling apparatus and/or the payload contact the UAV's receptacle area, the motor current may increase as the motor's speed controller attempts to continue pulling the payload upward. And, by considering both these indications, the control system may avoid false positives.

Thus, upon detecting both of the above-described indications, the control system may responsively operate the motor in the first mode to pull the payload into, and orient the payload within, the receptacle on the lower surface of the UAV, as shown by block 1716. In particular, the control system may operate the motor to increase the torque applied to the tether, such as by increasing the current supplied to the motor to a predetermined value, in order to help ensure that the payload coupling apparatus (and perhaps the payload as well) are firmly seated against the corresponding surfaces of the UAV's receptacle, such that the payload latch (e.g., pins 570 and 572 of FIG. 12) can be closed to secure the payload for flight to the target location. Accordingly, after applying torque to the tether in an upward direction for a predetermined period of time, the control system may close the payload latch, as shown by block 1718. With the payload secured for flight, the UAV may navigate to a target location for delivery.

VIII. TETHER CONTROL DURING PAYLOAD DELIVERY

Figure 18:
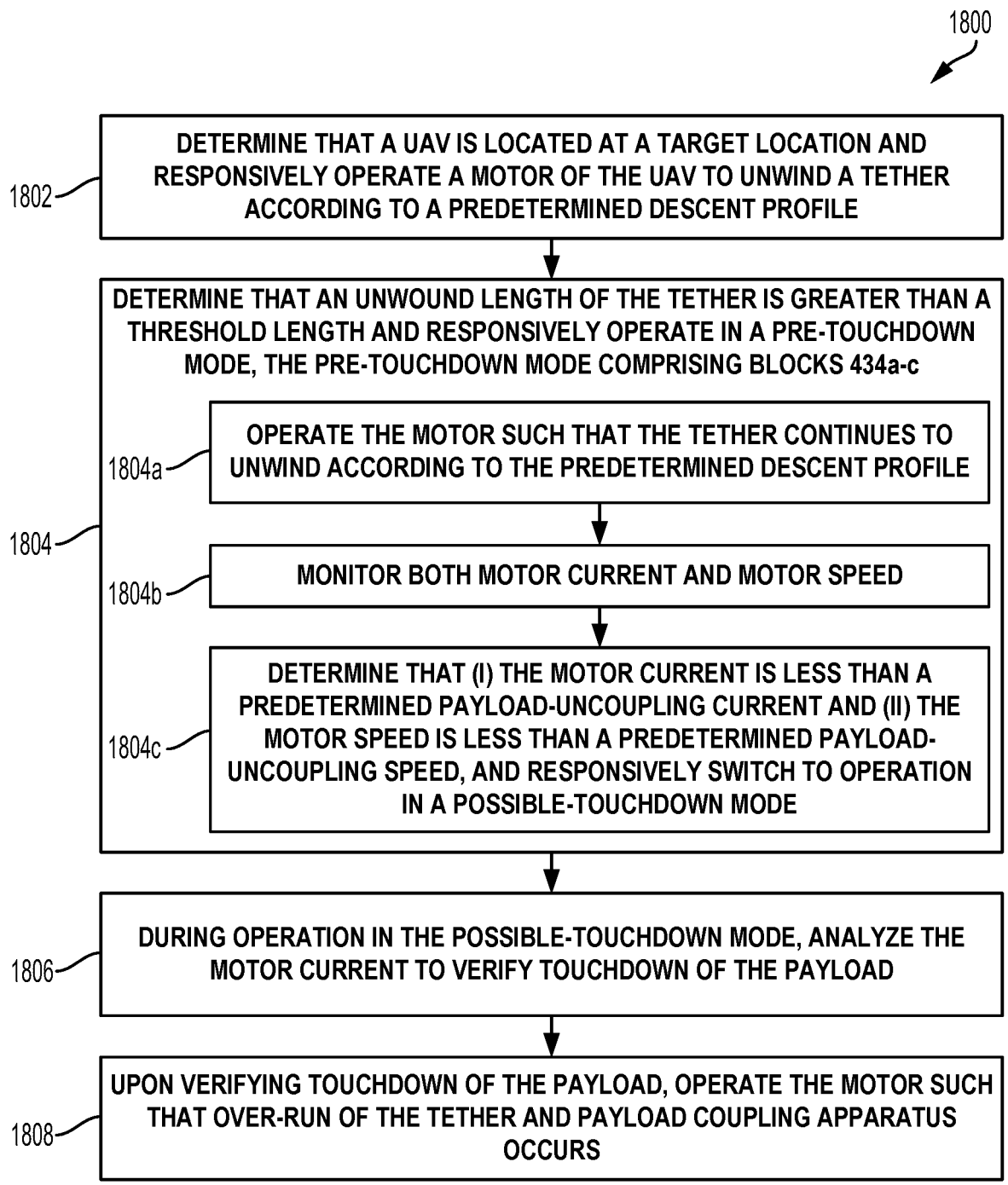
FIG. 18 is a flow chart of a method for carrying out tethered delivery of a payload, according to an example embodiment.

Once the UAV arrives at the target location for delivery, the UAV's control system may responsively operate in a delivery mode. FIG. 18 is a flow chart illustrating a method 1800 for operation of a UAV in a delivery mode, according to an example embodiment.

More specifically, once the UAV arrives at and is hovering over a target location for tethered delivery, the UAV's control system may operate the motor to unwind the tether according to a predetermined descent profile, as shown by block 1802. The predetermined descent profile may control a descent rate of the payload by specifying a desired rotational speed of the motor. For example, the descent profile may specify a constant descent rate or a variable descent rate for the duration of the payload descent.

In some examples, the desired rotational motor speeds specified by the predetermined descent profile could be based on machine-learned data that could be inferred from data from prior flights. For example, for delivery to a particular location, the control system could use a descent profile that was previously used during a previous delivery to the particular location. Alternatively, if use of the descent profile during a previous delivery to that particular location or some other location resulted in one or more detected errors (e.g., failure to detach the payload from the tether, damaged payload, etc.), then the control system could alter the descent profile (e.g., by increasing or decreasing the desired motor speeds during various phases of the payload descent) or choose to use a default descent profile instead.

In an example method, the control system may not exert significant control over the descent of the payload until it is closer to the ground. For instance, at some point while the tether is unwinding, the control system may determine that the unwound length of the tether is greater than a threshold length, and responsively operate in a pre-touchdown mode, as shown by block 1804. The threshold length may correspond to a predetermined near-ground altitude of the payload; e.g., a height where more control is desirable for the safety of bystanders and/or ground structures, and/or to protect the payload and its contents from damage.

As noted, in the pre-touchdown mode, the control system may pay close attention to the payload to improve the chances of successful release of the payload on the ground. In particular, while operating in the pre-touchdown mode, the control system operates the motor such that the tether continues to unwind according to the predetermined descent profile, as shown by block 1804*a*, while monitoring both motor current and motor speed, as shown by block 1804*b*. The motor current may be compared to a predetermined payload-uncoupling current to detect when the motor current is less than the predetermined payload-uncoupling current.

Additionally, the motor speed may be compared to a predetermined payload-uncoupling speed to detect when the motor speed is less than the predetermined payload-uncoupling speed, as shown by block 1804c. When both the motor current is less than a predetermined payload-uncoupling current and the motor speed is less than a predetermined payload-uncoupling speed, the control system responsively switches to operation in a possible-touchdown mode.

The possible-touchdown mode may be implemented in an effort to verify that the package has, in fact, reached the ground (or put another way, to help prevent false positive detection of contact with the ground). For instance, while operating in the possible-touchdown mode, the control system may analyze the motor current to verify that the motor current remains below the predetermined payload-uncoupling current for a touchdown-verification period (e.g., perhaps allowing for a small amount of fluctuation during this period), as shown by block 1806. In practice, a Schmitt trigger may be applied to verify that the detected drop in motor current to below the payload-uncoupling threshold is not the result of noise or some temporary blockage, and is in fact due to the payload resting on the ground. Other techniques for verifying touchdown of the payload are also possible.

Once touchdown of the payload is verified, the control system operates the motor such that over-run of the tether and payload coupling apparatus occurs, as shown by block 1808. Over-run occurs when the payload comes to a rest while the tether continues to unwind. In practice, for example, the control system may switch the winch motor from the first mode to the second mode by, e.g., reversing the direction the motor and thus the direction of torque applied to the tether by the motor. Thus, the motor may switch from slowing the descent of the tether to forcing the tether to unwind such that over-run of the tether occurs. The over-run of the tether may in turn lower the payload coupling apparatus below a height where coupling to the payload occurs (and perhaps all the way to the ground). In other embodiments, block 1808 may involve the control system simply turning the motor off, and allowing gravity to pull the payload coupling apparatus down and cause the tether over-run.

Further, as shown in FIGS. 6A-6C, 10A-10C, and 11, the payload and/or payload coupling apparatus may have interfacing surfaces such that the interaction of the payload and payload coupling apparatus during over-run deflects the payload coupling apparatus to the side of the payload. As such, the coupling feature of the payload coupling apparatus (e.g., a hook) will no longer be aligned with a corresponding coupling feature of the payload (e.g., a handle on a tote package). Located as such, the winch system may retract the tether and payload coupling apparatus to the UAV without the payload coupling apparatus re-coupling to the payload, thereby leaving the package on the ground.

In some examples of method 1800, the control system may be configured to, prior to opening the payload latch, operating the motor to apply an upward force on the tether. This may allow for the payload latch to be opened more easily, as the payload may be arranged to rest some or all of its weight on the payload latch when the latch is in the closed position. The weight of the payload may increase the friction against the payload latch when attempting to switch the latch to the open position, so lifting the payload a predetermined amount may reduce occurrences of the payload latch getting stuck in the closed position. Additionally, after opening the payload latch and before unwinding the tether, the control system may be configured to operate the motor to hold the tether in a substantially constant position. This may allow the weight of the payload to pull the payload downward and against the payload coupling apparatus, causing the payload to become firmly seated in a coupling mechanism (e.g., a hook) of the payload coupling apparatus.

IX. USER INTERACTION AND FEEDBACK VIA CONTROL OF TETHER

In practice, a user may interact with the disclosed winch system in various ways and for various reasons. For instance, the user may interact with the winch system to manually couple or decouple a payload to the tether via the payload coupling apparatus, such as for payload delivery purposes or for payload pickup purposes. In doing so, the user may apply forces directly onto the tether and/or may apply forces to the tether via the payload coupling apparatus, among other possibilities. Moreover, such interaction with the winch system may effectively also amounts to an interaction with the UAV itself because the UAV could adjust its operation based on those forces (e.g., the UAV may engage in flight stabilization that accounts for those forces).

When the user interacts with the disclosed winch system, the user could encounter various challenges. For example, the user may not know how the interaction with the winch system may ultimately affect operation of the winch system and/or operation of the UAV. As a result, the user could inadvertently damage the UAV and/or the winch system. In another example, the user may not know any future operations that the UAV and/or the winch system plan to carry out. As a result, the user could inadvertently stop the UAV and/or the winch system from carrying out a planned operation. In yet another example, the user may want the UAV and/or the winch system to carry out a certain operation, but may not have the means to control operation of the UAV or of the winch system. Other examples are possible as well.

To help resolve such challenges, the disclosed winch system may be configured to control the tether so as to interact with and provide feedback to a user. Specifically, the UAV's control system may be equipped with the capability to interpret direct or indirect user interactions with the tether, perhaps carrying out certain operations in response to the interpreted interactions. Also, the UAV's control system may be equipped with the capability to provide information to the user by manipulating the tether, perhaps doing so in response to a user interaction with the tether.

Figure 19:
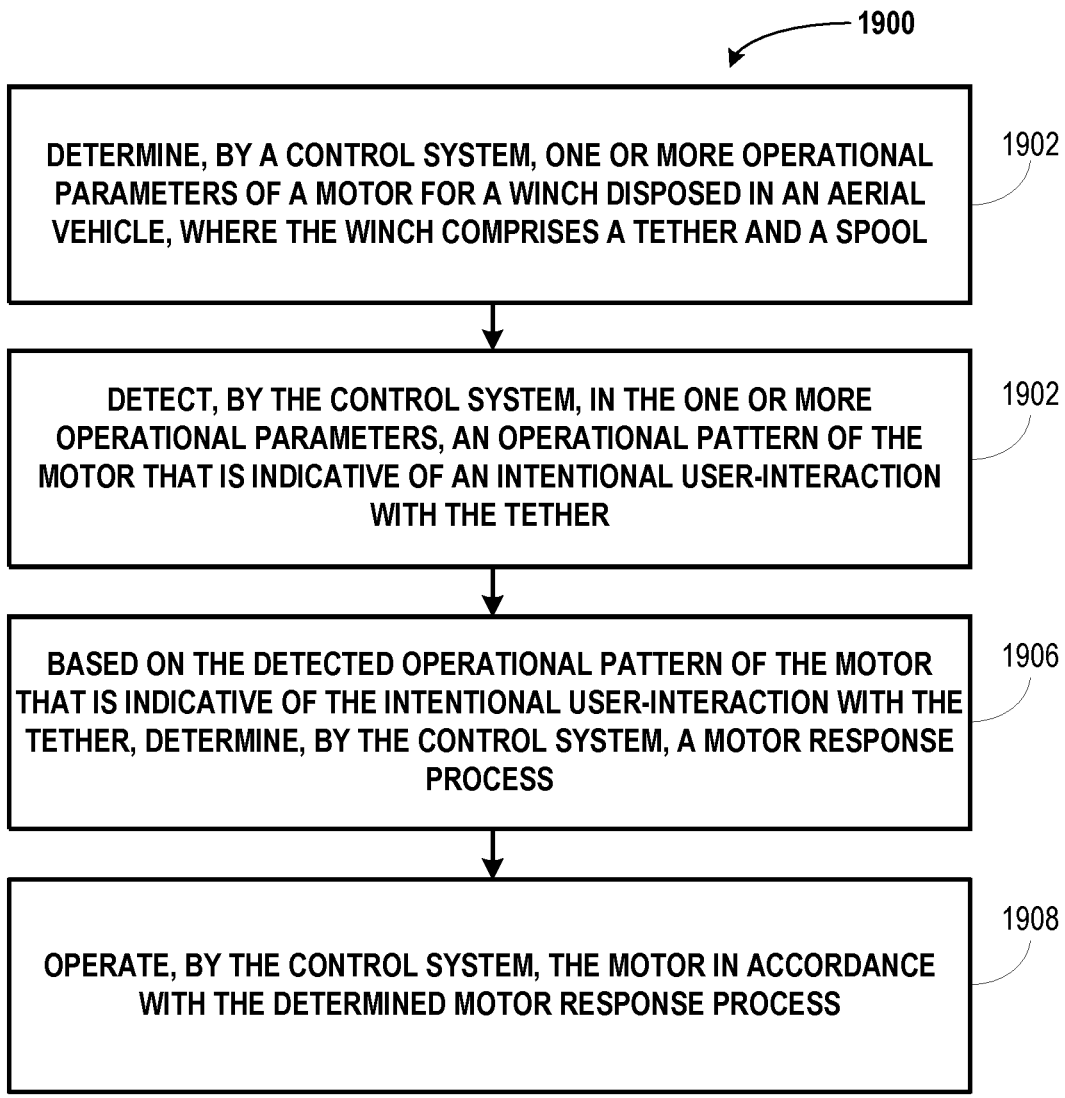
FIG. 19 is an example flowchart for facilitating control of the tether for purposes of interacting with and/or providing feedback to a user, according to an example embodiment.

FIG. 19 illustrates a method 1900 for facilitating control of the tether for purposes of interacting with and/or providing feedback to a user. As shown by block 1902 of method 1900, the UAV's control system may determine one or more operational parameters of a motor for a winch disposed in an aerial vehicle, the winch including a tether and a spool. Then, the control system may detect, in the one or more operational parameters, an operational pattern of the motor that is indicative of an intentional user-interaction with the tether, as shown by block 1904 of method 1900. Based on the detected operational pattern of the motor that is indicative of the intentional user-interaction with the tether, the control system may determine a motor response process, as shown by block 1906 of method 1900. And as shown by block 1908 of method 1900, the control system may then operate the motor in accordance with the determined motor response process.

i. Determining Operational Parameters of a Motor

As noted above, the UAV's control system may determine one or more operational parameters of the motor. In practice, an operational parameter of the motor may be any measure of the motor's activity. Although certain operational parameters are described herein, other operational parameters are also possible without departing from the scope of the present disclosure.

By way of example, an operational parameter of the motor may be current characteristics of the motor, such as a current level being provided to and/or generated by the motor over time or at a particular instance in time, among other possibilities. In another example, an operational parameter of the motor may be speed characteristics of the motor, such as a speed of rotation of the motor's transmission assembly over time or at a particular instance in time, among other possibilities. In yet another example, an operational parameter of the motor may be rotation characteristics of the motor, such as an extent of rotation of the motor's transmission assembly over time, among other possibilities. Other examples are possible as well.

Generally, the control system may determine one or more operational parameters of the motor in various ways. For instance, the control system may receive, from one or more sensors coupled to motor, sensor data indicative of operational parameters. Once the control system receives the sensor data, the control system may then use the sensor data to determine and/or evaluate the operational parameters of the motor.

By way of example, a current sensor may be coupled to the motor and configured to generate current data indicative of a current level being provided to and/or generated by the motor. With this arrangement, the control system may receive current data from the current sensor and may use the received current data as basis to determine current characteristics of the motor. For instance, the control system may use the received current data as basis to determine particular current level of the motor over a particular time period.

In another example, a speed sensor may be coupled to the motor and configured to generate speed data indicative of speed of rotation of the motor's transmission assembly. With this arrangement, the control system may receive speed data from the speed sensor and may use the received current data as basis to determine speed characteristics of the motor. For instance, the control system may use the received speed data as basis to determine a particular speed of the motor at a particular point in time.

In yet another example, an encoder may be coupled to the motor's transmission assembly and configured to generate position data representative of the transmission assembly's over time. With this arrangement, the control system may receive position data from the encoder and may use the received position data as basis to determine rotation characteristics of the motor. For instance, the control system may use the received position data as basis to determine an extent and/or a direction of the transmission assembly's rotation from a first point in time to a second point in time. Other examples and instances are possible as well.

Figure 20:
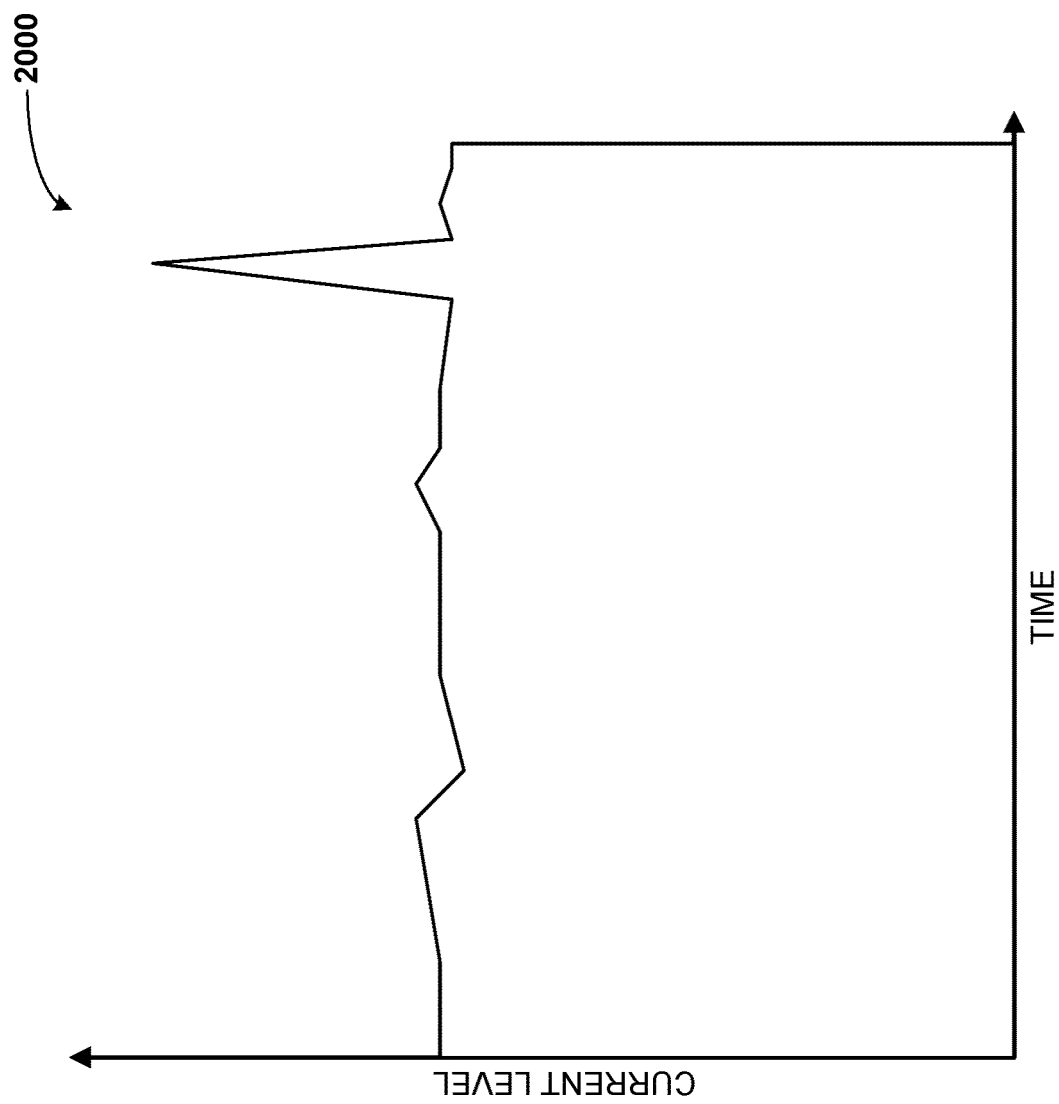
FIG. 20 illustrates a motor current level over time, according to an example embodiment.

FIG. 20 next shows a graph illustrative of example current characteristics 2000 of the motor. As shown, the current characteristics 2000 represent the motor's current level over time. In practice, the current level may change over time based on various factors. For instance, the current level may change based on torque/force that the motor seeks to provide (e.g., to the tether) and/or based on an external torque/force provided to the motor (e.g., via the tether), among other possibilities. Other examples are possible as well.

ii. Detecting an Operational Pattern of the Motor that is Indicative of a User-Interaction As noted above, the control system may detect, in the one or more operational parameters, an operational pattern of the motor that is indicative of an intentional user-interaction with the tether. In practice, an operational pattern may be any contiguous and/or non-contiguous sequence of values of one or more operational parameters over time. Moreover, the control system may use any currently known and/or future developed signal processing techniques or the like to detect an operational pattern. Nonetheless, an operational pattern could take various forms.

In one case, an operational pattern may be a pattern found in a single operational parameter. For instance, an operational pattern may be a particular pattern of current characteristics, such as a particular sequence of current levels being represented by current data over time. In another case, however, an operational pattern may involve patterns respectively found in two or more operational parameters over the same time period and/or over different respective time periods. For instance, an operational pattern may be a particular pattern of current characteristics over a first time period as well as a particular pattern of speed characteristics over a second time period (e.g., same as or different from the first time period). Other cases are possible as well.

Given the above-described arrangement, the control system detecting an operational pattern may involve the control system detecting various patterns among one or more determined parameters. By way of example (and without limitation), the control system detecting an operational pattern may involve the control system detecting any combination of the following: a particular relative change of motor current, a particular rate of change of motor current, a particular motor current value, a particular sequence of motor current values, a particular relative change of motor speed, a particular rate of change of motor speed, a particular motor speed value, a particular sequence of motor speed values, a particular relative change of motor rotation, a particular rate of change of motor rotation, a particular motor rotation value, and/or a particular sequence of motor rotation values, among others.

In accordance with the present disclosure, as noted, detecting an operational pattern may specifically involve detecting an operational pattern of the motor that is indicative of an intentional user-interaction with the tether. More specifically, when a user interacts with the tether in a particular manner, the motor may exhibit a particular operational pattern. As such, established operational patterns (e.g., established via manual engineering input) that the control system can detect may each correspond to a respective user-interaction with the tether. In this way, when the control system detects a particular operational pattern, the control system may effectively detect a particular user-interaction with the tether. In practice, the control system may do so simply detecting the operational pattern and without there necessarily being a logical indication of a user-interaction.

In some cases, however, the control system may maintain or may otherwise refer to mapping data that maps each of a plurality of operational patterns of the motor each with a respective user-interaction. For example, the mapping data may map a particular current level pattern with an indication of a user providing a particular downward force on the tether. In practice, the particular downward force may be a force that is applied in a direction substantially perpendicular to a ground surface and/or may be a force that is applied in a direction that is at another angle (e.g., 45 degrees) relative to the ground surface (e.g., such as when a user catches an oscillating tether and then tugs on it at an angle). In another example, the mapping data may map a particular speed level pattern with an indication of a user moving the tether side to side at a particular rate. In practice, such indications could each take on any feasible forms, such as the form of letters, numbers, and/or logical Boolean values, among others. Accordingly, when the control system detects a particular operational pattern, the control system may refer to the mapping data to determine the user-interaction that is respectively mapped to that particular operational pattern.

Moreover, different operational patterns may sometimes be indicative of the same user-interaction. For this reason, the control system may be arranged to detect a first operational pattern and thus effectively detect a particular user-interaction with the tether, and may also be arranged to detect a second operational pattern and thus effectively detect the same particular user-interaction with the tether, such as for purposes of determining a motor response process as further described below. Alternatively, two or more operational patterns in the mapping data could each be mapped to the same user-interaction, so that the control system detects the same user-interaction when referring to either one of those operational patterns in the mapping data. Other cases are possible as well.

Yet further, when various detectable operational patterns are established, at least some of those established patterns could account for various external forces that may be applied to the tether, such as external forces other than just those being applied by a user during an interaction with the tether. In particular, the operational patterns may account for gravity, external forces based on weight of the payload coupling apparatus, and/or external forces based on weight of a coupled payload (e.g., a weight of a package to be shipped), among others. In this way, the control system may be able to detect an operational pattern of the motor that is exhibited when such external forces are applied in combination with external forces that are based on a user-interaction. Other external forces are possible as well.

In yet a further aspect, in addition to or instead of the above-mentioned mapping data, the control system may use one or more other approaches to determine a user-interaction based on an operational pattern of the motor.

In one case, the control system may carry out signal processing and/or analysis techniques to determine value(s) and/or trend(s) of a signal (e.g., a signal representative of motor speed values) and to determine the user-interaction based on those value(s) and/or trend(s) of the signal. For instance, the control system may evaluate a set of conditions of a signal so as to determine whether or not all conditions within the set are determined to be true. If the control system determines that all conditions of the set are true, the control system may determine that the signal corresponds to a particular user-interaction. Otherwise, the control system may evaluate another set of conditions so as to determine whether or not all conditions within that other set are determined to be true, and so on. In an example of this approach, the control system may determine whether or not a slope of the signal is within a particular range of slopes and may determine whether or not a value of the signal exceeds a particular threshold value within a particular threshold extent of time. And the control system may determine that the signal corresponds to a particular user-interaction if the control system determines both of these conditions to be true. Other examples are also possible.

In another case, the control system may carry out probability analysis techniques to determine the user-interaction. For example, the control system may determine that a detected operational pattern does not precisely match one of the operational patterns of the mapping data and thus may apply probability analysis to determine the operational pattern of the mapping data to which the detected operational pattern matches with the highest likelihood. For instance, when determining the match, the control system may give a higher weight to a certain portion of the detected signal/pattern compared to the weight given to other portions of the detected signal/pattern, thereby applying an additional factor to determine the matching operational pattern and thus to ultimately the user-interaction based on the mapping data. Other cases and examples are possible as well.

Figure 21:
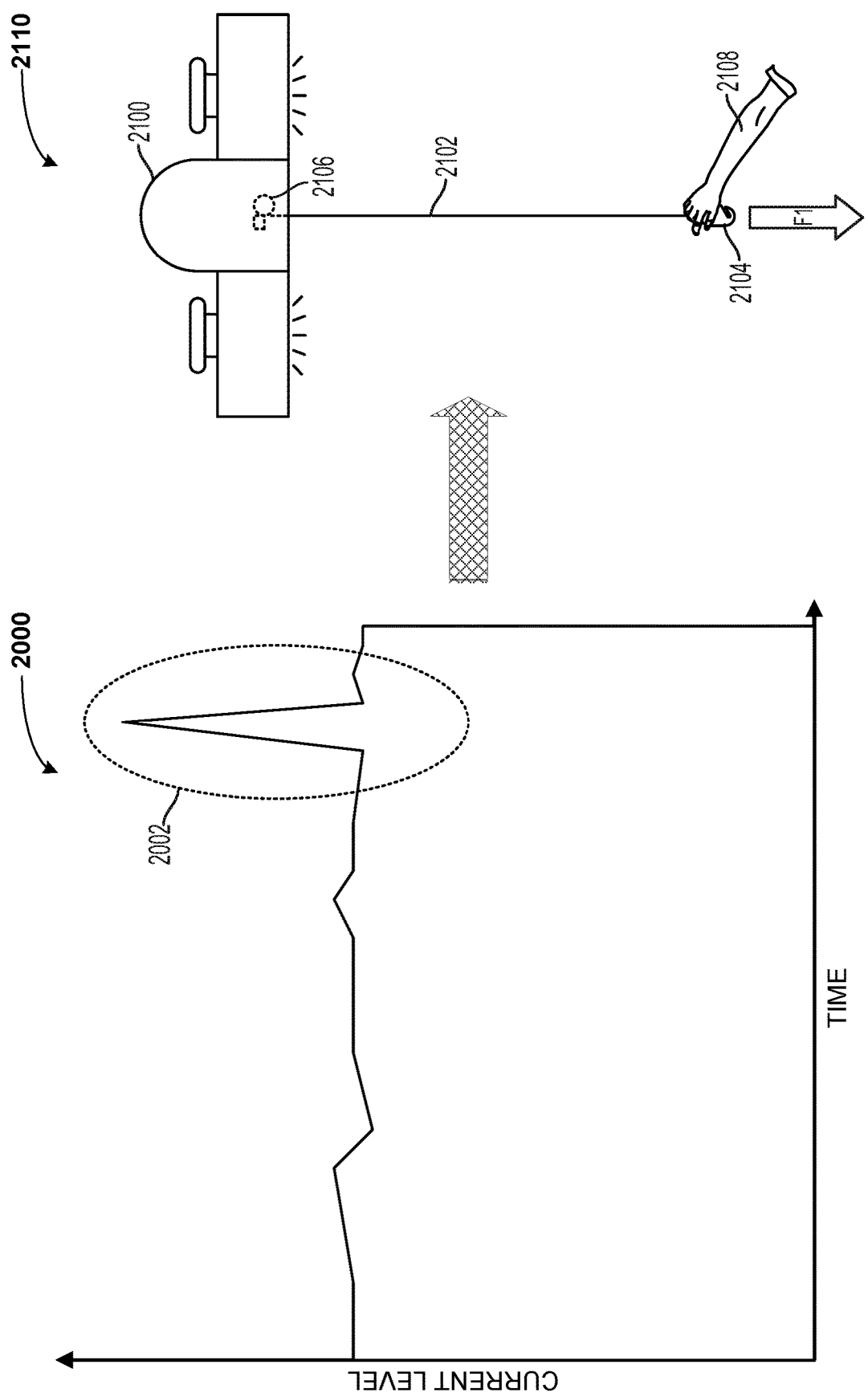
FIG. 21 illustrates a detected current spike that is indicative of a particular user-interaction with a tether, according to an example embodiment.

FIG. 21 next illustrates an example operational pattern of the motor that is indicative of a particular user-interaction with the tether. As shown, the control system may detect a particular current spike 2002 in the above-described current characteristics 2000. To do so, the control system may detect a particular increase in current level over time followed by a particular decrease in current level over time. Additionally or alternatively, the control system may do so by detecting a particular rate of increase in current level over time followed by a particular rate of decrease of current level over time. In either case, the particular current spike 2002 is shown as being indicative of a particular user-interaction 2110 involving a particular downward force being applied to a tether 2102.

More specifically, FIG. 21 shows a UAV 2100 that includes winch system 2106 with a motor configured to control movement of the tether 2102. As shown, a user 2108 physically interacts with a payload coupling apparatus 2104 that is coupled to the tether 2102. In doing so, the user 2108 applied a downward force to the tether 2102 via the payload coupling apparatus 2104, the downward force having a magnitude of "F1". As such, the particular current spike 2002 is indicative of a user applying to a tether a downward force having a magnitude of "F1". Other examples are possible as well.

iii. Determining a Motor Response Process

As noted above, the control system may determine a motor response process and do so based on the detected operational pattern of the motor that is indicative of the intentional user-interaction with the tether. In practice, a particular motor response process may involve one or more particular operations by the motor, such as application of one or more particular torques onto the tether for instance. Moreover, a motor response process may be arranged so as to cause the winch system to interact with the user via the tether and/or to provide feedback to the user via the tether, among other possibilities.

In accordance with the present disclosure, the control system may determine the motor response process in various ways. In one case, the control system may have stored thereon or may otherwise be configured to refer to mapping data that maps a plurality of operational patterns each with a respective motor response process. For instance, the mapping data may map a particular sequence of speed levels with a motor response process involving the motor applying one or more particular torques to wind the tether. As such, the control system may determine the motor response process by referring to the mapping data to determine the respective motor response process that is mapped to the detected operational pattern of the motor.

In another case, the control system may actually determine the particular user-interaction with the tether that is indicated by the detected operational pattern of the motor, such as by referring to the above-described mapping data that maps various operational patterns respectively to various respective user-interactions. And the control system may then use the determined particular user-interaction as basis for determining the motor response process.

More specifically, the control system may have stored thereon or may otherwise be configured to refer to mapping data that maps a plurality of user-interactions each with a respective motor response process. For instance, the mapping data may map a particular side to side movement of the tether by a user with a response process involving application of a particular torque to unwind the tether for a particular duration. As such, the control system may determine the motor response process by referring to the mapping data to determine the respective motor response process that is mapped to the particular user-interaction, which was originally determined based on the above-described mapping data that maps various operational patterns to various respective user-interactions. Other cases are also possible.

In a further aspect, in addition to or instead of mapping data, the control system may use one or more other approaches to determine a motor response process.

In one case, the control system may carry out signal processing and/or analysis techniques to determine value(s) and/or trend(s) of a signal (e.g., a signal representative of motor speed values) and to determine the motor response process based on those value(s) and/or trend(s) of the signal. For instance, the control system may evaluate a set of conditions of a signal so as to determine whether or not all conditions within the set are determined to be true. If the control system determines that all conditions of the set are true, the control system may determine that the signal corresponds to a particular motor response process. Otherwise, the control system may evaluate another set of conditions so as to determine whether or not all conditions within that other set are determined to be true, and so on. In an example of this approach, the control system may determine whether or not the signal includes an inflection point and may determine whether or not a value of a local maxima of the signal exceeds a particular threshold value. And the control system may determine that the signal corresponds to a particular motor response process if the control system determines both of these conditions to be true. Other examples are also possible.

In another case, the control system may carry out probability analysis techniques to determine the motor response process. For example, the control system may determine that a detected operational pattern does not precisely match one of the operational patterns of the mapping data and thus may apply probability analysis to determine the operational pattern of the mapping data to which the detected operational pattern matches with the highest likelihood. For instance, when determining the match, the control system may determine a state of the environment and/or of the UAV during which the operational pattern is detected, and may use the state of the environment and/or of the UAV as an additional weighted factor for determining the matching operational pattern. In this way, once the control system determines the matching operational pattern using the probability analysis, the control system may then determine the motor response process based on the mapping data. Other cases and examples are also possible.

In a system arranged as described above, the motor response process may involve various motor response operations, some of which are described below. In practice, the control system may determine the motor response process to include a single such motor response operation or any feasible combination of these motor response operations. Assuming two or more motor response operations are determined to be carried out, determining the motor response process may also involve determining an order for carrying out motor response operations (e.g., with some motor response operations possibly being repeated at various points throughout the order) and/or a respective duration for applying each motor response operation, among other possibilities. Generally, such an order and/or durations may be determined based on various factors, such as based on the detected operational pattern of the motor for instance. Alternatively, such an order and/or durations may be predetermined in accordance with established mapping data.

In either case, various possible motor response operations are described below. Although certain motor response operations are described, other motor response operations are possible as well without departing from the scope of the present disclosure.

In one example, a motor response operation may involve a particular countering operation that counters unwinding of the tether due to at least one external force applied to the tether. As part of such an operation, the control system may operate the motor to apply one or more particular counteracting torques that each counteract unwinding of the tether, and possibly apply each counteracting torque for a respective duration. Specifically, each such counteracting torque may be at a magnitude that is substantially the same as the external force(s) being applied and may be in a direction that is effectively opposite to direction in which external force(s) are applied. In this way, this response operation may resist unwinding of the tether due to the external force(s) being applied without necessarily causing retraction of the tether back to the UAV. In practice, a user applying an external force to the tether may essentially feel that the tether cannot be lowered any further. Moreover, as magnitude of such counteracting torques increases, the tension of the tether may increase as well.

In another example, a motor response operation may involve a particular assistance operation that assists unwinding of the tether due to at least one external force applied to the tether. As part of such an operation, the control system may operate the motor to apply one or more particular assistive torques that each assist unwinding of the tether, and possibly apply each assistive torque for a respective duration. Specifically, each such assistive torque may be in a direction that is effectively that same to direction in which external force(s) are applied, and may be of any feasible magnitude. In this way, the assistive torques may be used in combination with the external force(s) being applied so as to further help unwinding of the tether. In practice, a user applying an external force to the tether may essentially feel that manual unwinding of the tether has been made easier due to lesser resistance to the unwinding.

In yet another example, a motor response operation may involve a particular retracting operation that retracts the tether against at least one external force applied to the tether. As part of such an operation, the control system may operate the motor to apply one or more particular retracting torques that each retract the tether against the external force(s), and possibly apply each retracting torque for a respective duration. Specifically, each such retracting torque may be at a magnitude that is larger than the external force(s) being applied and may be in a direction that is effectively opposite to direction in which external force(s) are applied. In this way, this response operation may resist unwinding of the tether due to the external force(s) being applied and in fact cause retraction of the tether back to the UAV despite the external force(s). In practice, a user applying an external force to the tether may essentially feel that the tether is pulling against the user to an extent that the tether retracts even as though the user applies the external force.

In yet another example, a motor response operation may occur after application of an external force by a user rather than during application of an external force by a user. For instance, a motor response operation may involve a tether movement operation that moves the tether in accordance with a particular tether movement profile after the external force is applied onto the tether. In practice, such a motor response operation may allow for user feedback/interaction to be carried out even when a user no longer physically interacts with the tether.

In this regard, the control system could detect an operational pattern indicative of a particular user interaction and then determine a motor response process that is to be carried out after the particular user interaction is complete. In particular, the control system may determine that the particular user interaction is complete by detecting yet another operational pattern of the motor that indicates so and/or may do this in other ways. In either case, once the control system determines that the particular user interaction is complete, the control system could then carry out the determined motor response process that involves movement of the tether in accordance with a particular tether movement profile.

Generally, the particular tether movement profile may take various forms and may be based on the operational pattern indicative of the user-interaction. For instance, the tether movement profile may simply involve retraction of the tether back to the UAV at a particular rate. In this instance, movement of the tether in accordance with this tether movement profile may occur based on detecting an operational pattern that is indicative of the user pulling down on the tether several consecutive times. Other instances and examples are possible as well.

FIG. 22 next illustrates an example motor response process. As shown, the control system determines that the above-described particular user-interaction 2110 corresponds to a motor response process 2200. Specifically, the motor response process 2200 involves a countering operation that includes application of a countering torque. That countering torque may have a magnitude of "T1" that is substantially the same as the magnitude "F1" of the downward force being applied by the user 2108. Also, that countering torque may be in a direction that is effectively opposite to the direction of the downward force being applied by the user 2108. As such, the control system may ultimately operate the motor of the winch system 2106 to apply that countering torque as the user 2108 applies the downward force onto the tether. Other examples are also possible.

iv. Operating the Motor in Accordance with the Determined Motor Response Process As noted above, once a motor response process is determined, the control system may then operate the motor in accordance with the determined motor response process, specifically doing so by transmitting to the motor one or more commands that instruct the motor to carry out certain operations in line with the response process. And as further noted above, the control system may do so during and/or after a user-interaction, depending on the motor response process that has been determined. Moreover, the motor response process that is carried out may lead to various outcomes in addition to the planned interaction/feedback with the user.

For example, the motor response process may correspond to one or more target tension forces being encountered by the tether. Specifically, each target tension force may be one that is expected to be experienced by the tether when the motor applies a certain torque in accordance with the motor response process. As such, the control system operating the motor in accordance with the determined response process may cause one or more such target tension forces to be encountered by the tether.

In another example, the motor response process may correspond to one or more target tether movement being encountered by the tether. Specifically, each target tether movement may be one that is expected to be experienced by the tether when the motor applies a certain torque in accordance with the motor response process. As such, the control system operating the motor in accordance with the determined response process may cause one or more such target tether movements to be encountered by the tether (e.g., a wave pulse traveling through the tether). Other examples are also possible.

Figure 23:
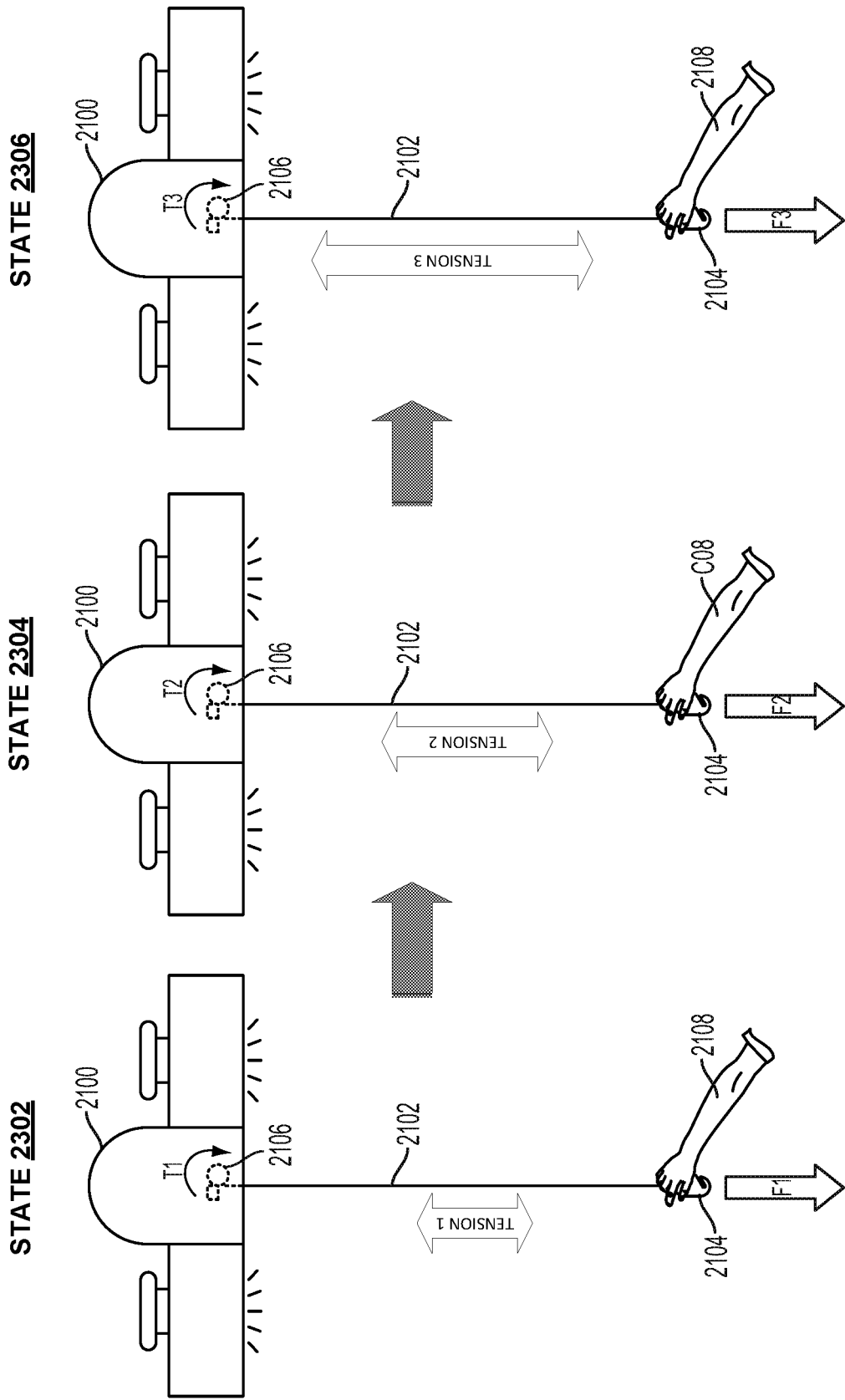
FIG. 23 illustrates a motor response process to adjust tension of the tether, according to an example embodiment.

FIG. 23 next illustrates an example motor response process in which the control system operates the motor to control tension of the tether 2102 as the user 2108 grasps onto the tether 2102, such as during the process of manually coupling a payload for instance. Assuming that the UAV 2100 substantially maintains its physical position in space while hovering, the control system may proportionally (e.g., linearly) increase the torque of the motor in a winding direction as a downward force provided by the user 2108 increases, and vice versa. In this way, the tension of the tether 2102 may increase as the user 2108 pulls the tether 2102 further down, and vice versa. Moreover, the control system may be configured proportionally increase the torque of the motor up to a maximum torque, thereby saturating the tension of the tether and ideally preventing the user 2108 from pulling the UAV 2100 down towards the ground.

More specifically, at state 2302 of the motor response process, the control system operates the motor to apply a torque having a magnitude "T1" to counteract the magnitude "F1" of the force provided by the user 2108, thereby resulting in a first tension force being encountered by the tether 2102. Then, at state 2304 of the motor response process, the control system operates the motor to apply a torque having a magnitude "T2" that is larger than "T1" and do so to counteract the force magnitude "F2" that is larger than "F1", thereby resulting in the tether 2102 encountering a second tension force that is larger than the first tension force. Finally, at state 2306 of the motor response process, the control system operates the motor to apply a torque having a magnitude "T3" that is yet larger than "T2" and do so to counteract the force magnitude "F3" that is yet larger than "F2", thereby resulting in the tether 2102 encountering a third tension force that is yet larger than the second tension force.

Figure 24:
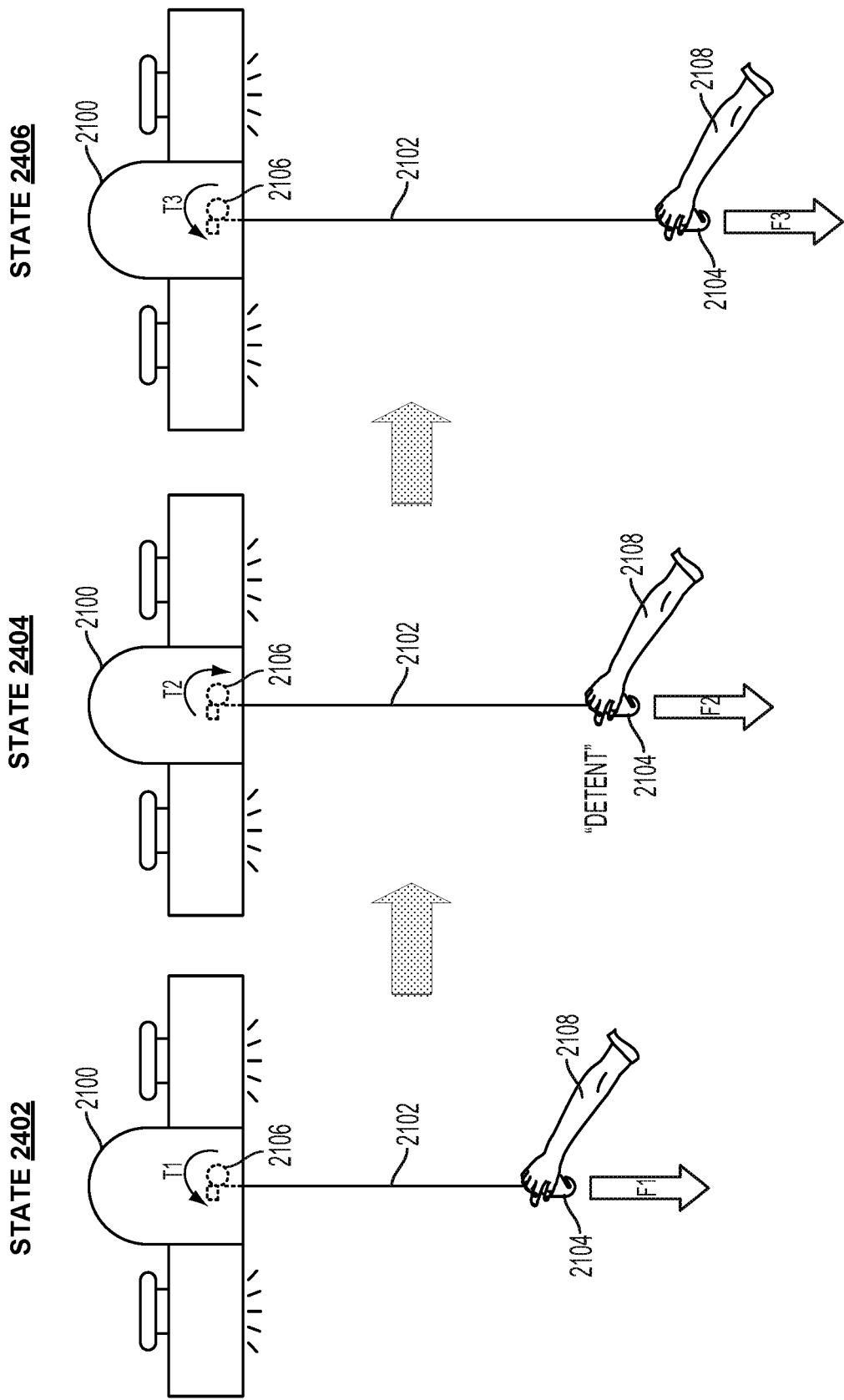
FIG. 24 illustrates a motor response process to provide the feel of a detent, according to an example embodiment.

FIG. 24 next illustrates an example motor response process in which the control system may operate the motor to vary the amount, and possibly the direction, of the torque that is applied to the tether 2102 over time, specifically doing so to enhance user-experience or for other reasons. For instance, the control system may operate the motor to replicate the feel of detents or clicks as the user 2108 pulls down on the tether 2102, and/or to provide vibrational feedback (e.g., a wave pulse) via the tether 2102, among other possibilities.

More specifically, at state 2402 of the motor response process, the control system operates the motor to apply an assistive torque that has a magnitude "T1" and is in the same direction as the force provided by the user 2108, thereby assisting the user 2108 with unwinding of the tether 2102. Then, during unwinding of the tether 2102 at state 2404 of the motor response process, the control system operates the motor to apply a counteracting torque having a magnitude "T2" to counteract the magnitude "F2" of the force provided by the user 2108, thereby resulting in a feel of a "detent" being experienced by the user 2108. Finally, at state 2406 of the motor response process, the control system again operates the motor to apply an assistive torque, so as to continue assisting the user 2108 with unwinding of the tether 2102. Specifically, this further assistive force is shown as having a magnitude "T3" and being provided in the same direction as the force (having magnitude "F3") provided by the user 2108.

Figure 25:
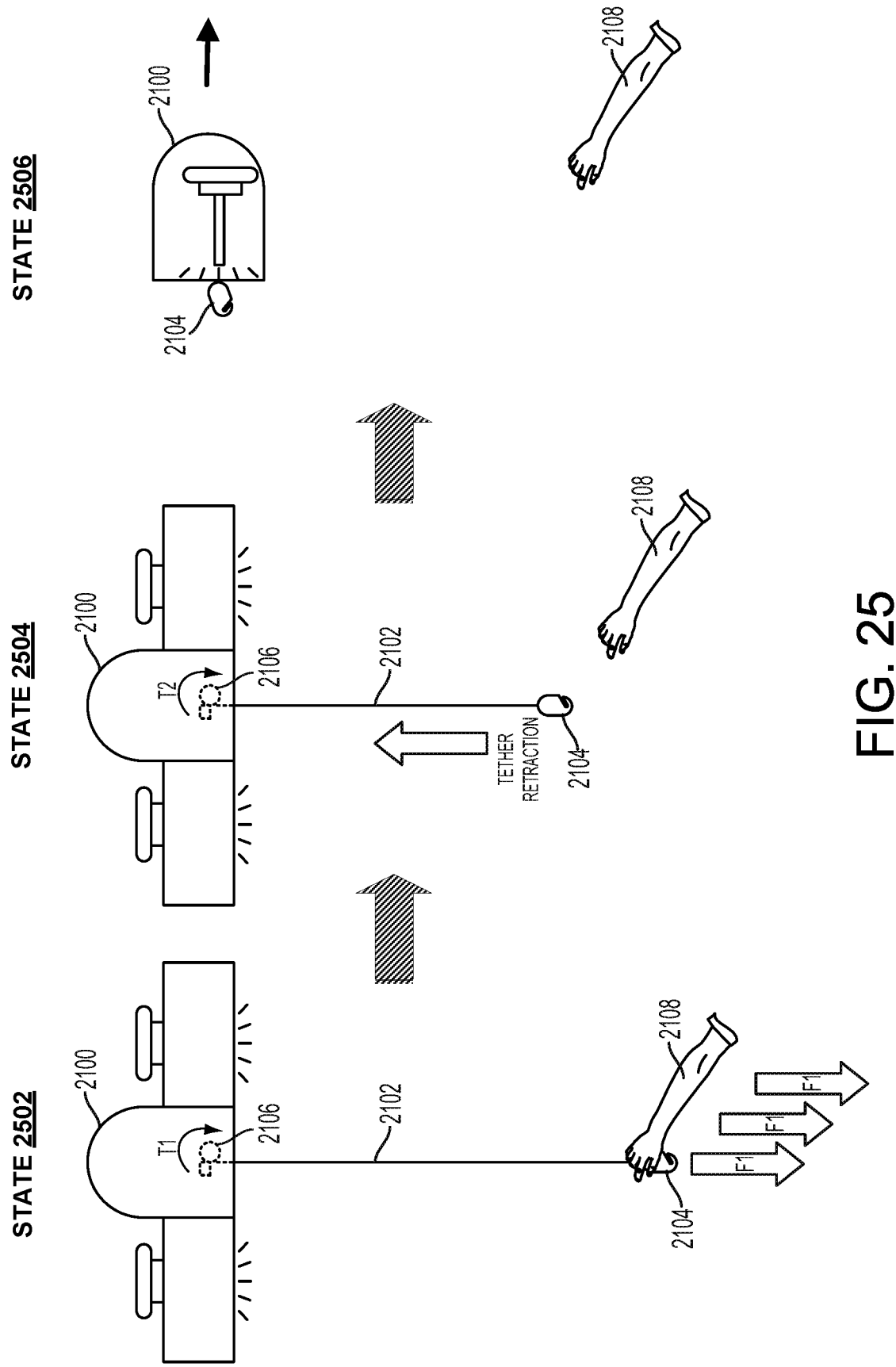
FIG. 25 illustrates a motor response process followed by a UAV response process, according to an example embodiment.

FIG. 25 next illustrates an example motor response process in which the control system interprets the user 2108's interaction with the tether 2102 to determine that the user 2108's intention is to cause the UAV 2100 and/or the motor of the winch system 2106 to carry out certain operations. Specifically, at state 2502 of the motor response process, the control system detects an operational pattern that indicates that the user 2108 pulled down on the tether 2102 at least three consecutive times with a force substantially having magnitude of "F1". Upon detecting such gesture by the user 2108, the control system may interpret the gesture as a signal that a payload has been properly decoupled from the payload coupling apparatus 2104 and thus that the UAV 2100 may proceed with further flight to a target destination. Generally, to facilitate such gestures, users could be provided with a manual or the like listing the various gestures that are interpretable by the disclosed system.

More specifically, as shown by state 2504 of the motor response process, the control system responds to the gesture by carrying out a motor response process that involves operating the motor to apply a torque having a magnitude "T2" for purposes of retracting the tether 2102 back to the UAV 2100. Moreover, the control system does so once the user 2108 has completed interaction with the tether 2102 and thus no longer applies external force(s) to the tether 2102. Finally, once the tether 2102 has been retracted, the UAV 2100 may then proceed with forward flight to a target destination, as shown by state 2506. Other examples are possible as well.

v. Additional Features of User Interaction and Feedback

In a further aspect, the control system could consider other factors as basis for determining a motor response process. In practice, the control system may consider such factors in addition to or instead of consideration of the detected operational pattern of the motor as described above. Moreover, the control system may consider any feasible combination of these factors, possibly giving some factors more weight compared to others.

In one case, the control system may consider a state of the environment as basis for determining a motor response process. Specifically, the control system may receive, from one or more of the UAV's sensors (e.g., image capture device), sensor data representative of the UAV's state of the environment, such as of obstacles near the UAV, among other possibilities. And the control system may then determine the motor response process based at least on that sensor data. For example, if the control system detects an obstacle within a threshold distance away from the tether, the control system may responsively select a motor response process in which the tether encounters smaller target tether movements rather than larger target tether movements, thereby attempting to avoid collision with the obstacle.

In another case, the control system may consider a UAV's state of flight as basis for determining a motor response process. Specifically, the control system may receive, from a flight management system (e.g., on-board the UAV and/or external to the UAV), flight data representative of a state of flight of the UAV, which may be the UAV's flight progress along a planned flight path, among other possibilities. And the control system may then determine the motor response process based at least on that flight data. For example, if the control system determine that the UAV's flight progress is significantly behind a planned schedule along the flight path, the control system may responsively select a motor response process in which the motor begins retracting the tether to a certain extent, so as to indicate to a user that that the UAV's flight progress is significantly behind the planned schedule. Other cases and examples are possible as well.

In yet a further aspect, the control system may carry out the disclosed method 1900 conditioned upon a payload (e.g., the payload coupling apparatus and/or a coupled payload) being at a payload altitude at which a user-interaction is expected. More specifically, the control system may determine a payload altitude of the payload and may make a determination that the payload altitude is one at which a user-interaction is expected. Once the control system makes that determination, the control system may then responsively carry out the method 1900, such as when a user-interaction is actually detected for instance.

Generally, the control system may use various techniques to determine the payload altitude. In one example, an altitude sensor may be coupled to the payload (e.g., to the payload coupling apparatus) and the control sensor may receive, from the altitude sensor, altitude data indicative of the payload altitude. In another example, the control system may determine an unwound length of the tether, such as by using techniques described herein for instance. Also, the control system may determine a flight altitude based on altitude data received from an altitude sensor of the UAV, among other possibilities. Then, the control system may use the determined unwound tether length of the tether as well as the determined flight altitude as basis for determining the payload altitude. For example, the control system may subtract the determined unwound tether length of the tether (e.g., 5 feet) from the determined flight altitude (e.g., 11 feet above ground) so as to determine the payload altitude (e.g., 6 feet above ground).

Moreover, the control system may take various approaches for determining that the payload altitude is one at which a user-interaction is expected. For instance, the control system may determine that the payload altitude is less than a threshold altitude (e.g., established via manual engineering input). In practice, the threshold altitude may be a height above ground at which users can feasibly reach the payload and thus interact with the tether. Other instances are possible as well.

In yet a further aspect, the control system may operate the UAV itself in accordance with a UAV response process, which may involve at least a particular movement of the UAV. In practice, the particular movement could take on any feasible forms. For example, the particular movement may involve side to side movement of the UAV along an axis in physical space. In another example, the particular movement may involve initiation of forward flight along a flight path, as shown by state 2506 of FIG. 25 for instance. Other examples are possible as well.

Generally, the control system may operate the UAV in accordance with the UAV response process in addition to or instead of operating the motor in accordance with a determined motor response process. And if the control system does so in addition to operating the motor in accordance with a motor response process, the control system may operate the motor and the UAV, respectively, to carry out those processes simultaneously and/or at different times. Moreover, the control system may operate the UAV in accordance with the UAV response process after and/or during a user-interaction.

Yet further, the control system may determine the UAV response process based on various factors. In doing so, the control system may consider any feasible combination of those factors, possibly giving more weight to some factors compared to others. Nonetheless, various factors are possible.

In one example, the control system may determine the UAV response process based on a detected operational pattern of the motor. For instance, the control system may have stored thereon or may otherwise be configured to refer to mapping data that maps a plurality of operational patterns each with a respective UAV response process. For instance, the mapping data may map a particular sequence of current levels with a UAV response process involving the operating the UAV to tilt by a certain extent and in a certain direction. As such, the control system may determine the UAV response process by referring to the mapping data to determine the respective UAV response process that is mapped to the detected operational pattern of the motor.

In another example, the control system may determine the UAV response process based on a state of the UAV's environment and/or based on the UAV's state of flight. For instance, if the control system determines that the UAV's state of flight involves the UAV hovering over a first location on the ground and that the state of the UAV's environment includes a user physically pointing to a second location on the ground, then the UAV response process may involve the UAV flying in hover flight so as to end up hovering over the second location, such as for purposes of delivering a payload at the second location for instance. Other examples and aspects are possible as well.

It is noted that the above-described features related to user interaction/feedback are not limited to a situation in which the UAV is hovering and could be carried out in various situations without departing from the scope of the present disclosure. For example, the various features may be carried out in a situation in which the UAV has landed on a ledge and the tether has been at least partially unwound such that the tether is suspended by the UAV over an edge of the ledge. Other examples are possible as well.

X. POST-DELIVERY TETHER CONTROL

A. Release Verification

As noted above, when a UAV lowers a payload to the ground by controlling a motor to unwind a tether coupled to the payload, the control system of the UAV may monitor the current of the motor and/or the rotation of the spool to verify that the payload has reached the ground. The control system may then operate the motor to cause over-run of the tether by continuing to unwind the tether from the spool. Once the touchdown of the payload is verified and tether over-run is performed, the control system may operate in a release-verification mode in order to verify separation of the payload from the payload coupling apparatus, before beginning the process of lifting the payload coupling apparatus back to the UAV.

Figure 26:
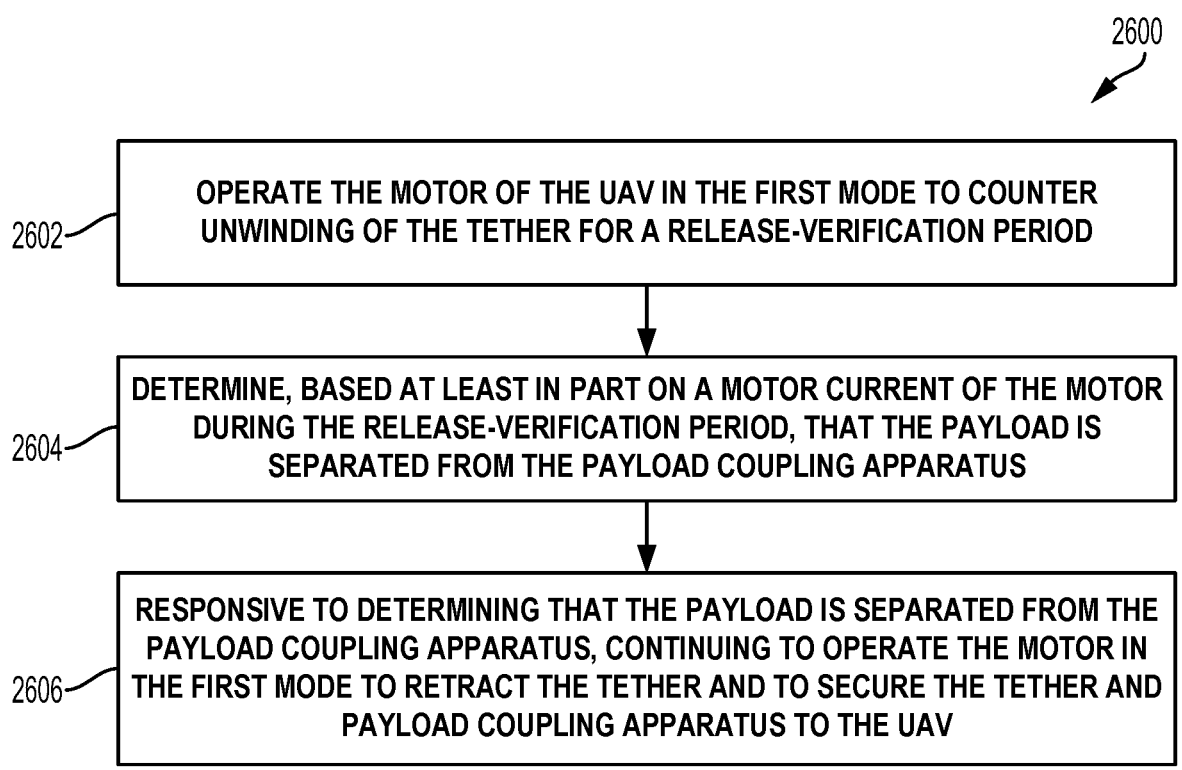
FIG. 26 is a flow chart of a method for determining whether a payload has detached from a tether of a UAV, according to an example embodiment.

FIG. 26 is a flow chart illustrating a release verification method 2600, according to an example embodiment. Method 2600 may be initiated upon the completion of method 1800 (e.g., at the end of the tether over-run period), as part of operation in the release-verification mode.

As shown, method 2600 involves the control system operating the motor in the first mode (where torque is applied to counter the pull of gravity on the tether) for a release-verification period, as shown by block 2602. In practice, the control system may apply a speed profile designed for release verification. The speed profile may be designed so as to lift the specific weight of the payload coupling apparatus a small distance during the release-verification period. Thus, if the payload has not been released, the motor will draw more current to follow this speed profile, than it does when the payload has been properly released from the payload coupling apparatus. Accordingly, based at least in part on the motor current during the release-verification period, the control system may determine that the payload is separated from the payload coupling apparatus, as shown by block 2604. For instance, the control system may determine that the payload is separated from the payload coupling apparatus by determining that the motor current during the release-verification period is below a threshold current for at least a threshold amount of time. And, in response to this determination, the control system may operate the motor to retract the tether, as shown by block 2606.

On the other hand, if the motor current during the release-verification period is large enough, then the control system may determine that the payload has not been separated from the payload coupling apparatus, and may repeat the processes of operating the motor to cause over-run of the tether (this time, perhaps, by some predetermined additional length) and then pulling upwards on the tether to test for payload separation, shown in blocks 1808 and 2602 to 2606.

B. Tether Retraction Processes

Once the release of the payload has been verified (e.g., by performing method 2600), the control system may switch to a retraction mode, in order to retract the tether to lift the payload coupling apparatus back to the UAV.

In the retraction mode, the ascent of the payload coupling apparatus may be divided into two phases: an initial ascent and a final ascent phase.

During the initial ascent, the control system may implement a predetermined ascent rate profile, which may be designed with the safety of bystanders and/or surrounding structures in mind. After the initial ascent is complete (e.g., once a certain length of tether has been wound up), the control system may pause the retraction process, e.g., by operating the motor to maintain a substantially constant length of unwound tether.

Due to the reduction in weight suspended from the tether (e.g., the weight of the payload coupling apparatus only), the payload coupling apparatus may be more susceptible to swinging back and forth once the payload is released. Accordingly, during the pause in the retraction process, the control system may evaluate whether the payload coupling apparatus is oscillating (e.g., as a pendulum) and/or determine the magnitude of oscillations, and may evaluate whether actions should be taken to dampen the oscillations. After or during such damping processes, the control system may initiate the final ascent of the payload coupling apparatus, in which the tether retracts fully to pull the payload coupling apparatus to the UAV, and seat the payload coupling apparatus in the UAV's receptacle for the flight back to a return location.

More details regarding retraction of the tether and payload coupling apparatus after delivery are provided in reference to FIGS. 38A-38C below.

XI. DAMPING OSCILLATIONS OF A PAYLOAD

In practice, the UAV may sometimes encounter situations in which the tether is at least partially unwound and a suspended payload coupled to the tether is susceptible to oscillations. In one example of this situation, the UAV may deploy the tether for delivery of a coupled payload, thereby making the coupled payload susceptible to oscillations. In another example of this situation, the UAV may deploy the tether for pickup of a payload, thereby making the payload coupling apparatus (e.g., considered to be the payload in this case) susceptible to oscillations. In yet another example of this situation, the UAV may retract the tether following coupling of the payload for pickup, thereby making the coupled payload susceptible to oscillations. In yet another example of this situation, the UAV may retract the tether following release of the payload after delivery, thereby making the payload coupling apparatus (e.g., again considered to be the payload in this case) susceptible to oscillations. Other examples are also possible.

In such situations, various factors may cause oscillations of the suspended payload. In one example, sufficiently strong wind conditions may cause the payload to oscillate. In another example, movement of the UAV to maintain its position in hover mode may cause the payload to oscillate. And in yet another example, oscillations of the payload may be a result of an external force applied by a user to the tether and/or the payload itself. Other examples are also possible.

Generally, oscillation of the payload may cause the payload to move back and forth in a pendulum-like motion, also referred to as pendular motion. In practice, the pendular motion of an oscillating payload could have various consequences. For example, the pendular motion of an oscillating payload may have undesirable effects on the stability of the UAV, may create difficulties in positioning the payload in a desired location on the ground, may create an undesired movement of the payload near the ground, or may create difficulties in seating the payload coupling apparatus in the UAV's receptacle, among other problems.

To resolve these problems, the UAV's control system may perform one or more damping techniques, such as those described below. As noted above, such damping techniques may be performed after delivery of the payload, during a pause in the tether retraction process. However, it should be understood that the below described damping techniques could be applied in other scenarios as well. Further, damping techniques described herein could be applied in scenarios where the payload is still attached to the payload coupling apparatus (perhaps with some adjustments to account for the increased weight suspended from the tether, as compared to when only the payload coupling apparatus is attached). More generally, damping techniques disclosed herein could apply in any scenario where a tether suspends a weight from an aerial vehicle.

A. Detection and Evaluation of Payload Oscillations

In an example implementation, a UAV may include one or more sensors arranged to generate sensor data indicative of oscillations of the payload coupling apparatus (and/or of the coupled payload) suspended below the UAV. In practice, these sensors may include a current sensor coupled to the winch motor, a tension sensor on the tether, an inertial measurement unit (IMU) on the UAV and/or on the payload coupling apparatus, an image capture device on the UAV, and/or an encoder on the winch motor, among other possibilities. Accordingly, the UAV's control system may use sensor data from any combination of such sensors so as to detect oscillations of the payload as well as attributes of the oscillations, such as amplitude, frequency, and/or speed of oscillations, among other options.

In one case, the current sensor may generate data representative of electric current characteristics of the motor. The control system may receive such current data and may use the current data as basis for detecting oscillations of the payload as well as for determining attributes of those detected oscillations. To do so, the control system could refer to mapping data or the like that maps various current characteristics each with an indication of payload oscillations and/or with respective attributes of payload oscillations. For example, a particular set of current characteristics (e.g., a particular relative change in current value) may be mapped to an indication that the payload is oscillating. Also, another particular set of current characteristics (e.g., a particular rate of change in current value) may be mapped to an indication that the payload is oscillating with a particular amplitude of oscillation.

In another case, the tension sensor may generate tension data representative of tension of the tether. The control system may receive such tension data and may use the tension data as basis for detecting oscillations of the payload as well as for determining attributes of those detected oscillations. To do so, the control system could refer to mapping data or the like that maps various tether tension characteristics each with an indication of payload oscillations and/or with respective attributes of payload oscillations. For example, a particular set of tether tension characteristics (e.g., a particular relative change in tension) may be mapped to an indication that the payload is oscillating. Also, another particular set of tether tension characteristics (e.g., a particular rate of change in tension) may be mapped to an indication that the payload is oscillating with a particular speed.

In yet another case, the IMU may generate movement data indicative of movement of the payload relative to the aerial vehicle. The control system may receive such movement data and may use the movement data as basis for detecting oscillations of the payload as well as for determining attributes of those detected oscillations. To do so, the control system could refer to mapping data or the like that maps various characteristics of movement data each with an indication of payload oscillations and/or with respective attributes of payload oscillations. For example, a particular set of movement data characteristics may be mapped to an indication that the payload is oscillating. Also, another particular set of movement data characteristics (e.g., movement data indicative of particular force) may be mapped to an indication that the payload is oscillating with a particular amplitude of oscillation.

In yet another case, the image capture device may be arranged to face the payload and thus provide image data representative of position of the payload relative to the UAV. With this arrangement, the control system may receive the image data and may use any currently known and/or future developed image processing techniques to evaluate the image data. In doing so, the control system may use the image data to determine position of the payload over time. More specifically, the control system may detect oscillation of the payload by determining a difference in position of the payload over time. Moreover, the control system could use the image data as basis for determining attributes of detected oscillations. For example, the control system may determine a difference between certain payload positions over time and then determine amplitude of oscillation based on the determined difference. In another example, the control system may use the image data to determine a rate of change in position of the payload and then determine a speed of oscillation based on the determined rate of change. Other cases and examples are possible as well.

Moreover, various attributes of payload oscillations may depend on the extent to which the tether is unwound. For instance, a shorter unwound tether length may cause the payload to swing with a higher frequency compared to a frequency with which the payload swings when the unwound tether length is longer. For this reason, the control system may consider unwound tether length as an additional factor when determining attributes of payload oscillations. For example, after determining that the tether is unwound at a particular length, the control system may determine positions of the payload over time. Then, the control system may refer to mapping data that maps the combination the determined unwound length of the tether and the determined positions to a particular amplitude of oscillations and to a particular frequency of oscillations. Alternatively, the control system may determine such attributes based on a predetermined formula that inputs variables, such the unwound tether length and determined positions, and that outputs data indicative of one or more of the above-mentioned attributes. Other examples are also possible.

In practice, the control system may determine the unwound tether length by receiving from the encoder position data representative of the unwound length of the tether. More specifically, the encoder may be coupled to the motor such that, as the motor carries out rotation to unwind and/or wind the tether, the encoder generated data representative of an angular position and/or motion of the motor (e.g., of a transmission assembly of the motor). As such, the control system may receive the data and may use the data as basis for tracking the unwound length of the tether. For example, the control system may detect two revolutions of the motor in a particular direction based on the data from the encoder and may determine that those two revolutions correspond to unwinding of the tether by two meters. Other examples are also possible.

In a further aspect, the control system may also use the sensor data as basis for determining the detected oscillations exceed a threshold (e.g., established via manual engineering input). For example, the control system may determine that the sensor data is indicative of a particular amplitude of the oscillations of the payload, and may determine that the particular amplitude is higher than threshold amplitude. In another example, the control system that the sensor data is indicative of a particular speed of the oscillations of the payload, such as a speed at which the payload swings back and forth while the tether is partially unwound. In this example, the control system may then determine that this particular speed is higher than a threshold speed. In yet another example, the control system that the sensor data is indicative of a particular frequency of the oscillations of the payload, such as a frequency at which the payload swings back and forth while the tether is partially unwound. In this example, the control system may then determine that this particular frequency is higher than a threshold frequency. Other examples are possible as well.

B. Damping During a Tether Retraction Process

Figure 27:
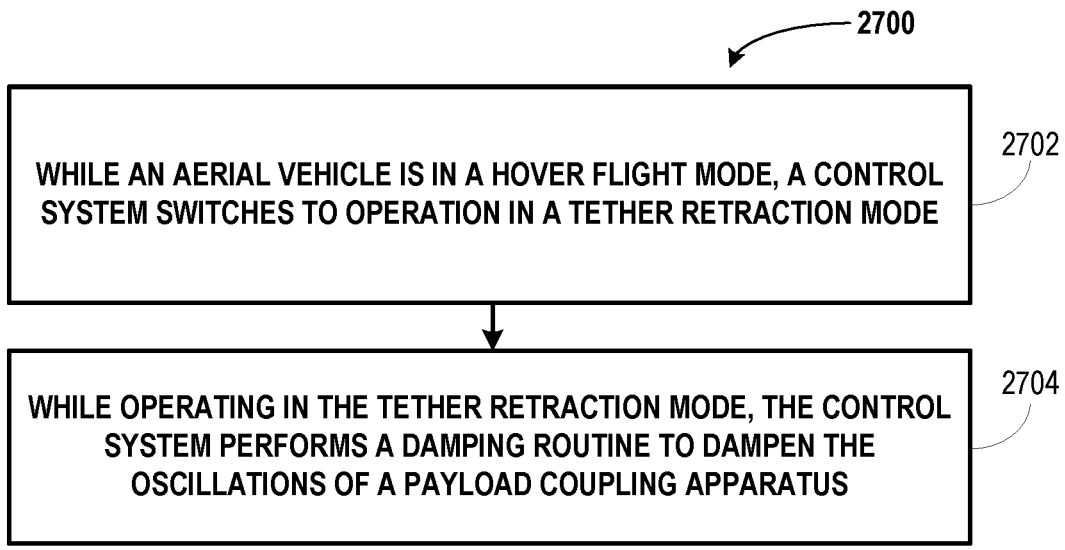
FIG. 27 is an example flowchart for initiating a damping routine to dampen oscillations of a payload coupling apparatus, according to an example embodiment.

FIG. 27 is a flowchart illustrating a method 2700 for initiating a damping routine (could also be referred to herein as a damping technique), according to an example embodiment. Method 2700 may be implemented by a UAV's control system during a tether retraction process. In practice, the tether retraction process may be carried out after delivery and/or at other times during pick-up and/or delivery. Moreover, although method 2700 is described as being carried out in the context of a payload coupling apparatus, method 2700 could also be carried out in the context of a payload coupled to the payload coupling apparatus.

Turning to method 2700, the UAV may initially be operating in a hover flight mode, as shown by block 2702. For instance, the UAV may hover over a target or delivery location, or over a source location. Once the payload is released on the ground, the UAV's control system may switch to a tether retraction mode, as shown by block 2702. While operating in the tether retraction mode, the control system may perform a damping routine to dampen the oscillations of the payload coupling apparatus, as shown by block 2704. Optionally, the control system may do so specifically in response to determining that detected oscillations exceed a threshold.

Generally, the damping routine that the control system performs may be any combination of the damping routines described herein. In some cases, however, the control system may perform one or more damping routine other those described herein and do so without departing from the scope of method 2700.

As noted above, a damping routine, such as that performed at block 2704, may be carried out during a pause in the ascent process (and perhaps during a pause while lowering the payload coupling apparatus as well). In some embodiments, the control system may wait until the oscillations are sufficiently dampened before resuming the process of retracting (or lowering) the tether. For example, the control system may pause until it determines that the amplitude of the oscillations is less than a threshold amplitude, or possibly even that the payload coupling apparatus is resting in an equilibrium position. In either case, the control system may responsively resume retraction of the tether to lift the payload coupling apparatus to the UAV. In other embodiments, however, the control system may not wait until the oscillations are sufficiently dampened before resuming the process of retracting (or lowering) the tether. For example, the control system might pause the tether retraction process for a fixed period of time before resuming. Specifically, upon starting performance of the damping routine, the control system may initiate a timer that is arranged to expire after a particular duration (e.g., established via manual engineering input), and may resume the process of retracting (or lowering) the tether in response to detecting expiration of that timer. Other examples are also possible.

FIGS. 28A to 28D next collectively illustrate initiation of a damping routine during a tether retraction process.

Figure 28A:
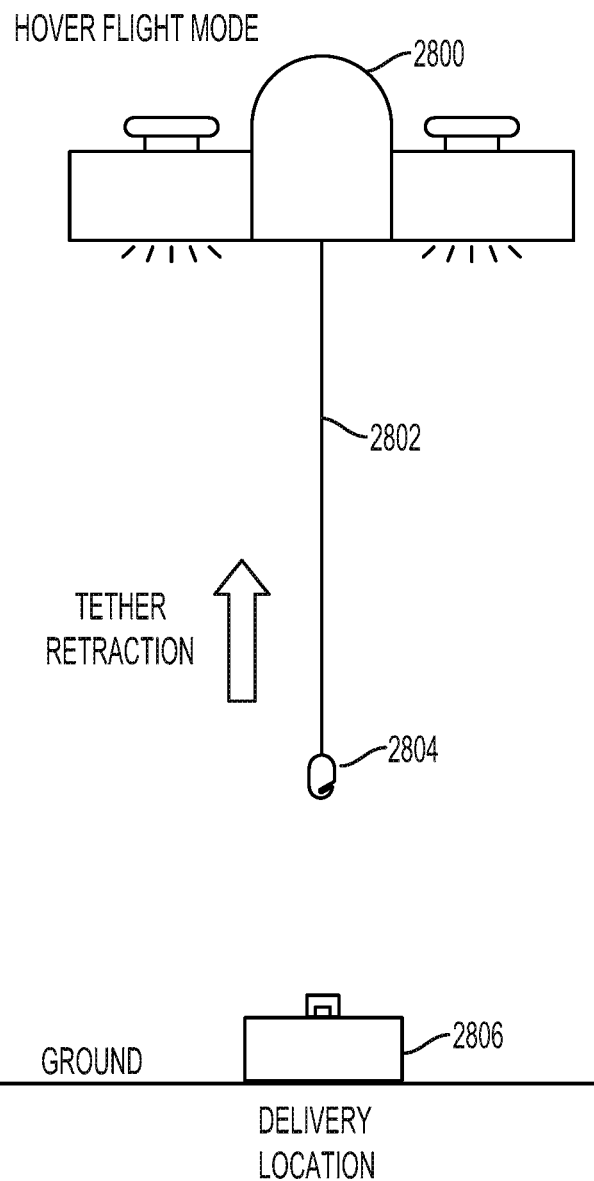
FIGS. 28A to 28D collectively illustrate initiation of a damping routine during a tether retraction process, according to an example embodiment.

As shown by FIG. 28A, a UAV 2800 includes tether 2802 and a payload coupling apparatus 2804 coupled to the tether 2802. Also, a payload 2806 is shown as having been delivered by the UAV 2800 at a delivery location on the ground. Moreover, FIG. 28A shows that the UAV 2800 is hovering over the delivery location while the UAV's control system operates in the tether retraction mode to ascent the payload coupling apparatus 2804 back to the UAV after delivery of the payload 2806.

Figure 28B:
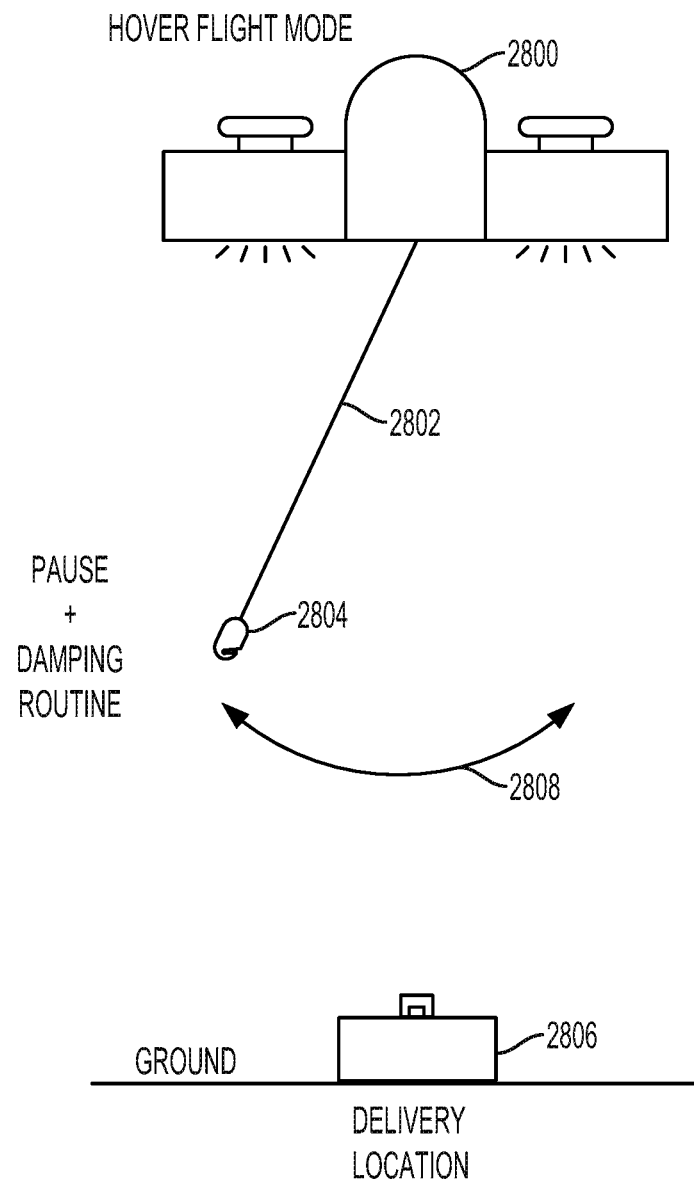

As shown by FIG. 28B, while operating in the tether retraction mode, the UAV's control system pauses the ascent of the payload coupling apparatus 2804. During the pause, the control system performs a damping routine, as indicated by FIG. 28B. As noted, the damping routine could be any of the damping routines described herein, among others. Optionally, as noted, the control system performs the damping routine in response to detecting that oscillations of the payload coupling apparatus 2804 are at an oscillation amplitude 2808 that is greater than a threshold amplitude.

Figure 28C:
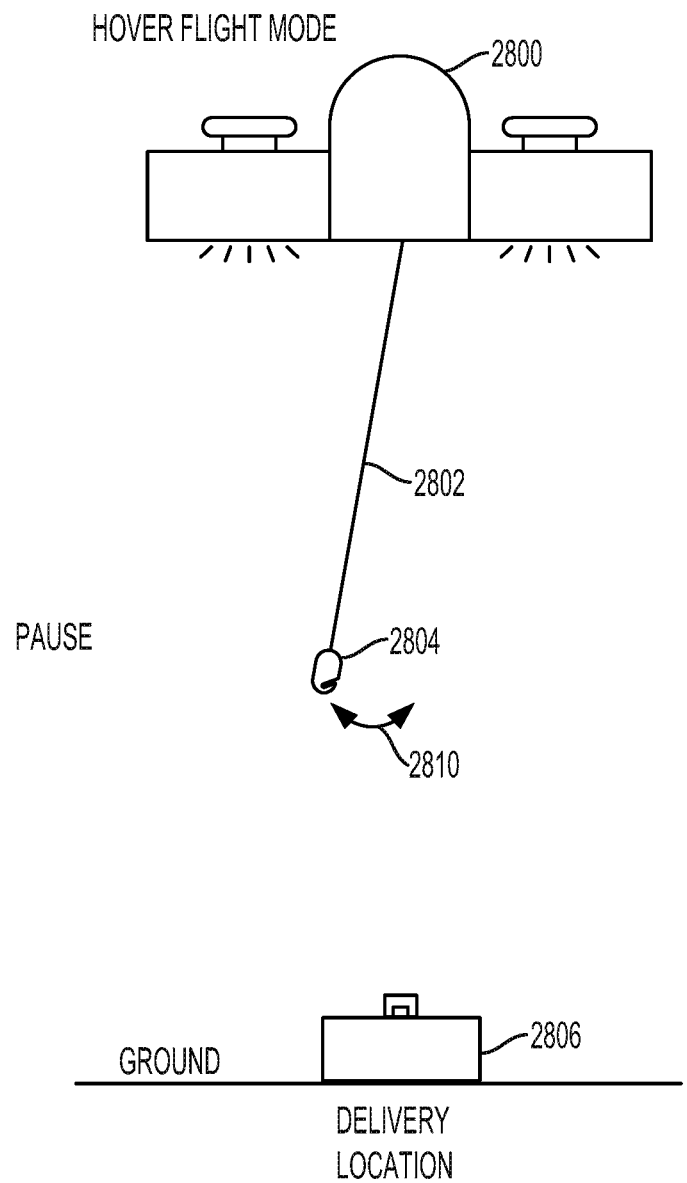
Figure 28D:
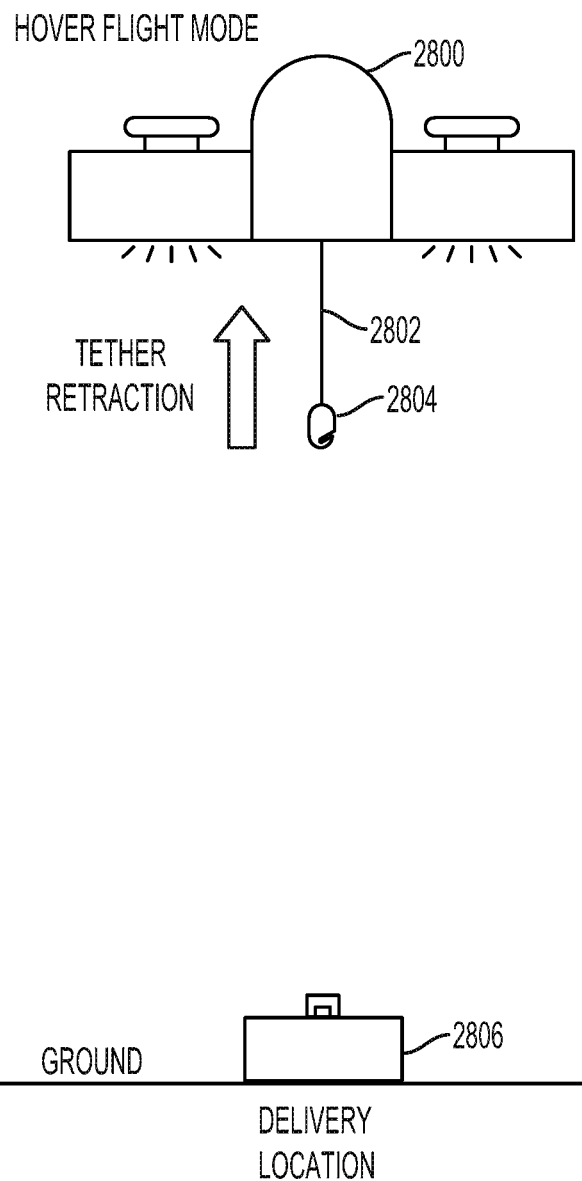

As shown by FIG. 28C, while the UAV's control system still pauses ascent of the payload coupling apparatus 2804, the oscillations are shown to have been dampened due to the damping routine. In one case, during the pause and after carrying out of the damping routine for some time period, the control system detects that oscillations of the payload coupling apparatus 2804 are at an oscillation amplitude 2810 that is lower than the threshold amplitude. In this way, the control system determines that the oscillations have been sufficiently dampened and responsively determines that the tether retraction process may resume. In another case, the control system detects expiration of a timer initiated upon starting performance of the damping routine, and determines that the tether retraction process may resume in response to detecting expiration of that timer. As such, in either case, the control system may responsively resume operation in the tether retraction mode to ascent the payload coupling apparatus 2804 back to the UAV 2800 after delivery of the payload, as shown by FIG. 28D. Other illustrations are also possible.

C. Example Damping Techniques

Although several damping techniques are described below, it should be understood that other damping techniques and modifications to the described techniques are possible as well without departing from the scope of the present disclosure.

i. Forward Flight to Dampen Oscillations

Figure 29:
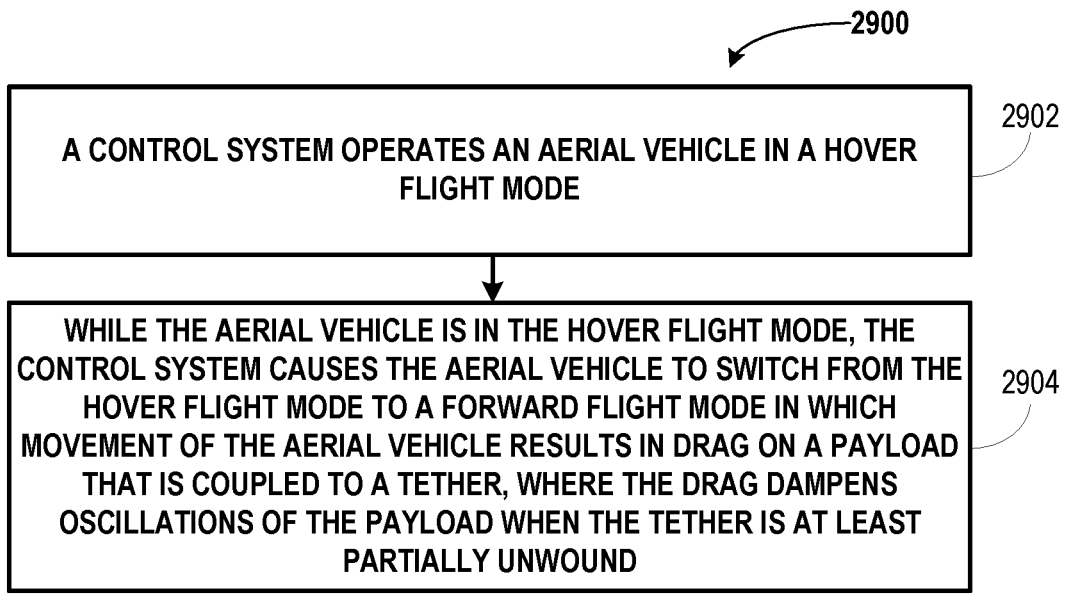
FIG. 29 is an example flowchart for initiating forward flight to dampen oscillations of a payload, according to an example embodiment.

FIG. 29 is a flowchart illustrating a method 2900 for initiating forward flight to dampen oscillations. As noted above, the UAV may be configured to fly in accordance with a hover flight mode and in accordance with a forward flight mode. In hover flight mode, flight dynamics may be similar to a helicopter. More specifically, lift and thrust may be supplied by rotors that allow the UAV to take off and land vertically and fly in all directions. In forward flight mode, however, flight dynamics may be similar to an airplane. More specifically, a fixed-wing UAV may be propelled forward by thrust from a jet engine or a propeller, with fixed wings of the UAV providing lifting and allowing the UAV to glide substantially horizontally relative to the ground.

With this arrangement, the UAV may operate in accordance with hover flight mode, as shown by block 2902. As noted, the UAV may do so during a process of deploying the tether for payload pickup and/or for payload delivery, or may do so during a process of retracting the tether for payload pickup and/or for payload delivery. Regardless, while the UAV is in the hover flight mode, the UAV's control system may cause the UAV to switch from the hover flight mode to the forward flight mode, as shown by block 2904.

Optionally, the control system may do so in response to determining that detected oscillations exceed a threshold. Also, the payload at issue may be considered to be a payload (e.g., a package) that is coupled the payload coupling apparatus or may be considered to be the payload coupling apparatus itself, among other possibilities.

More specifically, by switching to the forward flight mode, the movement of the UAV may result in drag on the payload. Generally, drag is considered to be an aerodynamic force or friction that opposes or resists an object's motion through the air due to interaction between the object and molecules of the air. So in a forward flight scenario, airflow may result in drag that is directed along a direction opposite to the direction of the forward flight. Thus, the resulting drag may dampen the detected oscillations of the payload because the airflow may help stabilize the payload.

Furthermore, in some embodiments, when the control system causes the UAV to switch to the forward flight mode, the control system may also direct the UAV to operate in the forward flight mode with certain flight characteristics. In practice, these flight characteristics may include flight speed, flight direction, and/or flight timing, among other possibilities. As such, the control system may determine the appropriate flight characteristics based on various factors. And in accordance with the present disclosure, the control system may determine the appropriate flight characteristics based at least on the detected oscillations of the payload and/or based on other factors.

By way of example, the control system may determine an initial flight speed for the forward flight mode based at least on the detected oscillations. In practice, the initial flight speed may be a flight speed to which the UAV initially accelerates immediately after switching to forward flight mode and one which the UAV ultimately maintains for at least some time period during the forward flight mode. So in accordance with the present disclosure, the control system may determine an initial flight speed that is generally higher when amplitude of the detected oscillations is greater. For instance, the control system may select a first initial flight speed when the control system detects a first amplitude of oscillation of the payload and may select a second initial flight speed when the control system detects a second amplitude of oscillation of the payload, with the first amplitude being higher than the second amplitude and the first initial flight speed being higher than the second initial flight speed. Note that the initial flight speed may additionally or alternatively depend on mass and/or drag of the payload, or may simply be predefined via manual engineering input or the like.

In another example, the control system may determine flight timing for the forward flight mode based at least on the detected oscillations. In particular, determining flight timing may involve determining a time at which to initiate the forward flight mode, a duration for which to carry out damping as part of the forward flight mode, and/or a time to end the forward flight mode, among other possibilities. In either case, the control system may consider various factors related to the detected oscillations as basis for determining the flight timing. For instance, the control system may determine state of the payload swing, such as whether the payload is at a top of a swing or a bottom of a swing, and use that determined state of the payload swing as basis for determining the flight timing. In another instance, the control system may determine an extent (e.g., amplitude) of payload oscillations and may determine the flight timing based on the determined extent. Note that the flight timing may alternatively be predefined via manual engineering input or the like. Other instances and examples are possible as well.

In a further aspect, the control system may help facilitate the forward flight damping routine in various situations. In one example situation, the control system may initiate forward flight to dampen oscillations during a process of retracting the tether for payload pickup and/or for payload delivery. In this example situation, the control system could technically initiate the forward flight at any point of the retraction process, such as without a pause in the retraction process. Ideally, however, the control system may operate the motor to pause retraction of the tether while the detected oscillations exceed the threshold, which may allow the control system to initiate the forward flight mode during the pause in the retraction process. Then, once the control system detects that oscillations of the payload have been sufficiently dampened by the drag (e.g., that the detected oscillations no longer exceed the threshold) and/or after a fixed time delay (e.g., in response to detecting expiration of a timer), the control system may then operate the motor to resume retraction of the tether.

In another example situation, the control system may initiate forward flight to dampen oscillations during a process of deploying the tether for payload pickup and/or for payload delivery. In this example situation, the control system could technically initiate the forward flight at any point of the deployment process, such as without a pause in the deployment process. Ideally, however, the control system may operate the motor to pause deployment of the tether while the detected oscillations exceed the threshold, which may allow the control system to initiate the forward flight mode during the pause in the deployment process. Then, once the control system detects that oscillations of the payload have been sufficiently dampened by the drag and/or after a fixed time delay (e.g., in response to detecting expiration of a timer), the control system may then operate the motor to resume deployment of the tether. Various other example situations are possible as well.

Yet further, when the control system operates the motor to resume deployment or retraction of the tether, the control system may ideally do so while the UAV operates in the forward flight mode, but could also do so while the UAV operates in the hover flight mode.

For example, once the control system detects that oscillations of the payload have been sufficiently dampened by the drag and/or after a fixed time delay, the control system may responsively operate the motor to deploy or retract the tether as the control system also causes the UAV to continue operating in the forward flight mode. Also, in the context of retraction for instance, the control system may direct the UAV to maintain a particular forward flight speed (e.g., the determined initial flight speed) as the tether is being retracted. In this way, the control system may ensure safe and steady retraction of the tether. Then, once the control system determines that that tether retraction is complete, the control system may then responsively change (e.g., increase) the forward flight speed, if applicable.

Additionally or alternatively, once the tether has been fully retracted, the control system could then cause the UAV to switch from the forward flight mode back to the hover flight mode. In this regard, after the UAV switches back to the hover flight mode, the control system may then operate the motor to deploy the tether. In this way, the forward flight may dampen oscillations of the payload and subsequent hover flight may allow for tether deployment over a particular location, such as for payload pickup or delivery purposes. Other examples are possible as well.

In a further aspect, the control system may carry out method 2900 conditioned upon the payload being at a safe distance away from the UAV. Generally, the control system may do so to ensure that the payload does not collide with the UAV upon initiation of forward flight and/or may do so for other reasons. Nonetheless, the control system may do so in various ways. For example, the control system may determine the unwound length of the tether and may then determine that the unwound length of the tether is higher than a threshold length, thereby indicating to the control system that the payload is at a relatively safe distance away from the UAV. In this way, if the control system seeks to carry out method 2900, the control system may do so only if the control system determines that the unwound length of the tether is higher than the threshold length. Other examples are also possible.

FIGS. 30A to 30D collectively illustrate the technique involving forward flight to dampen oscillations, specifically doing so during a tether retraction process.

Figure 30A:
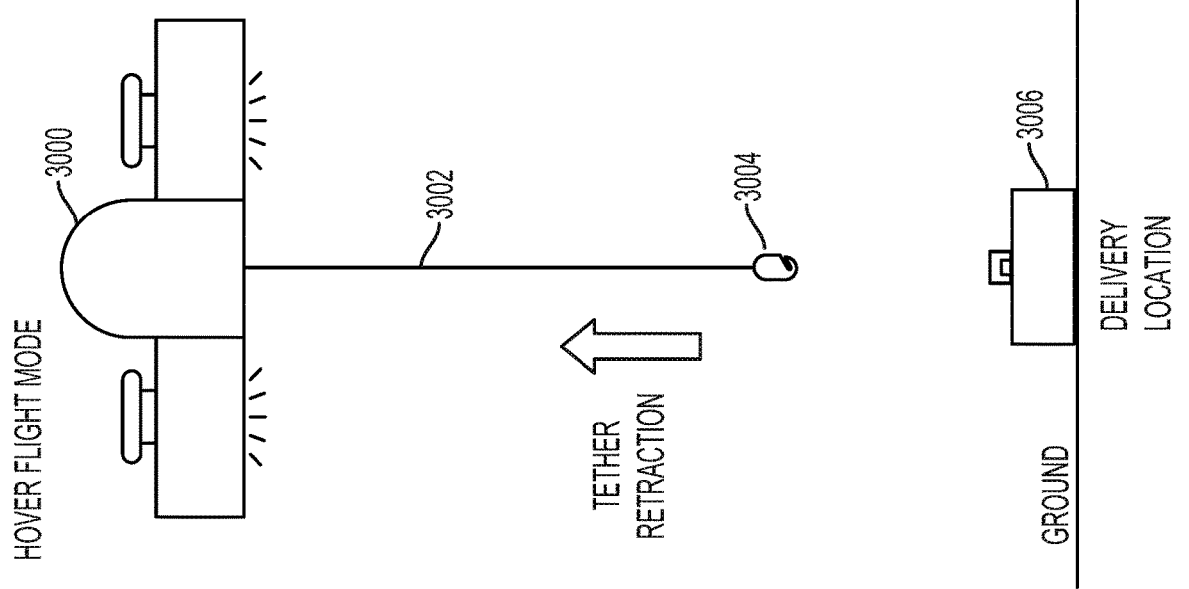

As shown by FIG. 30A, a UAV 3000 includes tether 3002 and a payload coupling apparatus 3004 coupled to the tether 3002. Also, a payload 3006 is shown as having been delivered by the UAV 3000 at a delivery location on the ground. Moreover, FIG. 30A shows that the UAV 3000 is hovering over the delivery location while the UAV's control system operates in the tether retraction mode to ascent the payload coupling apparatus 3004 back to the UAV after delivery of the payload 3006.

Figure 30C:
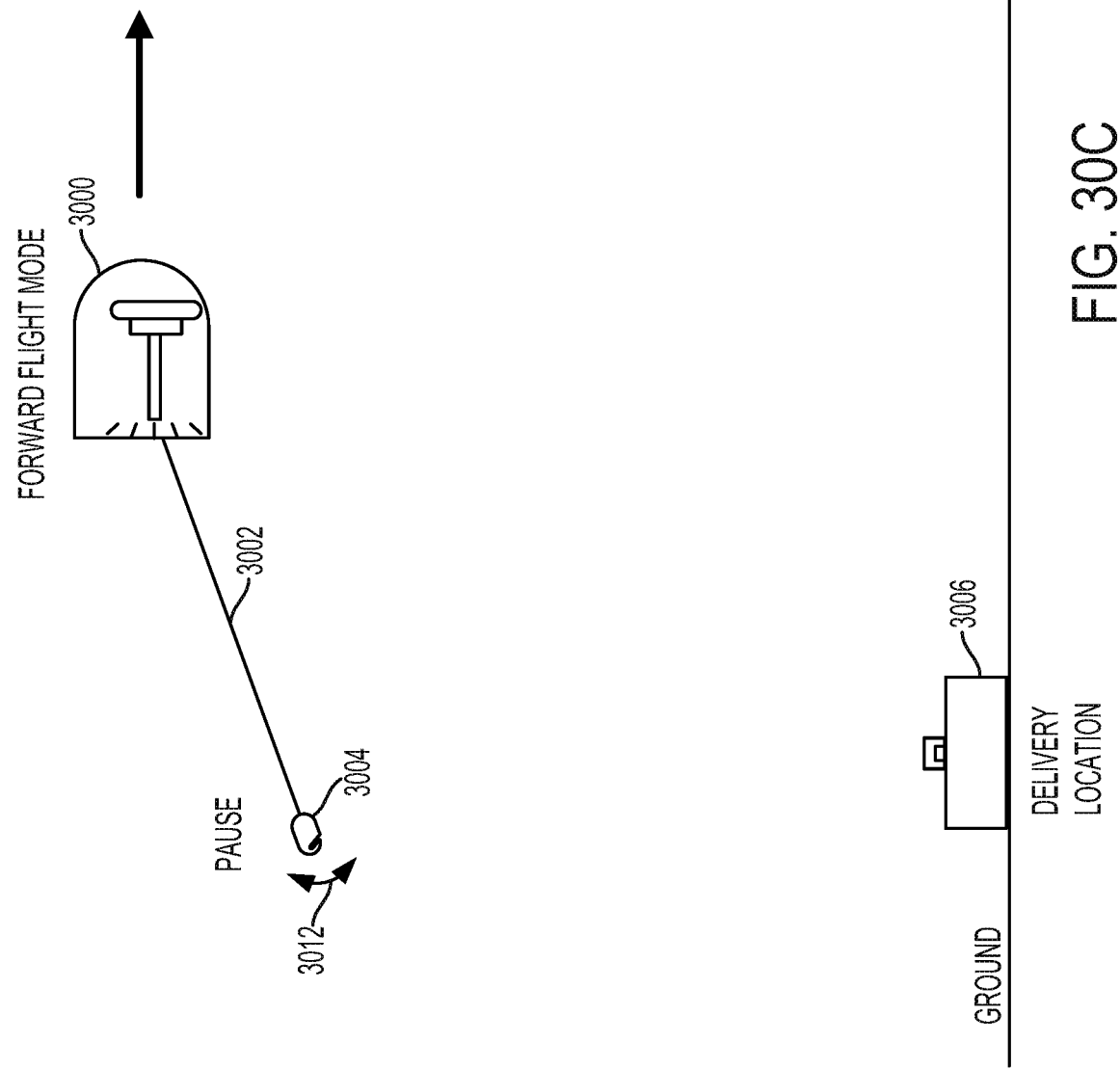

As shown by FIG. 30B, while the UAV 3000 is in hover flight mode, the UAV's control system pauses the ascent of the payload coupling apparatus 3004. During the pause, the control system may optionally detect that an unwound length 3010 of the tether 3002 is greater than a threshold length. Also, the control system may optionally detect that the oscillations of the payload coupling apparatus 3004 are at an oscillation amplitude 3008 that is greater than a threshold amplitude. In this regard, the control system may then responsively performs the forward flight damping routine, as shown by FIG. 30C. In particular, while the UAV's control system still pauses ascent of the payload coupling apparatus 3004, the UAV 3000 responsively switches from operating in hover flight mode to operating in forward flight mode. In other cases however, the control system may not detect oscillations and may simply carry out the forward flight damping routing for a fixed period of time (e.g., until detecting expiration of a timer).

As shown by FIG. 30C, by switching to the forward flight mode, the movement of the UAV 3000 results in drag on the payload coupling apparatus 3004, which dampens the oscillations of the payload coupling apparatus 3004. Accordingly, during the pause and after the UAV carries out forward flight for some time period, the control system detects that oscillations of the payload coupling apparatus 3004 are at an oscillation amplitude 3012 that is lower than the threshold amplitude. In this way, the control system determines that the oscillations have been sufficiently dampened and responsively determines that the tether retraction process may resume.

Figure 30D:
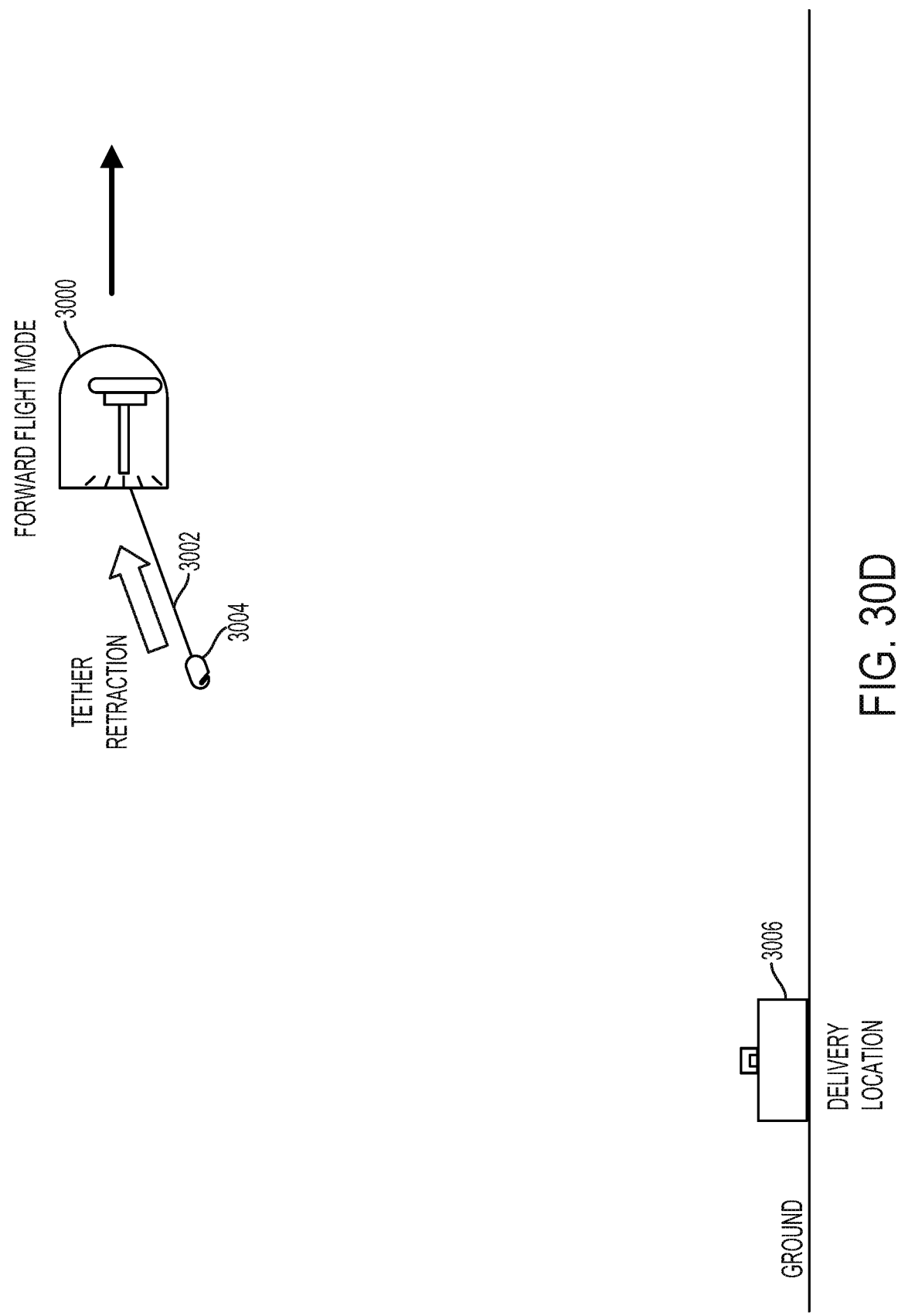

As shown by FIG. 30D, in response to determining that the oscillations have been sufficiently dampened and/or in response to detecting expiration of a timer, the control system then resumes operation in the tether retraction mode to ascent the payload coupling apparatus 3004 back to the UAV 3000 after delivery of the payload. Moreover, the control system is shown to resume operation in the tether retraction mode as the control system continues directing the UAV 3000 to operate in forward flight mode. Other illustrations are also possible.

ii. Reducing an Extent of Flight Stabilization to Dampen Oscillations

In accordance with an example implementation, the UAV may be operable in a position-hold mode in which the UAV substantially maintains a physical position in physical space during hover flight. Generally, the UAV may do so by engaging in one or more flight stabilization techniques (e.g., vision-based stabilization and/or IMU-based stabilization) during hover flight, such as stabilization techniques that are currently known and/or those developed in the future.

Specifically, the UAV may engage in flight stabilization along three dimensions in physical space, so as to resist movement of the UAV along any one of those three dimensions and thus to help maintain the UAV's physical position. In practice, the three dimensions at issue may be the yaw axis of the UAV, the pitch axis of the UAV, and the roll axis of the UAV. Additionally or alternatively, the three dimensions may include any feasible translational axis for the UAV (e.g., any axis along which translational movement of the UAV is possible). But the three dimensions could also take on various other forms without departing from the scope of the present disclosure.

Figure 31:
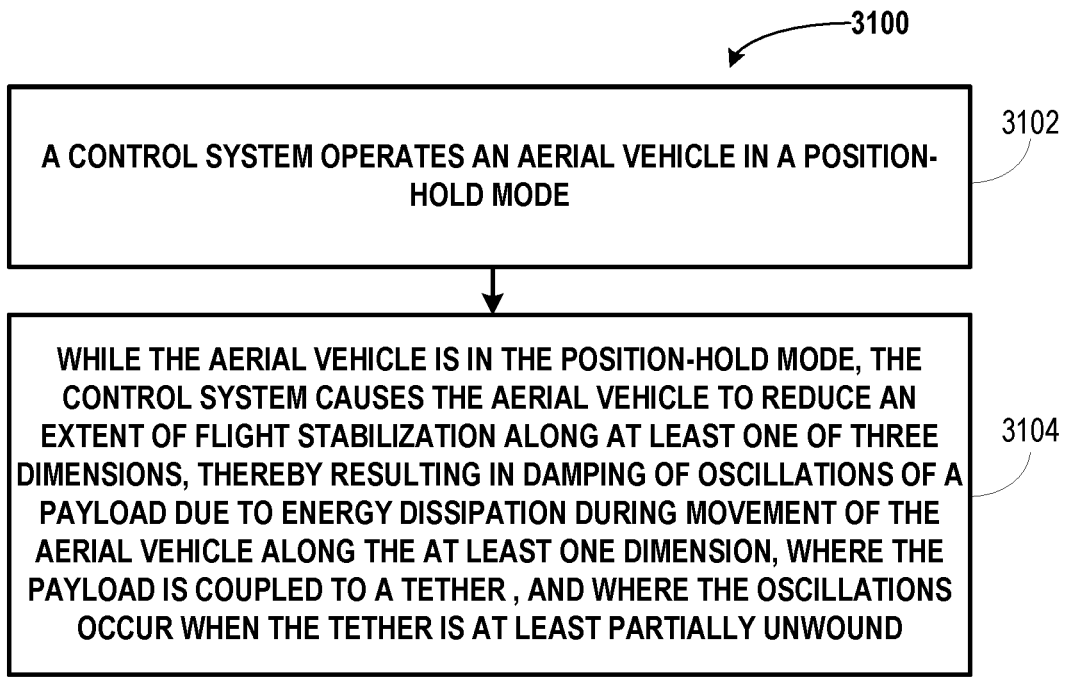
FIG. 31 is an example flowchart for reducing an extent of flight stabilization to dampen oscillations of a payload, according to an example embodiment.

FIG. 31 is a flowchart illustrating a method 3100 for reducing an extent (e.g., gains) of flight stabilization to dampen oscillations ("go limp" damping technique). As shown by block 3102 of method 3100, the UAV may operate in the position-hold mode. Here again, the UAV may do so during a process of deploying the tether for payload pickup and/or for payload delivery, or may do so during a process of retracting the tether for payload pickup and/or for payload delivery. Regardless, while the UAV is in the position-hold mode, the UAV's control system may reduce an extent of flight stabilization along at least one dimension, as shown by block 3104. Optionally, the control system may do so in response to determining that detected oscillations exceed the above-described threshold. Also, as noted, the payload at issue may be considered to be a payload (e.g., a package) that is coupled the payload coupling apparatus or may be considered to be the payload coupling apparatus itself, among other possibilities.

More specifically, the "go limp" damping technique may involve the control system causing the UAV to reduce an extent of flight stabilization along at least one of the above-mentioned three dimensions. By doing so, the UAV may then move along that dimension (e.g., translational movement along the axis) based on application of external forces to the UAV. In practice, these external forces may be a result of the oscillations of the payload. And as these payload oscillations cause movement of the UAV along the at least one dimension at issue, energy may dissipate over time, thereby resulting in damping of the detected oscillations due to this energy dissipation.

In accordance with the present disclosure, the act of reducing an extent of flight stabilization along the at least one dimension may take various forms.

In one case, reducing an extent of flight stabilization along the at least one dimension may take the form of completely eliminating any form of stabilization along that dimension and thus allowing the UAV to move along that dimension strictly based on application of external forces to the UAV. For example, a swinging payload may apply an external force to the UAV along a particular axis and, due to the UAV reducing stabilization along the particular axis, the UAV may end up moving along the particular axis by an amount that is based on a magnitude of that external force. In this way, the swinging payload may essentially drag the UAV itself along the particular axis. Other examples are possible as well.

In another case, however, reducing an extent of flight stabilization along the at least one dimension may take the form of reducing the extent of stabilization along the at least one dimension by a certain extent. Specifically, the control system may allow the UAV to move along the at least one dimension based on application of external forces to the UAV, but do so only to a certain extent. For example, the UAV may engage in flight stabilization after detecting some extent of movement of the UAV along the at least one dimension relative to the above-mentioned physical position. In this way, the control system may effectively allow some range of movement of the UAV along the at least one dimension relative to the physical position (e.g., up to a two meter translational movement of the UAV along a particular axis in each direction), rather than the UAV attempting to maintain the UAV's physical position by resisting any movement of the UAV away from that physical position.

Moreover, the control system may consider various factors when determining the extent to which to reduce stabilization along the at least one dimension. In an example implementation, the control system may use the detected oscillations as basis for determining a target extent of stabilization. In doing so, the control system may determine a lesser target extent of stabilization when the amplitude of the detected oscillations is greater, thereby allowing for greater movement of the UAV along the at least one dimension so as to help dissipate energy. And due to such greater movement of the UAV, the higher amplitude oscillations may ultimately dampen. Other cases and examples are also possible.

Following reduction of flight stabilization along the at least one dimension, the control system may detect that oscillations of the payload have been sufficiently dampened and/or may detect expiration of a timer (e.g., initiated at the start of the "go limp" damping routine), and may responsively cause the aerial vehicle to increase an extent of flight stabilization along the at least one dimension. In accordance with the present disclosure, such increase of flight stabilization could take on various forms.

In one example, assuming that the control system caused the UAV to completely eliminate any form of stabilization along that dimension, the control system may cause the UAV to completely activate stabilization along that dimension in an attempt to fully maintain the UAV's physical position. In another example, again assuming that the control system caused the UAV to completely eliminate any form of stabilization along that dimension, the control system may cause the UAV to increase an extent of stabilization along that dimension by effectively allowing some range of movement of the UAV along the at least one dimension relative to the physical position. In yet another example, assuming that the control system caused the UAV to partially reduce the extent of stabilization along the at least one dimension, the control system may cause the UAV to increase the extent of stabilization along that dimension. In this example, the control system may cause the UAV to increase the extent of stabilization (e.g., to the same extent prior to the reduction), so as to effectively lessen the allowed range of movement of the UAV along the at least one dimension relative to the physical position. Alternatively, the control system may cause the UAV to increase the extent of stabilization so as to completely activate stabilization along that dimension in an attempt to fully maintain the UAV's physical position. Various other examples are possible as well.

In a further aspect, the control system may help facilitate the "go limp" damping technique in various situations. In one example situation, the control system may initiate the "go limp" damping technique during a process of retracting the tether for payload pickup and/or for payload delivery. In this example situation, the control system could technically initiate the "go limp" damping technique at any point of the retraction process, such as without a pause in the retraction process. Ideally, however, the control system may operate the motor to pause retraction of the tether while the detected oscillations exceed the threshold, which may allow the control system to initiate the "go limp" damping technique during the pause in the retraction process. Then, once the control system detects that oscillations of the payload have been sufficiently dampened following reduction in the extent of flight stabilization along at least one dimension (e.g., that the detected oscillations no longer exceed the threshold) and/or after a fixed time delay (e.g., upon detecting expiration of a timer), the control system may then operate the motor to resume retraction of the tether.

In another example situation, the control system may initiate the "go limp" damping technique during a process of deploying the tether for payload pickup and/or for payload delivery. In this example situation, the control system could technically initiate the "go limp" damping technique at any point of the deployment process, such as without a pause in the deployment process. Ideally, however, the control system may operate the motor to pause deployment of the tether while the detected oscillations exceed the threshold, which may allow the control system to initiate the "go limp" damping technique during the pause in the deployment process. Then, once the control system detects that oscillations of the payload have been sufficiently dampened following reduction in the extent of flight stabilization along at least one dimension and/or after a fixed time delay (e.g., upon detecting expiration of a timer), the control system may then operate the motor to resume deployment of the tether. Various other example situations are possible as well.

Yet further, when the control system operates the motor to resume deployment or retraction of the tether, the control system may do so while the flight stabilization along the at least one dimension is still reduced and/or after flight stabilization along at least one dimension has been increased. For example, once the control system detects that oscillations of the payload have been sufficiently dampened and/or detects expiration of a timer, the control system may responsively operate the motor to deploy or retract the tether as the control system also causes the UAV to maintain reduction in the extent of flight stabilization along the at least one dimension. In another example, once the control system detects that oscillations of the payload have been sufficiently dampened and/or detects expiration of a timer, the control system may responsively cause the UAV to increase the extent of flight stabilization along the at least one dimension. In this example, after the UAV increases the extent of flight stabilization along the at least one dimension, the control system may then operate the motor to deploy or retract the tether. Other examples are possible as well.

FIGS. 32A to 32H next collectively illustrate the "go limp" damping technique, specifically being carried out during a tether retraction process.

Figure 32A:
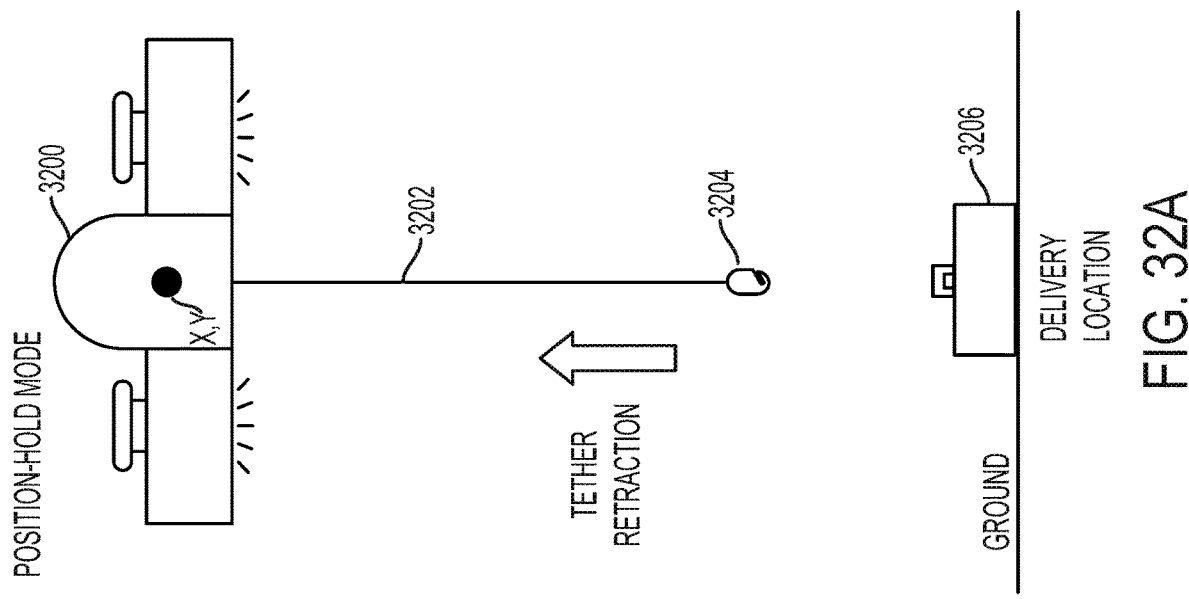

As shown by FIG. 32A, a UAV 3200 includes tether 3202 and a payload coupling apparatus 3204 coupled to the tether 3202. Also, a payload 3206 is shown as having been delivered by the UAV 3200 at a delivery location on the ground. Moreover, FIG. 32A shows that the UAV 3200 is hovering over the delivery location while the UAV's control system operates in the tether retraction mode to ascent the payload coupling apparatus 3204 back to the UAV after delivery of the payload 3206. In this regard, the UAV 3200 is shown as being in a position-hold mode in which the UAV 3200 substantially maintains a physical position "X, Y" in physical space during hover flight.

As shown by FIG. 32B, while operating in the tether retraction mode, the UAV's control system pauses the ascent of the payload coupling apparatus 3204. During the pause, the control system optionally detects that oscillations of the payload coupling apparatus 3204 are at an oscillation amplitude 3208 that is greater than a threshold amplitude. Responsive to detecting oscillations in this manner and/or responsive to initiating a timer, the control system then performs the above-described "go limp" damping routine. In particular, the control system causes the UAV to reduce an extent of flight stabilization along at least one dimension. By doing so, the UAV then moves along that dimension based on application of external forces to the UAV, which may dampen oscillations due to energy dissipation. Such movement and energy dissipation is illustrated by FIGS. 32C to 32F.

Figure 32D:
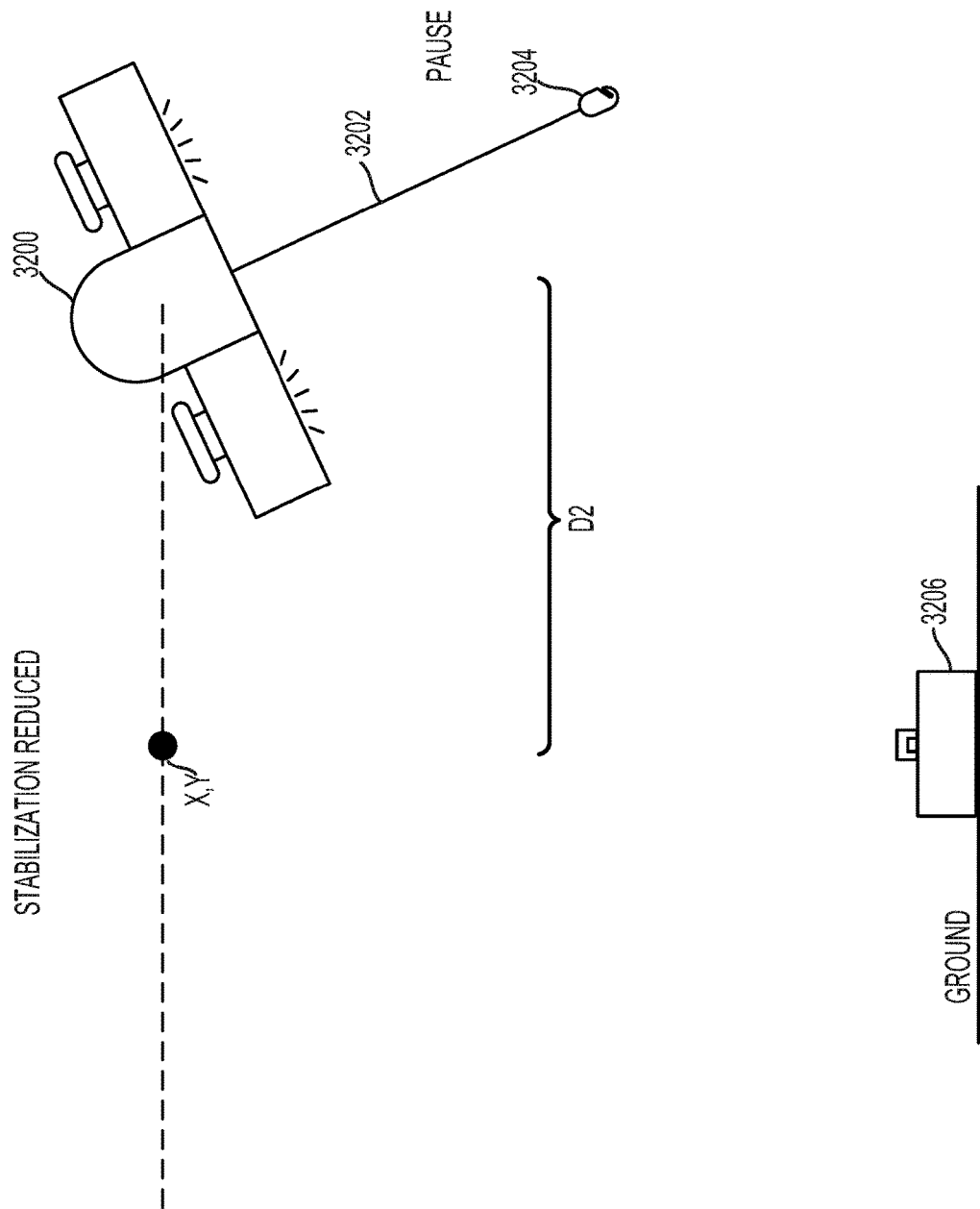
Figure 32F:
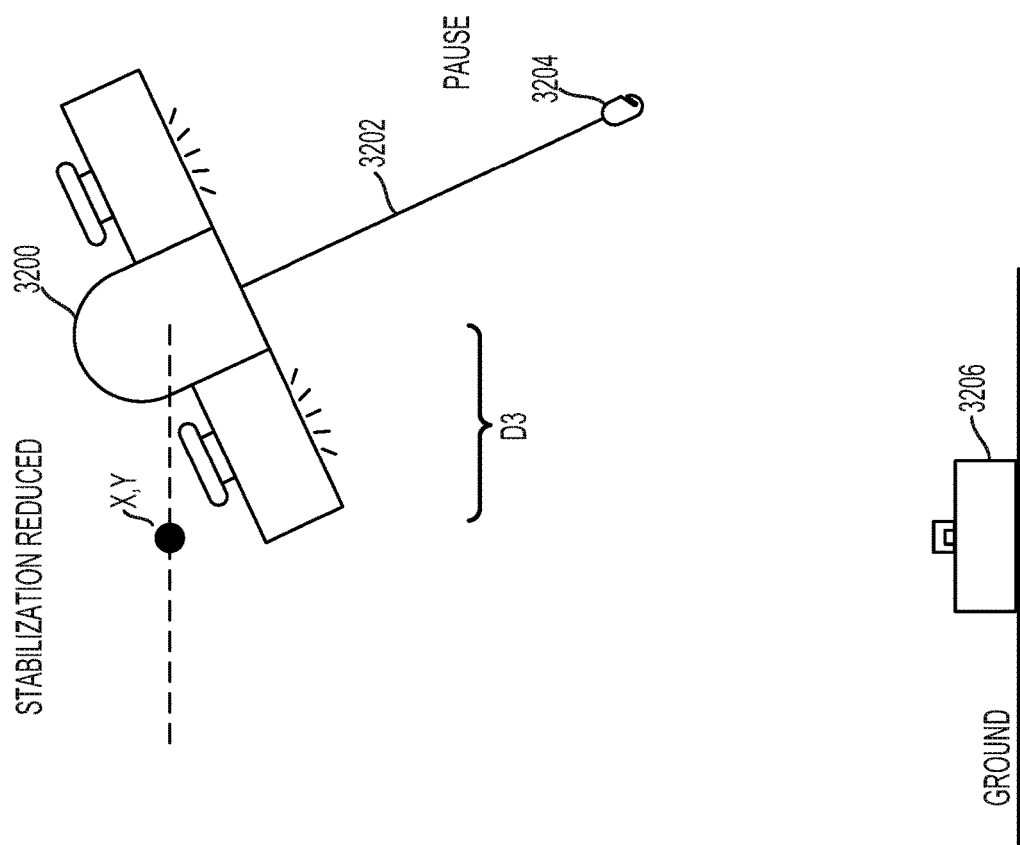

More specifically, due to reduction in the extent of flight stabilization along the dimension, the swinging payload coupling apparatus 3204 drags the UAV 3200 in a first direction along the dimension to a position that is at a distance D1 away from position "X, Y", as shown by FIG. 32C. Subsequently, due to continued reduction in the extent of flight stabilization along the dimension and due to energy dissipation, the swinging payload coupling apparatus 3204 drags the UAV 3200 in a second direction (e.g., opposite to the first direction) along the dimension to a position that is at a lesser distance D2 (e.g., smaller than D1) away from the physical position "X, Y", as shown by FIG. 32D. Subsequently, again due to continued reduction in the extent of flight stabilization along the dimension and due to further energy dissipation, the swinging payload coupling apparatus 3204 drags the UAV 3200 in the first direction along the dimension to a position that is at an even lesser distance D3 (e.g., smaller than D2) away from the physical position "X, Y", as shown by FIG. 32E. Finally, again due to continued reduction in the extent of flight stabilization along the dimension and due to yet further energy dissipation, the swinging payload coupling apparatus 3204 drags the UAV 3200 in the second direction along the dimension to a position that is at an even lesser distance D4 (e.g., smaller than D3) away from the physical position "X, Y", as shown by FIG. 32F. In this manner, the UAV 3200 may continue moving back and forth along the dimension as energy continues dissipating.

As next shown by FIG. 32G, the oscillations are shown to have been dampened due to the "go limp" damping routine. Optionally, during the pause and after carrying out of the "go limp" damping routine for some time period, the control system detects that oscillations of the payload coupling apparatus 3204 are at an oscillation amplitude 3210 that is lower than the threshold amplitude. In practice, the control system may carry out such detection while flight stabilization is still reduced along the dimension and/or after the control system increased flight stabilization along the dimension. Nonetheless, the control system determines that the oscillations have been sufficiently dampened and/or detects expiration of a timer, and responsively determines that the tether retraction process may resume. As such, the control system may responsively resume operation in the tether retraction mode to ascent the payload coupling apparatus 3204 back to the UAV 3200 after delivery of the payload, as shown by FIG. 32H. Other illustrations are also possible.

iii. Unwinding/Winding Tether to Dampen Oscillations

In accordance with an example implementation, the UAV's control system may dampen oscillations of the payload by operating the motor to unwind and/or wind the tether, thereby changing tension on the tether. In doing so, the control system may increase and/or decrease the unwound tether length and do so at various rates, which may help dissipate energy and thus ultimately dampen the oscillations of the payload. In this manner, the control system is provided with an additional control input that does not necessarily interfere with the other control objectives of the system (e.g., does not prevent the vehicle from holding position while also damping payload oscillations).

More specifically, the control system may operate the motor to vary a retraction rate of the tether and/or a deployment rate of the tether. In practice, the retraction rate may define timing, extent, and/or speed of tether retraction and the deployment rate may define timing, extent, and/or speed of tether deployment. As such, the control system may operate the motor in the first mode to retract the tether at the at least one target retraction rate (e.g., determined based on detected oscillations and/or established via manual engineering input). Additionally or alternatively, the control system may operate the motor in the second mode to deploy the tether at the at least one target deployment rate (e.g., determined based on detected oscillations and/or established via manual engineering input). With this arrangement, the control system could thus use various specific approaches for damping oscillations via control of the tether at various rates.

For instance, the control system may control the winding and/or unwinding of the tether, or the rate of winding and/or unwinding of the tether to "pump" the payload much like a swing, with tether let out as the payload moves toward the bottom of the swing and the tether held fast (or even wound in) as the payload moves towards the tops of the swing. Moreover, a "pumping" frequency, period, and/or phase of the tether may be respectively matched to an oscillation frequency, period, and/or phase of the payload. By doing this, the energy of the swinging payload may be removed even as the UAV remains substantially stationary.

Furthermore, the extent of "pumping" of the winch may depend on the distance between the payload and the UAV, which corresponds to the unwound length of the tether. Specifically, when there is large distance between the payload and the UAV, the pendular motion of the payload may be very slow, on the order of ¼ hertz for instance. At this point, the amount of the tether unwound or wound onto the winch during "pumping" of the winch may be on the order of meters. But when the payload is closer to the UAV, the pendular motion may speed up to on the order of 1 hertz or more for instance. In this case, the amount of the tether unwound or wound onto the winch during "pumping" may be on the order of centimeters.

Yet further, the rate of speed at which the tether is wound or unwound may vary from one period of oscillation to the next as the distance of the payload to the UAV changes, and may even be varied within a single period of oscillation. For example, the rate of winding or unwinding may be proportional to the velocity of the payload or the velocity of the payload squared. Other examples are possible as well.

With this arrangement, the control system may "pump" the winch while operating in the tether retraction mode to engage in ascent of the payload or while operating in the tether deployment mode to engage in descent of the payload. Specifically, during descent of the payload, the oscillations of the payload may be damped by letting tether out at as the payload approaches the bottom of the swing. Whereas, when the payload is moving towards the top of the swing, the amount of tether unwound from the winch could be reduced or stopped, or the tether could even be wound in as the payload moves to the tops of the swing. Such "pumping" of the tether may counteract the pendular motion of the payload to control and damp the oscillations of the payload. In contrast, during ascent of the payload, the oscillations of the payload may be damped by winding the tether in as the payload moves to the tops of the swing. Whereas, when the payload is moving towards the bottom of the swing, the tether could be unwound, or stopped, or wound in at a reduced rate. Other approaches are possible as well.

iv. UAV Movement to Dampen Oscillations

In accordance with an example implementation, the UAV's control system may dampen oscillations of the payload by directing the UAV itself to move in various ways throughout physical space. With this approach, the control system may direct the UAV to reactively move in a manner that offsets, prevents, or reduces movement of the payload during ascent and/or descent of the payload. Although various such movements are described below, other movements are possible as well without departing from the scope of the present disclosure.

More specifically, the control system may be operable to determine a target path of the payload. This target path may be a target path of ascent of the payload during winding of the tether or may be a target path of descent of the payload during unwinding of the tether. For example, the target path may be substantially perpendicular to the ground and may extend from the ground to the UAV. In this way, the control system may effectively plan to maintain the payload substantially beneath the UAV as the payload is being lowered or raised. But oscillations of the payload may cause the payload to move away from the target path as the payload is being lowered or raised.

To help solve this problem, as noted, the control system may cause the UAV to move in various ways. Specifically, at a given point in time, the control system may use the detected oscillations of the payload as basis for determining a position of the payload relative to the target path. Then, based on the determined position of the payload relative to the target path, the control system may determine a movement to be performed by the UAV so as to move the payload closer to the target path, and the control system may cause the UAV to perform that determined movement. As such, the control system could repeatedly determine such movements as position of the payload relative to the target path changes over time due to oscillations, and could repeatedly cause the UAV to perform the movements to help dampen the oscillations.

By way of example, the pendular motion of the payload could be controlled by moving or translating the UAV horizontally in response to the motion of the payload, e.g. by attempting to maintain the payload beneath the UAV. Oscillations of the payload (e.g., pendulum-like swinging) would be damped by having the UAV translate (e.g., move back and forth) in such a way that the oscillations are minimized. For instance, the control system may determine that a current position of the payload is at a particular distance away from the target path and that the payload is currently moving in a particular direction relative to the target path. Responsively, the control system may immediately cause the UAV to horizontally move in the particular direction and do so by an amount that is based on the particular distance, thereby attempting to maintain the payload beneath the UAV. In this manner, the control system may reactively determine horizontal movements that offset horizontal forces on the payload, and prevent or damp the oscillation of the payload. Other examples are possible as well.

D. Selection of Damping Techniques

Figure 33:
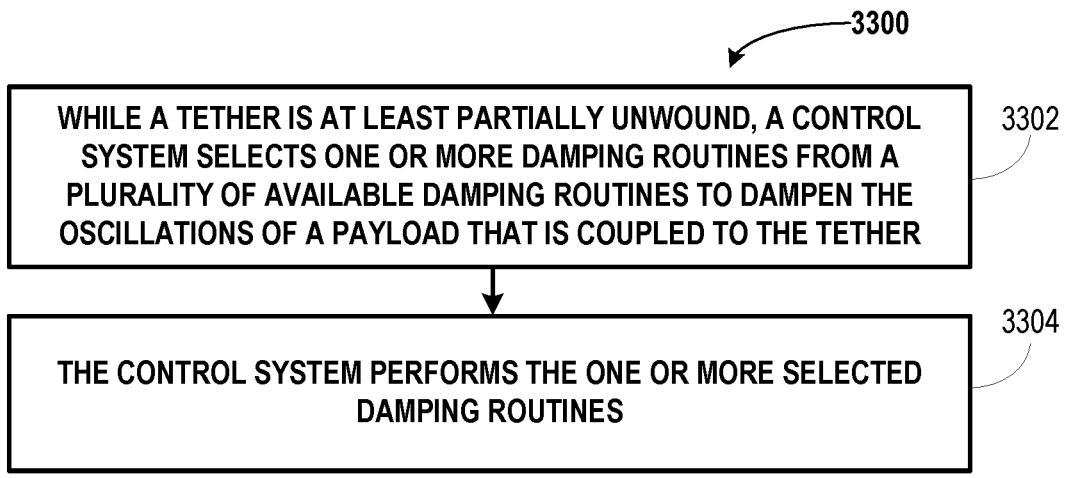
FIG. 33 is an example flowchart for selecting one or more damping routines to help dampen oscillations of a payload, according to an example embodiment.

FIG. 33 is a flowchart illustrating a method 3300 for selecting one or more damping routines/techniques to help dampen oscillations of the payload. In practice, the UAV's control system could carry out method 3300 while operating in tether retraction mode or while operating in tether deployment mode. In accordance with block 3302 of method 3300, while the tether is at least partially unwound, the control system may select one or more damping routines from a plurality of available damping routines to dampen the oscillations of the payload. And the control system may then perform those selected damping routines, as shown by block 3304.

In accordance with the present disclosure, the control system may select any one of the above-described damping routines. Specifically, the control system may select any combination of the following routines: forward flight to dampen oscillations, "go limp" technique to dampen oscillations, winding/unwinding of tether to dampen oscillations, and/or UAV movement to dampen oscillations. In practice, however, the control system could also select other damping routines that are not described herein and then perform such damping routines individually or in combination with any of the above-described damping routines.

Moreover, the control system may select the damping routines based on various factors, some of which are described below. In practice, the control system may use any combination of those factors as basis for the selection, perhaps giving certain factors more weight compared to others. Although example factors are described below, other factors are possible as well without departing from the scope of the present disclosure.

In one case, the control system may select the one or more damping routines based on characteristics of detected oscillations, such as based on amplitude, speed, and/or frequency of the oscillations, among others. For instance, the control system may select the one or more damping routines based on amplitude of the detected oscillations of the payload. Specifically, the control system may have stored thereon or may be configured to refer to mapping data or the like that maps each of various amplitudes with a damping routine or with a combination of two or more damping routines. By way of example, the mapping data may map a certain amplitude range with the "forward flight" damping technique and another lower amplitude range with the "winding/unwinding of tether" damping technique. In practice, the mapping data may be arranged in this manner because "forward flight" may generally be more effective with damping a more severe swinging of the payload. As such, the control system may use sensor data to determine the amplitude of the detected oscillations and may then refer to the mapping data to determine one or more damping routines that correspond to the detected amplitude.

In another case, the control system may select the one or more damping routines based on an operating mode of the motor. Specifically, the control system may determine whether the motor is operating in the first mode in which the motor applies torque to the tether in a winding direction or whether the motor is operating in the second mode in which the motor applies torque to the tether in an unwinding direction. Based at least in part on the determined mode of operation of the motor, the control system may then select one or more damping routines. For example, if the motor is operating in the second mode, the control system may select any damping technique other than the forward flight damping technique, so as to avoid further increase of the unwound tether length in preparation for and/or during forward flight.

In yet another case, the control system may select the one or more damping routines based on an operating mode of the UAV. Specifically, the control system may determine whether the UAV is operating in a payload pickup mode in which the UAV attempts to pick up the payload or whether the UAV is operating a payload delivery mode in which the UAV attempts to deliver a payload, perhaps respectively determining a state of payload delivery or of payload pickup. Based at least in part on the determined mode of operation of the UAV, the control system may then select one or more damping routines. For example, the control system may select the forward flight damping technique if the UAV is engaging in post-delivery tether retraction as part of the payload delivery mode. In practice, the control system may do so because the UAV can begin forward flight to the next destination as soon the payload has been delivered. Whereas, the control system may select the UAV movement damping technique if the UAV is engaging in post-pickup tether retraction as part of the payload pickup mode, and do so because the UAV movement may help ensure that the picked up payload is frequently located directly beneath the UAV as the payload ascends towards the UAV.

In yet another case, the control system may select the one or more damping routing based on a value of the payload. In practice, the value of the payload may be a price of the payload and/or may be a priority of the payload being delivered, among other options. Nonetheless, the control system may determine the value of the payload based on input provided by a user and/or by using object recognition technique to determine the value of the payload based on image data, among other possibilities. With this arrangement, the control system may refer to mapping data that maps each of various values with a damping routine or with a combination of two or more damping routines. For example, the mapping data may map higher values with the "go limp" damping techniques because the "go limp" technique may pose minimum risk for damaging a higher value payload. As such, the control system may refer to the mapping data to determine one or more damping routines that correspond to the determined value of the payload.

In yet another case, the control system may select the one or more damping routines based on a state of an environment in which the UAV is located. Specifically, the control system may use sensor data or the like to determine information about the environment in which the UAV is located, such as about objects in the environment for instance. With this arrangement, the control system may then use the information about the environment to select one or more damping routines. For example, if control system determines that an object is located within a threshold distance away from the UAV, the control system may select the "unwinding/winding of tether" damping technique so as to avoid any movement of the UAV resulting from engagement in any of the other damping techniques, thereby avoiding collision with the object. Other cases are possible as well.

In a further aspect, when the control system selects one or more damping routines, the control system may also determine duration for which to carry out each selected routine (e.g., a duration for which to set the above-mentioned timer), if feasible. In practice, the control system may determine each such duration based on one or more of the above-described factors and/or may determine each such duration in other ways. For example, the control system may determine that a selected damping routine should be applied for a longer duration when the amplitude of the detected oscillations is greater, thereby allowing enough time to sufficiently dampen the oscillations. Alternatively, the control system may simply perform a selected damping routine until the control system detects that the oscillations have been sufficiently dampened. Other examples are also possible.

In yet a further aspect, when the control system selects two or more damping routines, the control system may also determine an approach for using these selected damping routines in combination. In practice, the control system may determine that approach based on one or more of the above-described factors and/or may determine the approach in other ways. Moreover, although example approaches are described below, other example approaches are also possible without departing from the scope of the present disclosure.

In one example approach, the control system may determine a sequence in which to use the selected damping routines, such as by determining that a first damping routine should be followed by a second damping routine. For instance, the control system may determine that the "go limp" damping technique should be performed followed by performing of the "unwinding/winding of tether" damping technique. In this regard, the control system may determine that the second damping routine should begin immediately following the end of the first damping routine. Alternatively, the control system may determine that the control system should wait for a particular time period after performing the first damping routine and then perform the second damping routine upon expiration of the particular time period. In some cases, the control system may use the particular time period to evaluate the detected oscillation and may decide to move forward with performing the second damping routine only if the oscillations haven't been sufficiently dampened.

In another example approach, the control system may determine that the control system should concurrently perform two or more selected damping routines. For instance, the control system may determine that the control system should concurrently perform the UAV movement damping technique and the unwinding/winding of tether damping technique. In this regard, the control system may determine that the control system should start performing the selected damping routines at the same point in time. Alternatively, the control system may determine that the control system should start performing a first damping routine and, in the midst of performing that first damping routine, begin performing a second damping routine. Other example approaches and combinations of the described approaches are possible as well.

E. Additional Damping Aspects

Although various damping techniques are described herein as being carried out after or responsive to detecting oscillation of a payload, the various damping techniques may be carried out in other situations as well. For instance, the control system may be configured to carry out one or more damping technique during certain phases of flight and/or during certain phases of payload pickup and/or delivery, among other possibilities. In this instance, the control system may carry out those damping techniques without necessarily detecting oscillations of a payload. In this regard, as noted, the control system may carry out the damping routine for a certain time period, such as by initiating a timer upon start of a damping routine and then ending the damping routine (and/or carrying out other operations, such as resuming tether retraction) responsive to detecting expiration of that timer. In this manner, the control system may essentially take preventative actions to minimize any oscillations that might be present.

XII. FAILURE DETECTION AND CORRECTION METHODS

A. Failure to Release Payload

As described above with respect to methods 1800 and 2600, the UAV may operate in a delivery mode to deliver a payload to a target location and subsequently operate in a release-verification mode to verify that the payload has separated from the payload coupling apparatus. However, there may be situations in which the payload does not separate from the payload coupling apparatus upon delivery. For instance, the payload coupling apparatus may become snagged on the payload such that when the UAV motor is operated to cause over-run of the tether, the payload coupling apparatus remains coupled to the payload rather than lowering and detaching from the payload. Accordingly, the control system may detect such a situation and responsively take remedial action by causing the tether to detach from the UAV rather than causing the payload to detach from the payload coupling apparatus.

Figure 34:
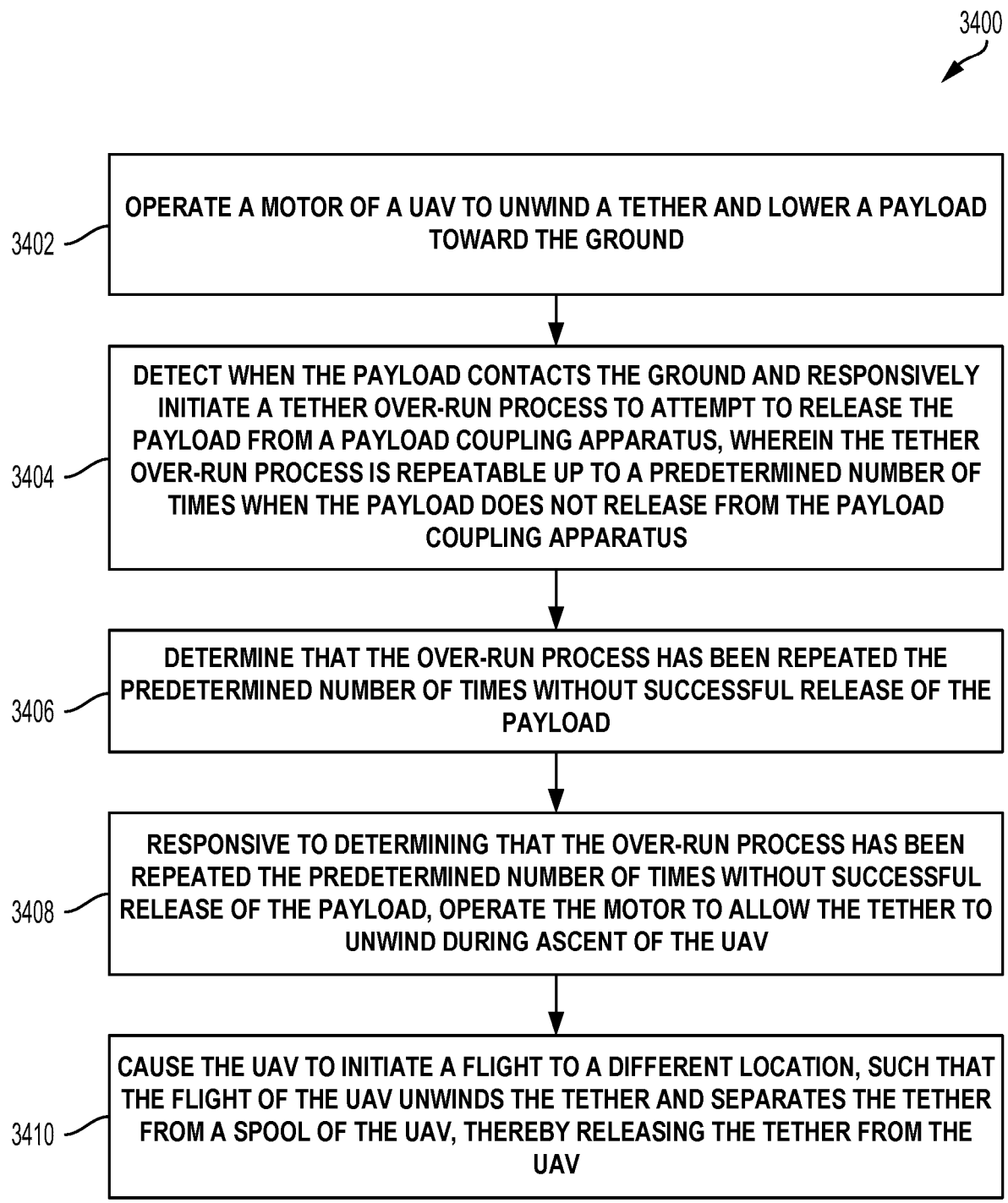
FIG. 34 is a flow chart of a method for detaching a tether from a UAV, according to an example embodiment.

FIG. 34 is a flow chart illustrating a method 3400 for detaching a tether from a UAV. Method 3400 may be carried out by a UAV such as those described elsewhere herein. For example, method 3400 may be carried out by a control system of a UAV with a winch system. Further, the winch system may include a tether disposed on a spool, a motor operable in a first mode and a second mode that respectively counter and assist unwinding of the tether due to gravity (e.g., by driving the spool forward or in reverse), a payload coupling apparatus that mechanically couples the tether to a payload, and a payload latch switchable between a closed position that prevents the payload from being lowered from the UAV and an open position that allows the payload to be lowered from the UAV.

As shown by block 3402, method 3400 involves the control system of the UAV operating the motor to unwind the tether and lower the payload toward the ground (e.g., by performing method 1800). The control system may be configured to detect when the payload contacts the ground and responsively initiate a tether over-run process to attempt to release the payload from the payload coupling apparatus, as shown by block 3404. Tether over-run occurs when the motor continues to unwind the tether after the payload has stopped lowering. During tether over-run, the payload coupling apparatus continues to lower as the tether is unwound, while the payload remains stationary. This can cause the payload coupling apparatus to detach from the payload, for instance, when the payload is resting on a protruding arm or other hook-like mechanism of the payload coupling apparatus. As described above with respect to method 1800, the control system may detect when the payload contacts the ground by monitoring a speed and/or a current of the motor and determining that the motor speed and/or motor current is threshold low. As further described above with respect to method 1800, initiating the tether over-run process may involve operating the motor in the second mode to forward drive the spool in a direction that causes the tether to continue to unwind even after the payload has reached the ground.

Typically, carrying out the tether over-run process would cause the payload coupling apparatus to detach from the payload. However, in situations where the payload does not release from the payload coupling apparatus, the tether over-run process may be repeatable up to a predetermined number of times, as further shown by block 3404.

In practice, once the payload has reached the ground and the control system has carried out a first tether over-run process to attempt to separate the payload coupling apparatus from the payload, the control system may determine whether the payload coupling apparatus has actually separated from the payload, based on the current of the motor (e.g., by performing blocks 2602 and 2604 of method 2600). For example, after operating the motor to cause tether over-run, the control system may operate the motor to begin retracting the tether, and if the payload is still attached to the payload coupling apparatus, the extra weight of the payload may cause the motor to draw more current. Accordingly, the control system may determine that the payload is still attached to the payload coupling apparatus by detecting that the motor current is threshold high.

Responsive to making such a determination, the control system may repeat the processes of lowering the payload to the ground, operating the motor to cause over-run of the tether (this time, perhaps, by some predetermined additional length), and then pulling upwards on the tether to test for payload separation, shown in blocks 3402 and 3404. These processes may be repeated a number of times until the control system determines that the payload has separated from the payload coupling apparatus or until a threshold number of repetitions has occurred, as shown by block 3404.

The control system may track how many times the processes of causing over-run of the tether and testing for payload separation have been carried out and may determine that these processes have been repeated a threshold number of times without successfully releasing the payload from the payload coupling apparatus, as shown by block 3406. Responsive to making this determination, the control system may decide to abandon further attempts to separate the payload from the payload coupling apparatus and may instead decide to separate the tether from the UAV by operating the motor to allow the tether to unwind during ascent of the UAV, as shown by block 3408.

In practice, the control system may operate the motor to allow the tether to unwind by controlling a maximum current supplied to the motor. By limiting the maximum current supplied to the motor, the control system limits the amount of force that the motor can exert on the tether. More specifically, the control system may limit the maximum current to a small enough value that the motor's maximum upward force exerted on the tether is smaller in magnitude than the downward force on the tether due to gravitational forces on the payload. As a result, the UAV may fly upward, and the tether will continue to unwind due to the downward force on the tether exceeding the upward force from the motor. In other examples, the control system may merely turn off the motor, allowing it to spin freely, in order to obtain similar results.

Further, as noted above, the tether may be disposed on a spool. More specifically, a first end of the tether may be non-fixedly wound on the spool. As such, when the tether completely unwinds from the spool, the tether may detach and fall away from the spool. Thus, while the control system operates the motor to allow the tether to unwind, the control system may further cause the UAV to initiate a flight to a different location (e.g., a return location), such that the flight of the UAV unwinds the tether and separates the tether from the spool, thereby releasing the tether from the UAV, as shown by block 3410. In this manner, when the payload coupling apparatus is unable to detach from the payload, both the payload and the tether may be left behind at the delivery location, allowing the UAV to safely navigate away.

B. Snag Detection

A UAV carrying out tethered pickup and delivery of payloads according to the processes disclosed herein may find itself operating in various different types of environments with various different issues to address. One issue may involve undesirable or unexpected forces exerted on the tether. For instance, a person may excessively yank on the tether, or the tether might get snagged on a moving or stationary object, resulting in a downward force on the tether. Other examples are possible as well. In these situations, if the downward force is great enough, the UAV could be pulled out of its flight, perhaps damaging the UAV, the payload, or nearby persons or property. Accordingly, the control system may detect when certain forces are applied to the tether during delivery of a payload and responsively take remedial action by allowing the tether to unwind from its spool.

Figure 35:
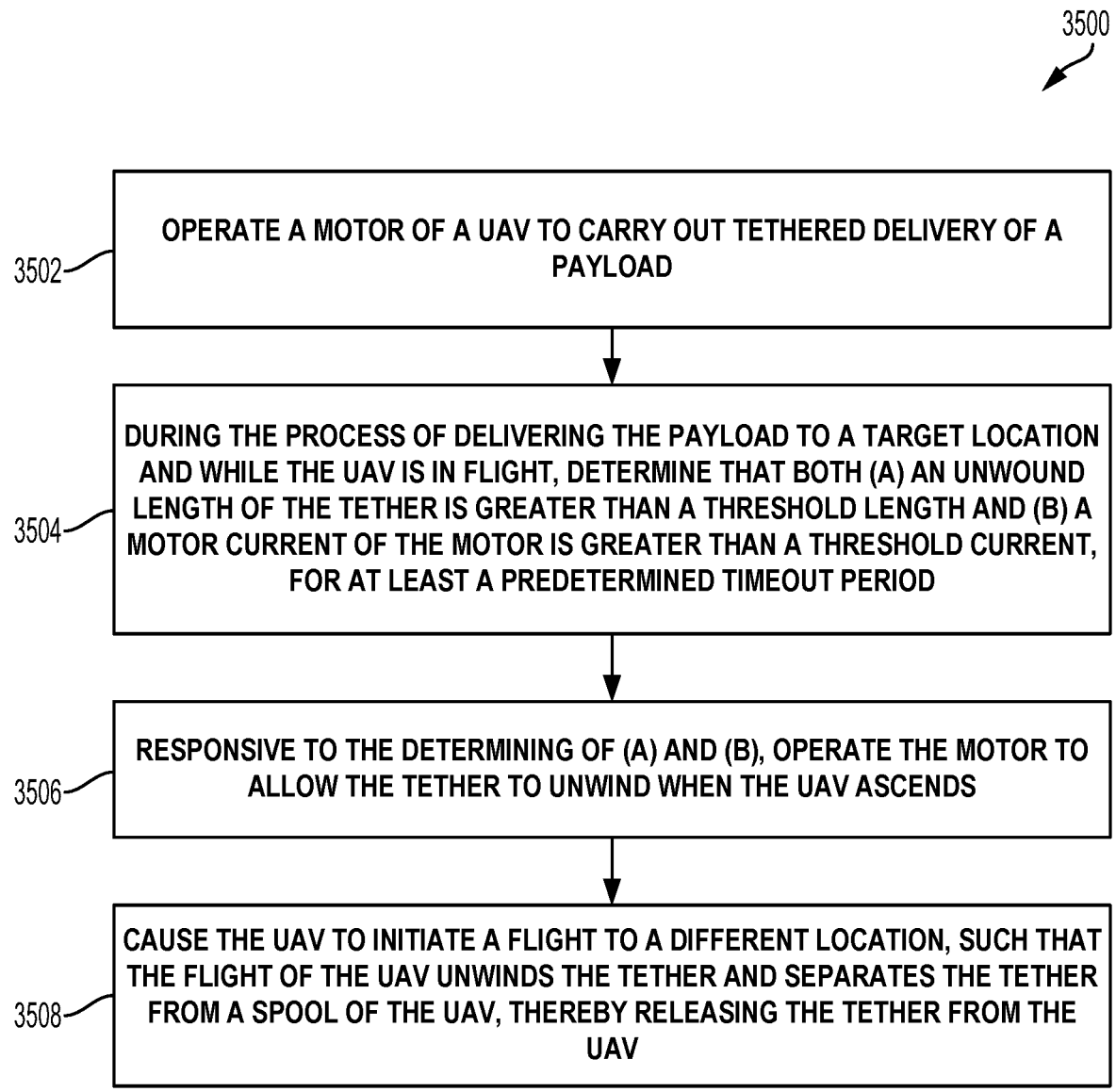
FIG. 35 is a flow chart of a method for detecting and addressing downward forces on a tether when lowering a payload toward the ground, according to an example embodiment.

FIG. 35 is a flow chart illustrating a method 3500 of detecting and addressing undesirable downward forces on a tether when lowering a payload toward the ground. Method 3500 may be carried out by a UAV such as those described elsewhere herein. For example, method 3500 may be carried out by a control system of a UAV with a winch system. Further, the winch system may include a tether disposed on a spool, a motor operable in a first mode and a second mode that respectively counter and assist unwinding of the tether due to gravity (e.g., by driving the spool forward or in reverse), a payload coupling apparatus that mechanically couples the tether to a payload, and a payload latch switchable between a closed position that prevents the payload from being lowered from the UAV and an open position that allows the payload to be lowered from the UAV.

As shown by block 3502, method 3500 involves the control system of the UAV operating the motor to carry out tethered delivery of a payload (e.g., by performing method 1800). During the process of delivering the payload to a target location, the control system may detect an undesirable downward force on the tether. As described above, the presence of additional weight (or in this case, the presence of a sufficient downward force) on the tether may result in an increase in current supplied to the motor in order to maintain a desired rotational speed of the motor. As such, the control system may detect an undesirable downward force on the tether based on the motor current. Further, in order to avoid false positives, the control system may also consider how long the motor current is increased.

Additionally, the control system may consider an unwound length of the tether when detecting an undesirable downward force. For instance, in order to limit the detection of downward forces to sources at or near ground level (e.g., detecting a person yanking on the tether), the control system may also determine how far the tether has been unwound from the spool in order to determine whether any part of the tether is at or near ground level. Other examples are possible as well.

Thus, in practice, during the process of delivering the payload to a target location and while the UAV is in flight, the control system may determine an unwound length of the tether based on encoder data representing a rotation of the tether spool, and the control system may determine a motor current based on a current sensor of the motor or the power system of the UAV. Further, the control system may determine that both (a) the unwound length of tether is greater than a threshold length and (b) the motor current of the motor is greater than a threshold current, for at least a predetermined timeout period, as shown by block 3504. Responsive to making such a determination, the control system may operate the motor to allow the tether to unwind when the UAV ascends (e.g., as described above with respect to block 3408 of method 3400), as shown by block 3506. And further responsive to making the determination, the control system may cause the UAV to initiate a flight to a different location (e.g., a return location), such that the flight of the UAV unwinds the tether and separates the tether from the spool, thereby releasing the tether from the UAV, as shown by block 3508. In this manner, when an undesirable downward force is exerted on the tether, the tether may unwind and detach from the UAV, allowing the UAV to safely navigate away.

In other examples, rather than detecting a snag and responsively operating the motor to unwind and release the tether, snags may be resolved by imposing a current limit on the motor when picking up a payload. Limiting the motor current to a maximum value limits the amount of force the motor can exert on the tether, which may prevent a UAV from crashing if the tether becomes snagged. For instance, if the current limit is low enough that the maximum upward force exerted on the tether by the motor is weaker than a downward force on the tether, then the current limit on the motor may allow the tether to completely unwind and detach from its spool, should the UAV fly away while the tether is snagged.

In addition to experiencing undesirable forces during delivery of a payload, the tether may also experience undesirable forces during pickup of the payload. For instance, when winching a payload from the ground toward the UAV, the payload and/or the tether may become snagged on various objects, such as trees, buildings, or various other nearby objects. As another example, an unexpectedly heavy payload could be attached to the tether, resulting in an excessive downward force on the tether that prevents the UAV from lifting the payload. Accordingly, the control system may detect when certain forces are applied to the tether during pickup of a payload and responsively take remedial action.

Figure 36:
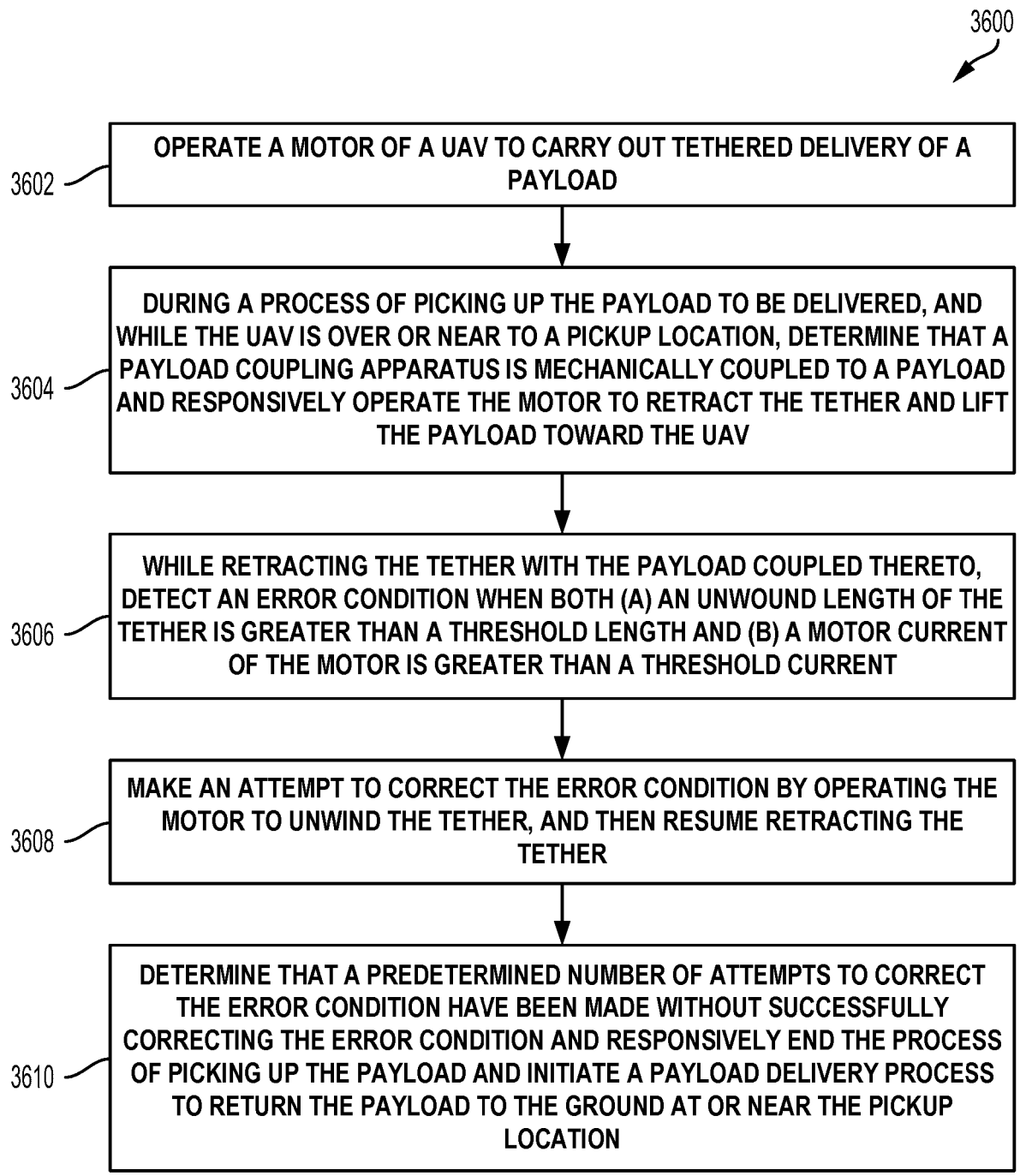
FIG. 36 is a flow chart of a method for detecting and addressing downward forces on a tether when winching a payload toward a UAV, according to an example embodiment.

FIG. 36 is a flow chart illustrating a method 3600 of detecting and addressing undesirable downward forces on a tether when winching a payload toward a UAV. Method 3600 may be carried out by a UAV such as those described elsewhere herein. For example, method 3600 may be carried out by a control system of a UAV with a winch system. Further, the winch system may include a tether disposed on a spool, a motor operable in a first mode and a second mode that respectively counter and assist unwinding of the tether due to gravity (e.g., by driving the spool forward or in reverse), a payload coupling apparatus that mechanically couples the tether to a payload, and a payload latch switchable between a closed position that prevents the payload from being lowered from the UAV and an open position that allows the payload to be lowered from the UAV.

As shown by block 3602, method 3600 involves the control system of the UAV operating the motor to carry out tethered delivery of the payload (e.g., by performing method 1700). During a process of picking up the payload to be delivered, and while the UAV is over or near to a pickup location, the control system may determine that a payload coupling apparatus is mechanically coupled to a payload (e.g., based on the motor current as described above with respect to method 1700) and may responsively operate the motor to retract the tether and lift the payload toward the UAV, as shown by block 3604.

While retracting the tether, the control system may detect an error condition when the tether and/or the payload becomes snagged. In order to detect a snag, the control system may monitor the motor current. As described above, adding a downward force to the tether may cause an increase in motor current in order to counteract the downward force and maintain a motor speed set by a speed controller. Thus, when the tether and/or the payload becomes snagged, the motor current may increase as the motor attempts to maintain the rotational speed set by the speed controller. However, as also noted above with respect to method 1700, an increase in motor current may be indicative of the payload reaching the UAV after winching is complete. Accordingly, the control system may also monitor and consider an unwound length of the tether when detecting a snag. For instance, if the unwound length of the tether indicates that the payload has not yet reached the UAV, then the control system may detect a snag. On the other hand, if the unwound length of the tether indicates that the payload has reached the UAV, then the control system may not detect a snag. Thus, while retracting the tether with the payload coupled thereto, the control system may detect an error condition when both (a) an unwound length of the tether is greater than a threshold length and (b) a motor current of the motor is greater than a threshold current, as shown by block 3606.

In any case, after detecting the error condition, the control system may make an attempt to correct the error condition by operating the motor to unwind the tether (e.g., by a predetermined length), and may then resume retracting the tether, as shown by block 3608. Unwinding the tether may add slack to the tether, perhaps allowing the weight of the payload to undo the detected snag. In some examples, the control system may cause the UAV to reposition itself before resuming retracting the tether in order to improve the chances of undoing the snag and/or reduce the chances of encountering the same snag.

If, after resuming the retracting of the tether, the control system detects that the error condition is still present (e.g., as shown by block 3606), the control system may repeat the attempt to correct the error condition by repeating block 3608, and the control system may monitor the number of repeated correction attempts. Once the control system determines that a predetermined number of attempts to correct the error condition have been made without successfully correcting the error condition, the control system may responsively end the process of picking up the payload and initiate a payload delivery process to return the payload to the ground at or near the pickup location, as shown by block 3610. More specifically, the control system may operate the motor to lower the payload to the ground as if it was performing a payload delivery according to method 1800.

C. Failure to Pick Up Payload

Occasionally, when a UAV attempts to pick up a payload for tethered delivery (e.g., by performing method 1700), the UAV may retract the tether before a payload has been attached to the tether. For instance, while performing method 1700, the control system of the UAV may falsely determine that a payload is attached to the tether at blocks 1708 and 1710 (e.g., due to someone or something pulling on the tether during the predetermined attachment verification period) and responsively operate the motor to retract the tether. Accordingly, the control system may be configured to determine, during retracting of the tether, that a payload is not actually attached to the tether.

Figure 37:
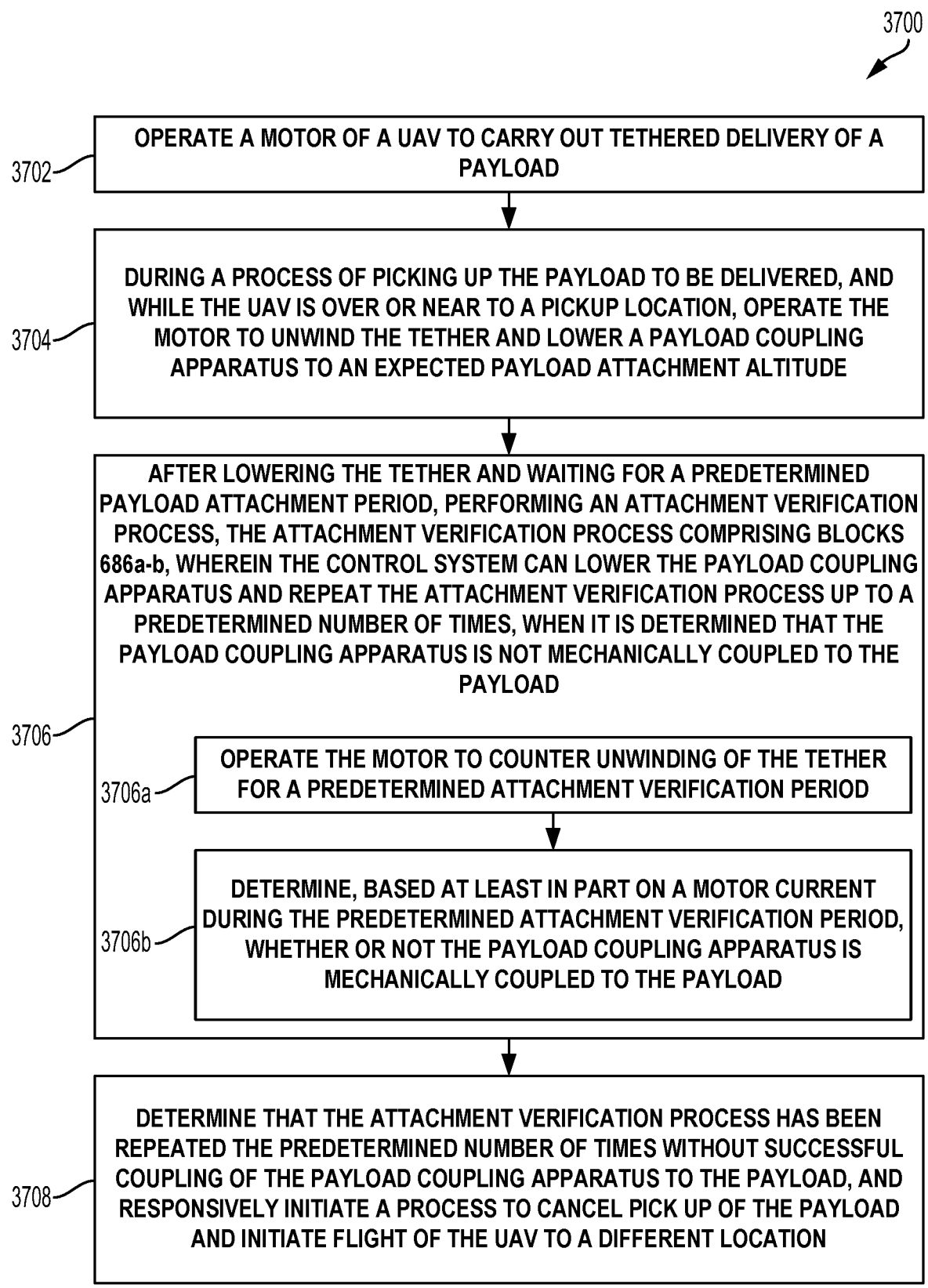
FIG. 37 is a flow chart of a method for detecting whether a UAV has successfully picked up a payload, according to an example embodiment.

FIG. 37 is a flow chart of a method 3700 of detecting that the UAV failed to pick up a payload. Method 3700 may be carried out by a UAV such as those described elsewhere herein. For example, method 3700 may be carried out by a control system of a UAV with a winch system. Further, the winch system may include a tether disposed on a spool, a motor operable in a first mode and a second mode that respectively counter and assist unwinding of the tether due to gravity (e.g., by driving the spool forward or in reverse), a payload coupling apparatus that mechanically couples the tether to a payload, and a payload latch switchable between a closed position that prevents the payload from being lowered from the UAV and an open position that allows the payload to be lowered from the UAV.

As shown by block 3702, method 3700 involves the control system of the UAV operating the motor to carry out tethered delivery of the payload (e.g., by performing method 1700). During a process of picking up the payload to be delivered, and while the UAV is over or near to a pickup location, the control system may operate the motor to unwind the tether and lower a payload coupling apparatus to an expected payload attachment altitude, as shown by block 3704. As noted above, the payload attachment altitude may be an altitude at which a human, or perhaps a robotic device, may grab the payload coupling apparatus for attaching the coupling apparatus to a payload. For instance, the payload attachment altitude may be an altitude less than two meters above ground level.

After lowering the tether, the control system may wait for a predetermined payload attachment period, as shown by block 3706. This attachment period allows time for a human, or perhaps a robotic device, to attach a payload to the payload coupling apparatus.

When the payload attachment period ends, the control system may perform an attachment verification process, as further shown by block 3706. In particular, the attachment verification process may involve the control system operating the motor so as to counter unwinding of the tether for a predetermined attachment verification period (e.g., by pulling upwards on the tether in order to hold the tether in place or retracting the tether at a certain rate), as shown by block 3706a. The motor current required to hold the tether in place or retract the tether at a certain rate will be greater when the payload is attached, due to the added weight of the payload. As such, the attachment verification process may further involve the control system determining, based at least in part on motor current during the predetermined attachment verification period, whether or not the payload coupling apparatus is mechanically coupled to the payload, as shown by block 3706b. For instance, as discussed above, the control system may determine the motor current based on data from a current sensor of the motor or of the power system of the UAV. If, during the attachment verification process, the motor current exceeds a threshold current value, then the control system may determine that the payload is coupled to the payload coupling apparatus. On the other hand, if the motor current is below the threshold current value, then the control system may determine that the payload coupling apparatus is not coupled to the payload.

Further, when the control system determines that the payload coupling apparatus is not mechanically coupled to the payload, the control system can cause the UAV to repeat the lowering of the payload coupling apparatus and the attachment verification process in order to reattempt pickup of the payload, and in some embodiments these processes may only be repeated up to a predetermined number of times, as shown by block 3706. At this point, rather than attempting to pick up the payload again, the control system may cause the UAV to abandon the pickup and navigate away. In practice, for instance, the control system may determine that the attachment verification process has been repeated a predetermined number of times without successful coupling of the payload coupling apparatus to the payload, and responsively initiate a process to cancel pickup of the payload and initiate flight of the UAV to a next, different location, as shown by block 3708. The different location may be another pickup location, or it may be some other location, such as a UAV dock for docking and/or storing the UAV. Other examples are possible as well.

As noted above, there may be situations when control system falsely determines that a payload is attached during the payload verification period, and the control system may responsively cause the motor to enter a winching state to retract the tether toward the UAV. Accordingly, in order to reduce such false determinations, the duration of the predetermined attachment verification period described above may be increased. Additionally or alternatively, the control system may be further configured to perform the attachment verification process and tether lowering process as shown by block 3706 while operating in the winching state.

D. Payload Latch Failure

As described above with respect to method 1800, when a UAV successfully picks up a payload and pulls the payload or a payload coupling apparatus into a receptacle of the UAV, the control system may close a payload latch to secure the payload to the UAV. However, there may be situations where the control system fails to close the latch (e.g., due to an obstruction or some other issue) or where the control system closes the latch but the closed latch fails to secure the payload to the UAV. Accordingly, the control system may be configured to determine whether the payload latch has successfully secured the payload to the UAV.

In some embodiments, the control system may operate the motor to pull upwards on the tether prior to attempting to close the payload latch. If the payload and/or payload coupling apparatus have reached the UAV receptacle, the payload coupling apparatus is pressed up against the UAV such that the motor cannot retract the tether any further. At this point, closing the payload latch may successfully secure the payload and/or the payload coupling apparatus to the UAV. On the other hand, if the payload and/or payload coupling apparatus have not yet reached the UAV receptacle, then the motor may still be retracting the tether, and closing the payload latch at this point would unsuccessfully secure the payload. Accordingly, when closing the payload latch and/or for a time duration after closing the payload latch, the control system may be configured to monitor the motor speed to determine whether the payload latch successfully closed and secured the payload to the UAV. For instance, responsive to detecting that the motor speed is above a threshold speed, the control system may determine that the payload latch failed to successfully close and/or secure the payload to the UAV.

In other embodiments, after attempting to close the payload latch, the control system may detect payload latch failure by operating the motor to unwind the tether a predetermined length. If the payload latch was successfully closed to engage the payload or payload coupling apparatus, then the payload or payload coupling apparatus may be arranged within the UAV receptacle such that all or a portion of the weight of the payload rests on the payload latch rather than the tether, and the motor current might be below a threshold current (e.g., approximately zero). On the other hand, if the payload latch failed to close, then the weight of the payload might be supported by the tether, and the motor current required to support the weight of the payload might be above a threshold current. Accordingly, the control system may determine whether the payload latch successfully closed based on the motor current of the UAV.

In any case, responsive to detecting that the payload latch failed to close, the control system may operate the motor to winch the payload back toward the UAV and reattempt closing the latch. This process may be repeated up to a predetermined number of times or until the payload latch is successfully closed. After unsuccessfully repeating the process the predetermined number of times, the control system may responsively operate the motor to lower the payload back to the ground and detach the payload from the tether (e.g., by performing method 1800).

The following table provides a brief representation of the various methods for detecting and resolving errors as described above:

| Error | Detection Mechanism | Responsive Action |
| --- | --- | --- |
| Upon delivery, package gets stuck such that it can't be released from payload coupling apparatus. | Tether over-run procedure attempted a predetermined number of times without success. | Turn off motor (or reduce motor current limit to lower level) such that tether unwinds and eventually detaches from spool, as UAV flies upward and/or away. |
| Payload and/or payload coupling apparatus snag during package pick-up (after payload attached, while winching payload up to UAV) | Payload re-lowering and winching back up attempted predetermined number of times without success. [Winching failure detected when motor current > threshold AND unwound tether length > threshold (possibly after timeout period, perhaps using a Schmitt trigger to reduce detection error)] | Enter the DESCENDING state 3822 (see FIG. 38B) of the delivery mode in order to return package to ground at pickup location. |
| Payload and/or payload coupling apparatus snag as tether is being retracted after delivery (after payload should have been released) | Motor current > threshold AND unwound tether length > threshold (possibly after timeout period, perhaps using a Schmitt trigger to reduce detection error) | Try to lower payload and/or payload coupling apparatus (similar to over-run for payload release on ground), repeat a predetermined number of times, and then let the capsule and tether go (by turning off the motor or reducing the current limit such that the tether unwinds and detaches from the spool) and fly away. OR Impose a low motor current limit during tether retraction such that a snag causes the tether to unwind and eventually detach from the spool as the UAV flies away. |
| During payload pickup process, failure to mechanically couple payload to payload coupling apparatus. | Lower tether to appropriate height for pickup, and if motor current < threshold, then repeat. | After making maximum number of attempts without success, abort pickup and fly away. |

XIII. EXAMPLE STATE DIAGRAM OF A UAV

Figure 38A:
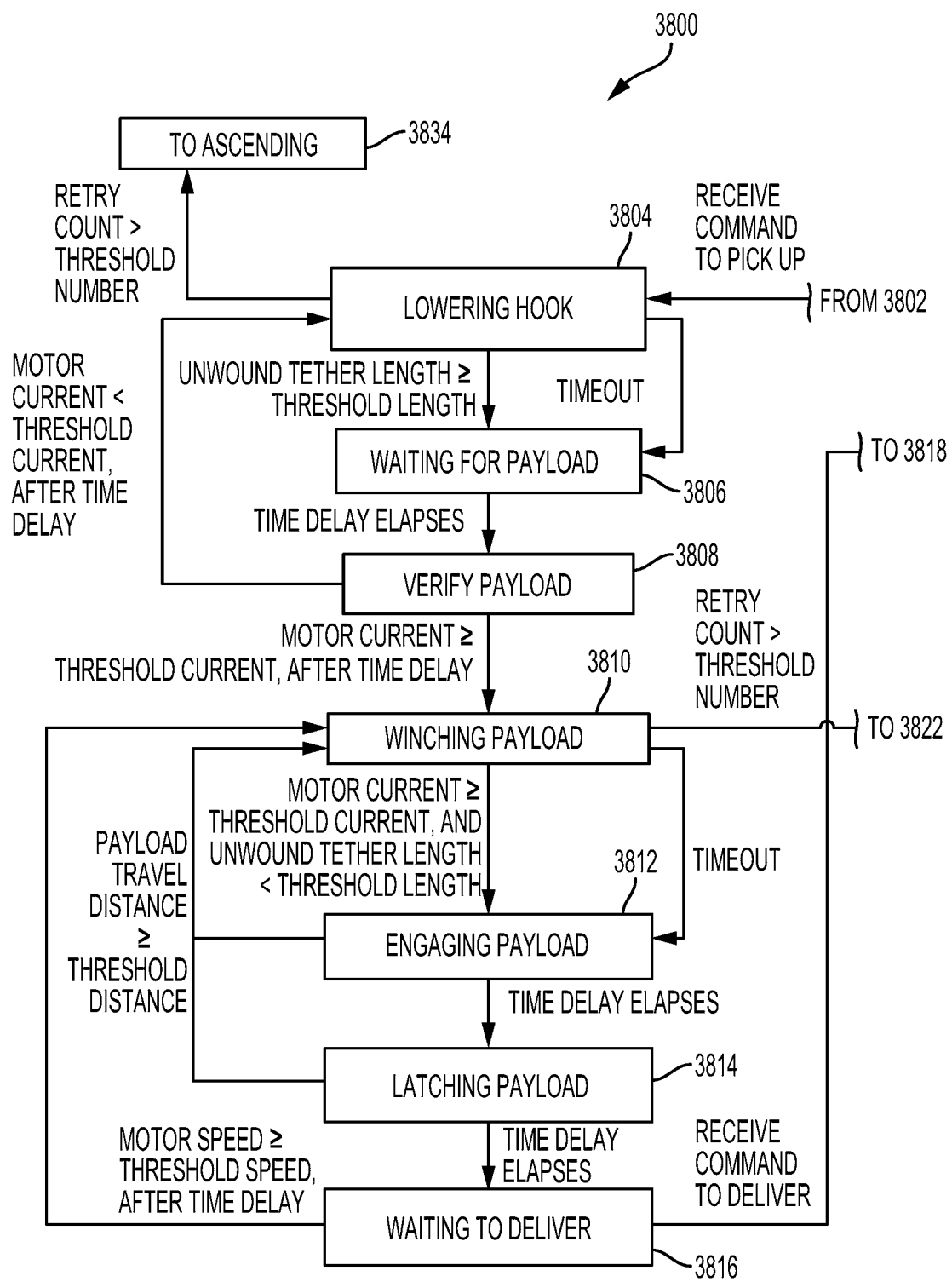
FIG. 38A illustrates a portion of a state diagram of a UAV carrying out a payload pickup and delivery process, according to an example embodiment.
Figure 38B:
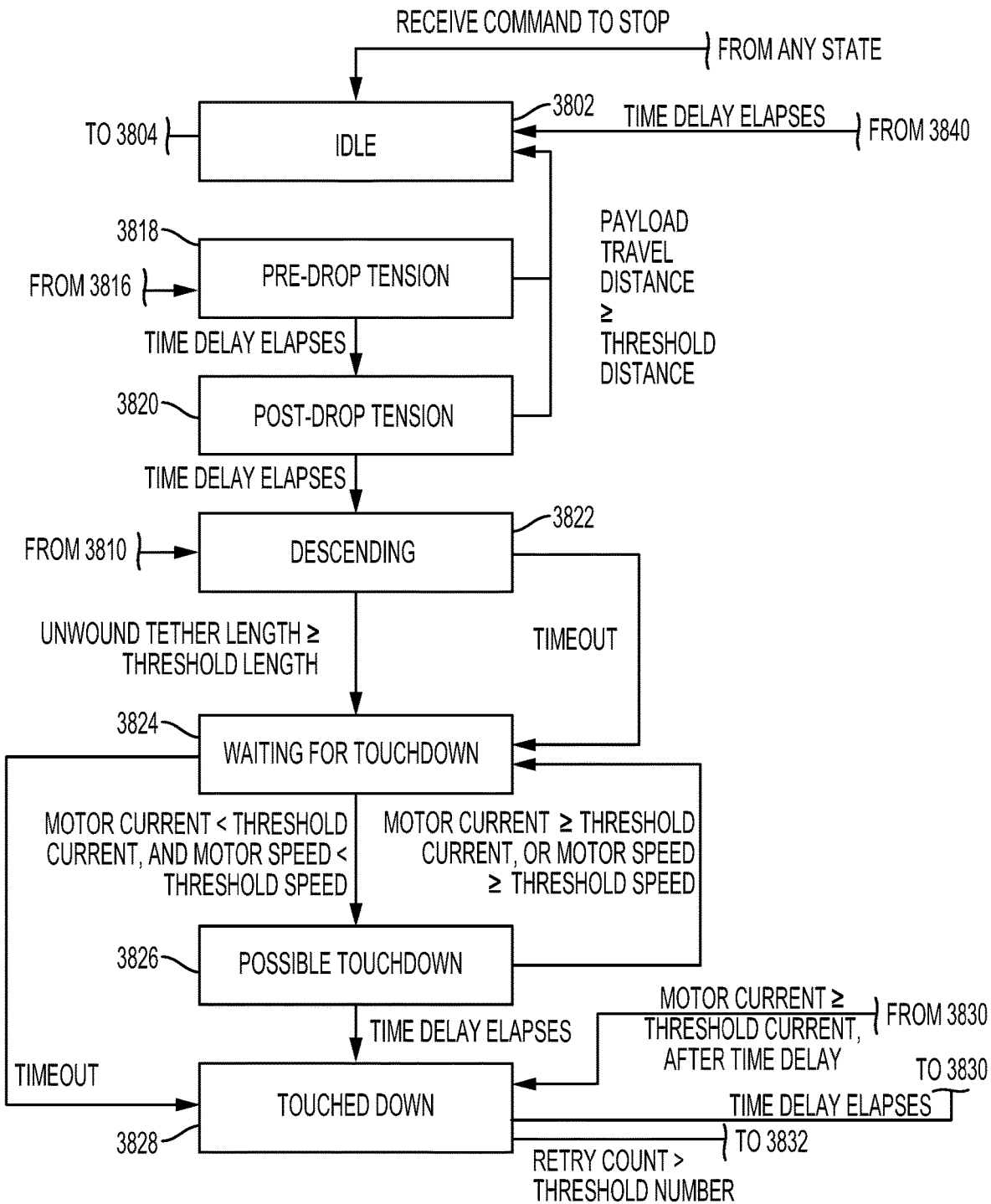
FIG. 38B illustrates another portion of the state diagram of a UAV carrying out a payload pickup and delivery process, according to an example embodiment.
Figure 38C:
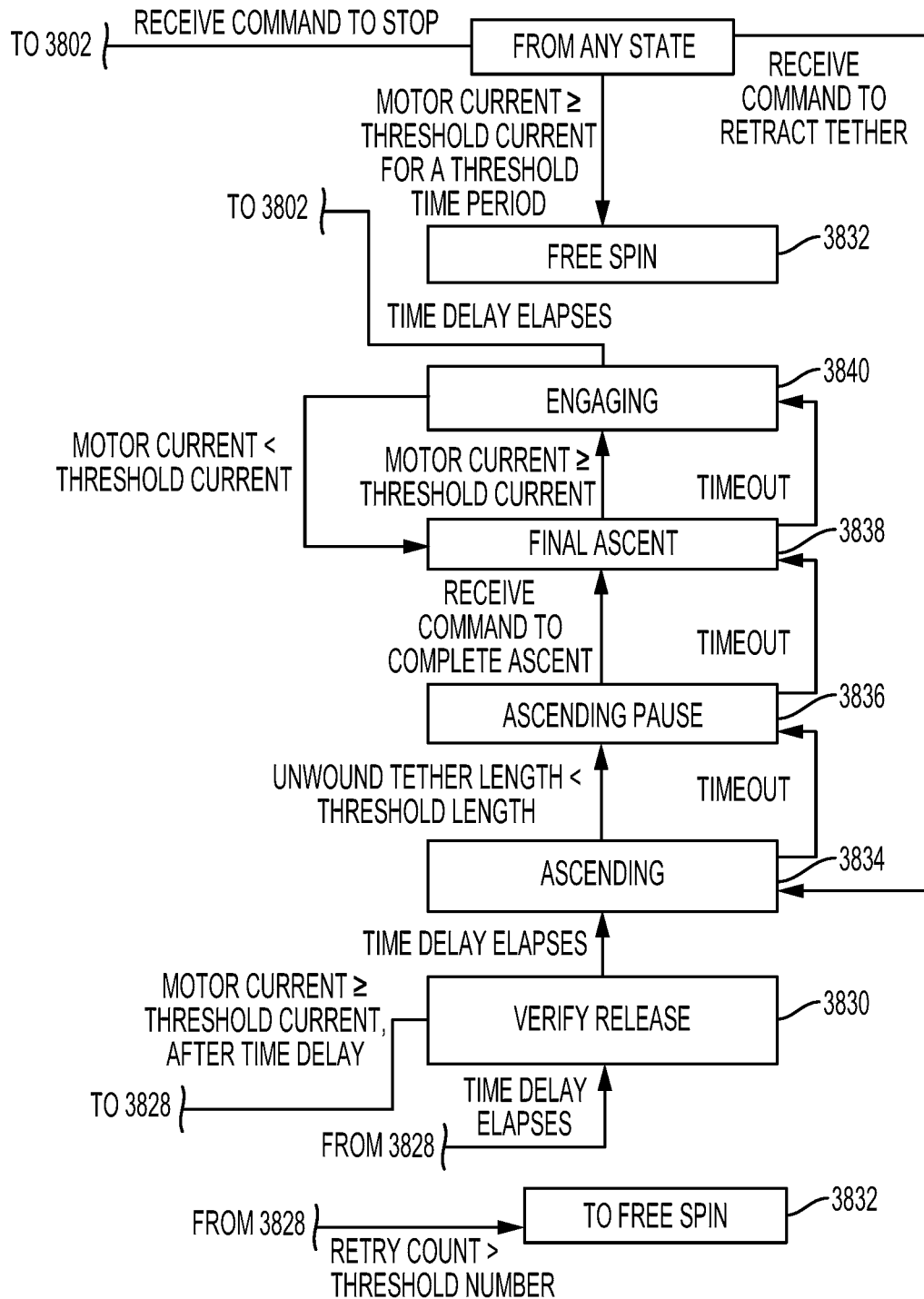
FIG. 38C illustrates another portion of the state diagram of a UAV carrying out a payload pickup and delivery process, according to an example embodiment.

FIGS. 38A-38C illustrates an example state diagram 3800 of a UAV carrying out one or more of the various processes described herein. As shown, the UAV may occasionally operate in an IDLE state 3802. In the IDLE state, the payload latch may be in the closed position such that the tether is prevented from unwinding. Further, in order to keep the motor stationary, the speed controller may set a desired operational speed of the motor that corresponds to a tether descent rate of 0 m/s, and the control system may ignore accumulated error over time when adjusting the motor current to match the desired operational speed. The motor current may be limited to a very high value or may have no limit at all, as the motor is not expected to rotate during this state. In some examples, the UAV may enter the IDLE state 3802 when transporting a payload from a source location to a target location, or when navigating to a source location for pickup. Additionally, the UAV may enter the IDLE state 3802 from any state responsive to receiving a stop command. Other examples are possible as well.

Once the UAV reaches a source location for pickup of a payload, the control system may receive a command to pick up the payload and may responsively enter a payload pickup mode (e.g., by performing method 1700). As shown by state diagram 3800, the payload pickup mode may include a LOWERING HOOK state 3804, during which the control system operates the motor to unwind the tether from a spool and lower a payload coupling apparatus toward the ground. While state 3804 refers to the payload coupling apparatus as a hook, the payload coupling apparatus can take various forms, as discussed above. The payload coupling apparatus may be lowered to a predetermined payload attachment altitude based on the altitude of the UAV. Once the payload coupling apparatus reaches the payload attachment altitude (e.g., when the control system determines that the length of the unwound tether is at least a threshold length), the control system may cause the UAV to enter a WAITING FOR PAYLOAD state 3806 for a time delay, during which the control system operates the motor to hold the payload coupling apparatus at a substantially constant altitude, thereby allowing the payload to be attached to the payload coupling apparatus. Additionally, if the control system fails to determine that the payload coupling apparatus has been lowered to the predetermined payload attachment altitude within a set time period (e.g., a timeout period), the control system may responsively advance to the WAITING FOR PAYLOAD state 3806.

From the WAITING FOR PAYLOAD state 3806, once the time delay elapses, the control system enters a VERIFY PAYLOAD state 3808. During this state, the control system determines whether the payload is attached to the payload coupling apparatus based on a motor current supplied to the motor when the motor attempts to hold the payload coupling apparatus at a constant altitude or begins to retract the tether toward the UAV. If the motor current is below a threshold current during the VERIFY PAYLOAD state 3808, the control system returns to the LOWERING HOOK state 3804 to reattempt attachment of the payload. As described above with respect to method 3700, this repetition may be repeated a number of times until a limit is reached. Once the limit is reached, the control system may cause the UAV to retract the tether, ascend, and perhaps return to the IDLE state 3802 from which the UAV may navigate to some other location.

On the other hand, if, during the VERIFY PAYLOAD state 3808, the control system determines that the payload has been attached to the payload coupling apparatus (e.g., by determining after a time delay that the motor current is at least a threshold current), the control system may enter a WINCHING PAYLOAD state 3810. During this state, the control system may operate the motor to retract the tether and pull the payload toward the UAV. As described above with respect to method 3700, the control system may also monitor motor current in this state to determine whether a false positive was obtained during the VERIFY PAYLOAD state 3808 (e.g., by detecting that the motor current is threshold low). Additionally, as noted above with respect to method 3600, the control system may monitor the motor current during the WINCHING PAYLOAD state 3810 in order to detect when the tether becomes snagged (e.g., by detecting that the motor current is threshold high). Responsive to detecting a snag, the control system may operate the motor to lower the payload a predetermined length and reattempt winching the payload. After a threshold number of attempts to remove the snag, the control system may operate the motor to lower the payload to the ground and abandon pickup of the payload. This may involve advancing to a DESCENDING state 3822, which is discussed in more detail below.

While operating in the WINCHING PAYLOAD state 3810, if no snags are detected, or if all detected snags are resolved, the control system may detect that the payload is within a threshold distance of the UAV (e.g., by measuring a number of rotations of the tether spool) and responsively enter an ENGAGING PAYLOAD state 3812. During this state, the control system may increase the current supplied to the motor for a predetermined time period in order to attempt to pull the payload into, and orient the payload within, a receptacle of the UAV. If, during this state, the control system detects that the motor current is below a threshold current and/or that the tether is unwound at least a threshold length, then the control system may responsively determine that the payload is too far from the UAV and may re-enter the WINCHING PAYLOAD state 3810 until the control system again detects that the payload is close enough to the UAV to advance to the ENGAGING PAYLOAD state 3812.

On the other hand, if, during the ENGAGING PAYLOAD state 3812, the motor current remains threshold high and the unwound length of the tether indicates that the payload has reached the UAV, then the control system enters the LATCHING PAYLOAD state 3814. During this state, the control system switches the payload latch to the closed position, thereby preventing the tether and/or the payload from descending from the UAV. As described above, the control system may determine whether the payload latch was successfully closed by monitoring the motor speed and/or by operating the motor to attempt to lower the payload and monitoring the motor current. If the control system determines that the payload latch was not successfully closed, the control system may return to the WINCHING PAYLOAD state 3810 and reattempt to lift and engage the payload. But if the control system determines that the payload latch was successfully closed, then the control system may enter a WAITING TO DELIVER state 3816.

The WAITING TO DELIVER state 3816 may be similar to the IDLE state 3802 where the payload is secured to the UAV, and the control system operates the motor to keep the payload stationary. If, after a time delay, the control system detects that the motor speed is greater than a threshold speed, this may indicate that the payload is not sufficiently secured to the UAV, and the control system may responsively return to the WINCHING PAYLOAD state 3810. Otherwise, entering the WAITING TO DELIVER state 3816 signals the end of the pickup mode.

While in the WAITING TO DELIVER state 3816, the control system may receive a command to deliver the payload and may responsively enter a delivery mode (e.g., by performing method 1800). The delivery mode may include a PRE-DROP TENSION state 3818. In this state, while the payload latch is closed, the control system may operate the motor to lift the payload (e.g., by setting the desired tether speed to 1 m/s or some other speed in an upward direction, or by setting the motor current to a predetermined value), thereby removing the weight of the payload from the payload latch and making it easier to open the payload latch. While in the PRE-DROP TENSION state 3818, the control system may open the payload latch and advance to the POST-DROP TENSION state 3820 after a time delay. In this state, the control system may operate the motor to hold the tether in a constant position for a predetermined amount of time to allow the weight of the payload to pull the payload firmly against the payload coupling apparatus, thereby reducing any chance that the payload might slip off and detach from the payload coupling apparatus. After the predetermined amount of time has passed, the control system may enter the DESCENDING state 3822.

In both the PRE-DROP TENSION state 3818 and the POST-DROP TENSION state 3820, if the control system detects that the payload has traveled at least a threshold distance (e.g., by measuring rotation of the spool), then this may indicate that an error has occurred (e.g., premature detachment of the payload from the payload coupling apparatus or snapping of the tether) because the spool should remain substantially motionless during these states. As a result to detecting such an error, the control system may return to the IDLE state 3802 and cause the UAV to navigate to a location where it may be serviced.

In the DESCENDING state 3822, the control system may operate the motor to unwind the tether according to a predetermined descent profile that specifies a constant or varying operational speed of the motor. Upon detecting that the tether has unwound at least a predetermined amount (e.g., detecting that the payload is within a threshold distance of the ground based on an altitude of the UAV), the control system may enter a WAITING FOR TOUCHDOWN state 3824. In some examples, the control system may also be configured to advance from the DESCENDING state

3822 to the WAITING FOR TOUCHDOWN state 3824 if a threshold amount of time elapses in the DESCENDING state 3822 without advancing to the WAITING FOR TOUCHDOWN state 3824.

In the WAITING FOR TOUCHDOWN state 3824, the control system may monitor the motor current and its operational speed in order to detect whether the payload has reached the ground. Specifically, upon determining that both the motor current and the motor speed are threshold low, the control system may enter a POSSIBLE TOUCHDOWN state 3826 to verify that the payload has in fact reached the ground. The control system may be configured to remain in the POSSIBLE TOUCHDOWN state 3826 for a predetermined amount of time. If, during that time, either the motor current or the motor speed becomes threshold high, this may indicate that the payload has not yet reached the ground, and the control system may return to the WAITING FOR TOUCHDOWN state 3824. However, if, during the duration of the POSSIBLE TOUCHDOWN state 3826, the motor current and the motor speed remain threshold low, this may indicate that the payload has in fact reached the ground, and the control system may responsively advance to a TOUCHED DOWN state 3828. In some examples, the control system may also be configured to advance from the WAITING FOR TOUCHDOWN state 3824 to the TOUCHED DOWN state 3828 if a threshold amount of time elapses in the WAITING FOR TOUCHDOWN state 3824 without advancing to the POSSIBLE TOUCHDOWN state 3826.

Once in the TOUCHED DOWN state 3828, the control system may operate the motor to cause over-run of the tether such that the payload coupling apparatus continues to lower while the payload remains stationary on the ground. Continuing to lower the payload coupling apparatus may cause the payload coupling apparatus to detach from the payload. After causing tether over-run for a predetermined amount of time, the control system may enter a VERIFY RELEASE state 3830 in order to determine whether the payload coupling apparatus did in fact separate from the payload.

In the VERIFY RELEASE state 3830, the control system may operate the motor to pull upwards on the tether. Based on the motor current when pulling upwards on the tether, the control system may determine whether or not the payload has been released from the payload coupling apparatus. If the motor current is threshold high, this may indicate that the payload is still attached, and the control system may return to the TOUCHED DOWN state 3828. This process may be repeated up to a predetermined number of times, at which point the control system may enter a FREE SPIN state 3832.

In the FREE SPIN state 3832, the control system may operate the motor to allow the tether to completely unwind such that the tether disconnects and falls away from the UAV. This may be achieved by limiting the motor current to a sufficiently low value that the motor is unable to counteract the downward force on the tether caused by the gravitational pull on the payload. Alternatively, the motor can be shut off completely (e.g., limiting the motor current to 0 A).

Referring back to the VERIFY RELEASE state 3830, if, throughout a predetermined duration, the motor current remains threshold low, this may indicate that the payload has in fact separated from the payload coupling apparatus, and the control system may responsively advance to an ASCENDING state 3834.

In the ASCENDING state 3834, the control system may operate the motor to retract the tether and the payload coupling apparatus up toward the UAV according to a predetermined ascent profile that specifies a constant or varying operational speed of the motor. Once the control system determines that an unwound length of the tether is below a threshold length such that the payload coupling apparatus is sufficiently close to the UAV (e.g., based on a measured number of rotations of the spool), the control system may enter an ASCENDING PAUSE state 3836.

In the ASCENDING PAUSE state 3836, the control system may operate the motor to halt the retraction of the tether. Once retraction of the tether is halted, the control system may control a movement of the UAV in order to dampen any oscillations of the tether that may have occurred during the ASCENDING state 3834. After damping the tether oscillations, the control system may enter a FINAL ASCENT state 3836.

In the FINAL ASCENT state 3836, the control system may operate the motor to resume retracting the tether. However, in this state, the tether may be retracted at a slower rate than that of the ASCENDING state 3834. This slower rate may introduce weaker oscillations on the tether. Also during the FINAL ASCENT state 3836, the control system may monitor the motor current to determine when the payload coupling apparatus reaches the UAV. In practice, when the payload coupling apparatus reaches the UAV, the apparatus is pressed against the UAV, the motor speed drops to zero, and the motor current increases in an attempt to increase motor speed. Accordingly, the control system may determine that the payload coupling apparatus has reached the UAV based on the motor current exceeding a threshold current. Responsively, the control system may enter an ENGAGING state 3840.

In the ENGAGING state 3840, the control system may increase the maximum motor current in order to allow the motor to pull the payload coupling apparatus into, and orient itself within, a receptacle of the UAV. Once the payload coupling apparatus is secured within the receptacle, the control system may return to the IDLE state 3802. If, during the ENGAGING state 3840, the motor current falls below a threshold current, this may indicate that the payload coupling apparatus was not in fact near to the UAV, and the detected increase in current was likely caused by something else (e.g., a temporary snag of the tether). In such a scenario, the control system may revert back to the FINAL ASCENT state 3838.

As shown by the state diagram 3800, once the control system enters the ASCENDING state 3834, the control system may repeatedly advance to the next state upon determining that a threshold amount of time has elapsed without advancing states.

In some examples, a lower maximum current limit may be imposed on the UAV motor when retracting the tether, as shown by states 3834 to 3840, when compared to lowering the tether, as shown by states 3818 to 3828. This is because the tether is more likely to encounter a snag when retracting the tether. Imposing a lower current limit reduces the amount of force that the motor may exert on the tether. This may prevent the motor from causing the UAV to crash by continuing to winch the UAV toward a snag. And as noted above, if the current limit is low enough that the maximum force of the motor is weaker than a downward force on the tether, then the current limit on the motor may allow the tether to completely unwind and detach from its spool, should the UAV fly away while the tether is snagged. Similar methods may be employed when initially picking up a payload during states 3806 to 3814.

XIV. ADDITIONAL ASPECTS

In some embodiments, the control system of the UAV may be configured to calibrate the rotary encoder and speed controller of the motor upon startup of the system. In practice, when the UAV system is initially powered on, the motor should be stationary. Accordingly, the encoder data should also indicate that the motor is stationary. If the encoder data indicates otherwise, then an offset may be applied to the encoder data to account for any inconsistencies.

The control system may further test the friction of the motor on startup of the UAV system. Based on the measured motor friction, an offset may be applied to various motor current settings to account for the measured motor friction. Over time, the friction of a DC motor may vary. Therefore, measuring friction on every startup and adjusting motor current settings accordingly may enable consistent operation over the life of the motor.

XV. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A payload coupling apparatus comprising:
   a housing comprising an outer surface, the housing having an upper portion including a tether attachment point, and a lower portion opposite the upper portion, wherein the upper portion of the housing has a rounded surface, the lower portion of the housing has a rounded surface, and a horizontal cross-section of the housing has a round shape;
   a slot extending into the outer surface of the housing thereby forming a lower lip on the housing beneath the slot;
   wherein the slot is adapted to receive a handle of a payload; and
   wherein the handle of the payload automatically decouples from the slot of the housing when the payload is lowered onto a landing surface.

2. The payload coupling apparatus of claim 1, wherein an outer surface of the housing above the slot extends further outwardly than an outermost end of the lower lip below the slot.

3. The payload coupling apparatus of claim 2, wherein the outermost end of the lower lip is positioned beneath an upper surface in the housing above the slot.

4. The payload coupling apparatus of claim 2, wherein the slot of the housing is prevented from reengaging the handle of the payload when the housing is retrieved to an uncrewed aerial vehicle (UAV).

5. The payload coupling apparatus of claim 1, wherein a first outer protrusion and a second outer protrusion extend outwardly from the outer surface of the housing.

6. The payload coupling apparatus of claim 5, wherein the first and second outer protrusions are adapted to engage with a payload coupling apparatus receptacle positioned within a UAV to force rotation of the housing into a desired position within the UAV.

7. The payload coupling apparatus of claim 1, wherein a vertical cross-section of the housing has an oblong shape.

8. The payload coupling apparatus of claim 1, wherein the upper portion of the housing extends upwardly and inwardly from the outer surface of the housing.

9. The payload coupling apparatus of claim 1, wherein the slot extends downwardly from horizontal at an angle of between 35 and 55 degrees.

10. The payload coupling apparatus of claim 1, wherein the lower lip has a width that is less than a width of the housing.

11. An uncrewed aerial vehicle system comprising:
    an uncrewed aerial vehicle (UAV);
    a tether having a first end positioned in a winch system secured to the UAV and a second end secured to a payload coupling apparatus;
    a payload coupling apparatus receptacle positioned in a fuselage of the UAV;
    wherein the payload coupling apparatus comprises:
      a housing comprising an outer surface the housing having an upper portion including a tether attachment point, and a lower portion opposite the upper portion;
      a slot extending into the outer surface of the housing thereby forming a lower lip on the housing beneath the slot; and
    wherein the slot is adapted to receive a handle of a payload; and
    wherein the handle of the payload automatically decouples from the slot of the housing when the payload is lowered onto a landing surface;
    wherein the housing is attached to the second end of the tether at the tether attachment point; and
    wherein the housing of the payload coupling apparatus is positionable in the payload coupling apparatus receptacle in the UAV when the housing of the payload coupling apparatus is winched into the UAV.

12. The system of claim 11, wherein a first outer protrusion and a second outer protrusion extend outwardly from the outer surface of the housing.

13. The system of claim 11, wherein the upper portion of the housing extends upwardly and inwardly from the outer surface of the housing.

14. The payload coupling apparatus of claim 1, wherein the upper portion of the housing has a hemispherical shape.

15. They payload coupling apparatus of claim 14, wherein the lower portion of the housing has a hemispherical shape.

* * * * *